United States Patent
Panta et al.

(10) Patent No.: US 9,210,589 B2
(45) Date of Patent: Dec. 8, 2015

(54) GEOCAST PROTOCOL FOR WIRELESS SENSOR NETWORK

(71) Applicant: AT&T Intellectual Property I, L.P., Atlanta, GA (US)

(72) Inventors: Rajesh Krishna Panta, Parsippany, NJ (US); Joshua Marc Auzins, Madison, NJ (US); Maria F. Fernandez, Madison, NJ (US); Robert J. Hall, Berkeley Heights, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 513 days.

(21) Appl. No.: 13/683,025

(22) Filed: Nov. 21, 2012

(65) Prior Publication Data

US 2014/0098686 A1      Apr. 10, 2014

Related U.S. Application Data

(60) Provisional application No. 61/711,397, filed on Oct. 9, 2012.

(51) Int. Cl.
| | |
|---|---|
| *H04W 24/02* | (2009.01) |
| *H04W 4/00* | (2009.01) |
| *H04W 4/06* | (2009.01) |
| *H04W 4/02* | (2009.01) |

(52) U.S. Cl.
CPC .............. *H04W 24/02* (2013.01); *H04W 4/006* (2013.01); *H04W 4/06* (2013.01); *H04W 4/02* (2013.01)

(58) Field of Classification Search
CPC ....... H04W 24/02; H04W 4/06; H04W 4/006; H04W 4/02

USPC .......................................... 370/338, 389, 339
See application file for complete search history.

(56) References Cited

U.S. PATENT DOCUMENTS

| | | |
|---|---|---|
| 6,015,344 A | 1/2000 | Kelly et al. |
| 6,119,976 A | 9/2000 | Rogers |
| 6,195,751 B1 | 2/2001 | Caronni et al. |
| 6,304,556 B1 | 10/2001 | Haas |
| 6,428,470 B1 | 8/2002 | Thompson |
| 6,628,620 B1 | 9/2003 | Cain |

(Continued)

FOREIGN PATENT DOCUMENTS

WO      WO 2007/016641 A2      2/2007

OTHER PUBLICATIONS

Roert J. Hall, "An Improved Geocast for Mobile Ad Hoc Networks", date Feb. 2011, vol. 10, No. 2, pp. 254-266.*

(Continued)

*Primary Examiner* — Kwang B Yao
*Assistant Examiner* — Syed M Bokhari
(74) *Attorney, Agent, or Firm* — Baker & Hostetler LLP

(57) ABSTRACT

A protocol for providing location-based communication services in wireless sensor networks utilizes dynamic selection of forwarding devices, dynamic forwarding decisions, and intelligent backoff. Dynamic selection of forwarding devices limits the number of transmissions by dynamically selecting the devices that forward a message. Dynamic forwarding decisions implement different heuristics for different devices. According to intelligent backoff, devices that are closer to a destination region backoff for a shorter period of time than those which are further away from the destination region.

11 Claims, 35 Drawing Sheets

(56) References Cited

U.S. PATENT DOCUMENTS

| | | |
|---|---|---|
| 6,781,971 B1 | 8/2004 | Davis et al. |
| 6,807,165 B2 | 10/2004 | Belcea |
| 6,816,460 B1 | 11/2004 | Ahmed et al. |
| 6,870,846 B2 | 3/2005 | Cain |
| 6,879,574 B2 | 4/2005 | Naghian et al. |
| 6,909,706 B2 | 6/2005 | Wilmer et al. |
| 6,937,602 B2 | 8/2005 | Whitehill et al. |
| 6,940,832 B2 | 9/2005 | Saadawi et al. |
| 6,954,435 B2 | 10/2005 | Billhartz et al. |
| 6,958,986 B2 | 10/2005 | Cain |
| 7,027,822 B1 | 4/2006 | Hwang et al. |
| 7,152,110 B2 | 12/2006 | Pierce |
| 7,179,166 B1 | 2/2007 | Abbott |
| 7,295,521 B2 | 11/2007 | Choi et al. |
| 7,307,978 B2 | 12/2007 | Carlson |
| 7,435,179 B1 | 10/2008 | Ford |
| 7,525,933 B1 | 4/2009 | Hall |
| 7,540,028 B2 | 5/2009 | Ahmed et al. |
| 7,573,858 B2 | 8/2009 | Roh et al. |
| 7,613,467 B2 | 11/2009 | Fleischman |
| 7,669,052 B2 | 2/2010 | Asano et al. |
| 7,813,326 B1 | 10/2010 | Kelm et al. |
| 7,864,168 B2 | 1/2011 | French |
| 7,917,169 B1 | 3/2011 | Hall |
| 7,957,390 B2 | 6/2011 | Furlong et al. |
| 7,969,914 B1 | 6/2011 | Gerber |
| 7,970,749 B2 | 6/2011 | Uhlir et al. |
| 8,001,189 B2 | 8/2011 | Nielsen et al. |
| 8,073,327 B2 | 12/2011 | Mayer |
| 8,074,275 B2 | 12/2011 | Ramaiah et al. |
| 8,085,813 B2 | 12/2011 | Melick et al. |
| 8,128,405 B2 | 3/2012 | Preston et al. |
| 8,149,801 B2 * | 4/2012 | Hall ................ 370/338 |
| 8,218,463 B2 | 7/2012 | Hall |
| 8,248,367 B1 | 8/2012 | Barney et al. |
| 8,332,544 B1 | 12/2012 | Ralls et al. |
| 8,341,271 B2 | 12/2012 | Cho et al. |
| 8,359,643 B2 | 1/2013 | Low et al. |
| 8,376,857 B1 | 2/2013 | Shuman et al. |
| 8,483,652 B2 | 7/2013 | Hall |
| 8,599,848 B2 | 12/2013 | Janneteau |
| 2001/0014094 A1 | 8/2001 | Epley |
| 2002/0113872 A1 | 8/2002 | Kinjo |
| 2002/0141454 A1 | 10/2002 | Muniere |
| 2002/0155846 A1 | 10/2002 | Shiraga |
| 2002/0163912 A1 | 11/2002 | Carlson |
| 2002/0167960 A1 | 11/2002 | Garcia-Luna-Aceves |
| 2002/0169971 A1 | 11/2002 | Asano et al. |
| 2003/0105956 A1 | 6/2003 | Ishiguro et al. |
| 2003/0193394 A1 | 10/2003 | Lamb |
| 2003/0235158 A1 | 12/2003 | Lee |
| 2004/0083385 A1 | 4/2004 | Ahmed et al. |
| 2004/0121792 A1 | 6/2004 | Allen et al. |
| 2004/0151144 A1 | 8/2004 | Benveniste |
| 2004/0185881 A1 | 9/2004 | Lee et al. |
| 2004/0213270 A1 | 10/2004 | Su et al. |
| 2005/0036448 A1 | 2/2005 | Leeuwen |
| 2005/0058151 A1 | 3/2005 | Yeh |
| 2005/0086350 A1 | 4/2005 | Mai |
| 2005/0096065 A1 | 5/2005 | Fleischman |
| 2005/0152318 A1 | 7/2005 | Elbatt et al. |
| 2005/0152378 A1 | 7/2005 | Bango et al. |
| 2005/0243788 A1 | 11/2005 | Janczak |
| 2005/0254453 A1 | 11/2005 | Barneah |
| 2005/0259597 A1 | 11/2005 | Benedetto |
| 2005/0271057 A1 * | 12/2005 | Kim et al. ................ 370/389 |
| 2006/0013154 A1 | 1/2006 | Choi et al. |
| 2006/0023677 A1 | 2/2006 | Labrador |
| 2006/0084444 A1 | 4/2006 | Kossi et al. |
| 2006/0126535 A1 | 6/2006 | Sherman |
| 2006/0128349 A1 | 6/2006 | Yoon |
| 2006/0148516 A1 | 7/2006 | Reddy et al. |
| 2006/0153157 A1 | 7/2006 | Roh et al. |
| 2006/0165015 A1 | 7/2006 | Melick et al. |
| 2007/0008925 A1 | 1/2007 | Dravida et al. |
| 2007/0019591 A1 | 1/2007 | Chou et al. |
| 2007/0019594 A1 | 1/2007 | Perumal et al. |
| 2007/0104096 A1 | 5/2007 | Ribera |
| 2007/0110092 A1 | 5/2007 | Kangude et al. |
| 2007/0198731 A1 | 8/2007 | Li et al. |
| 2007/0217346 A1 | 9/2007 | Zheng |
| 2007/0259716 A1 | 11/2007 | Mattice et al. |
| 2007/0259717 A1 | 11/2007 | Mattice et al. |
| 2007/0263571 A1 | 11/2007 | Hermann et al. |
| 2007/0265088 A1 | 11/2007 | Nakada et al. |
| 2007/0265089 A1 | 11/2007 | Robarts et al. |
| 2007/0266396 A1 | 11/2007 | Estermann |
| 2007/0283001 A1 | 12/2007 | Spiess et al. |
| 2007/0287437 A1 | 12/2007 | Cartmell |
| 2008/0015024 A1 | 1/2008 | Mullen |
| 2008/0039113 A1 | 2/2008 | Liu et al. |
| 2008/0058099 A1 | 3/2008 | Schwartz et al. |
| 2008/0080401 A1 | 4/2008 | Ribiere |
| 2008/0144493 A1 | 6/2008 | Yeh |
| 2008/0147854 A1 | 6/2008 | Van Datta et al. |
| 2008/0159236 A1 | 7/2008 | Ch'ng |
| 2008/0163355 A1 | 7/2008 | Chu |
| 2008/0186206 A1 | 8/2008 | Reumerman |
| 2008/0192737 A1 | 8/2008 | Miyazaki |
| 2008/0262928 A1 | 10/2008 | Michaelis |
| 2009/0017913 A1 | 1/2009 | Bell et al. |
| 2009/0030605 A1 | 1/2009 | Breed |
| 2009/0041039 A1 | 2/2009 | Bear |
| 2009/0045977 A1 | 2/2009 | Bai et al. |
| 2009/0046628 A1 | 2/2009 | Hall |
| 2009/0073912 A1 | 3/2009 | Bauchot et al. |
| 2009/0122753 A1 | 5/2009 | Hughes et al. |
| 2009/0138353 A1 | 5/2009 | Mendelson |
| 2009/0175223 A1 | 7/2009 | Hall |
| 2009/0201860 A1 | 8/2009 | Sherman et al. |
| 2009/0207783 A1 | 8/2009 | Choi et al. |
| 2009/0245518 A1 | 10/2009 | Bae et al. |
| 2009/0248420 A1 | 10/2009 | Basir |
| 2009/0292926 A1 | 11/2009 | Daskalopoulos et al. |
| 2009/0298461 A1 | 12/2009 | O'Reilly |
| 2009/0323579 A1 | 12/2009 | Bai et al. |
| 2009/0325603 A1 | 12/2009 | Van Os et al. |
| 2010/0008259 A1 | 1/2010 | Yoon et al. |
| 2010/0029245 A1 | 2/2010 | Wood et al. |
| 2010/0042601 A1 | 2/2010 | Kelley et al. |
| 2010/0060480 A1 | 3/2010 | Bai et al. |
| 2010/0064307 A1 | 3/2010 | Malhotra et al. |
| 2010/0067451 A1 | 3/2010 | Hall |
| 2010/0069109 A1 | 3/2010 | Hall |
| 2010/0074234 A1 | 3/2010 | Banks et al. |
| 2010/0082513 A1 | 4/2010 | Liu |
| 2010/0128653 A1 | 5/2010 | Tateson |
| 2010/0150129 A1 | 6/2010 | Jin et al. |
| 2010/0162149 A1 | 6/2010 | Sheleheda et al. |
| 2010/0169009 A1 | 7/2010 | Breed et al. |
| 2010/0214987 A1 | 8/2010 | Mori |
| 2010/0215040 A1 | 8/2010 | Kappler et al. |
| 2010/0226342 A1 | 9/2010 | Colling et al. |
| 2010/0235633 A1 | 9/2010 | Asano et al. |
| 2010/0245124 A1 | 9/2010 | Bai et al. |
| 2010/0248618 A1 | 9/2010 | Bai et al. |
| 2010/0248843 A1 | 9/2010 | Karsten |
| 2010/0250106 A1 | 9/2010 | Bai et al. |
| 2010/0250346 A1 | 9/2010 | Bai et al. |
| 2010/0279776 A1 | 11/2010 | Hall |
| 2010/0287011 A1 | 11/2010 | Muchkaev |
| 2010/0304759 A1 | 12/2010 | Leppanen et al. |
| 2010/0329463 A1 | 12/2010 | Ratliff et al. |
| 2011/0002243 A1 | 1/2011 | Sherman et al. |
| 2011/0081973 A1 | 4/2011 | Hall |
| 2011/0102459 A1 | 5/2011 | Hall |
| 2011/0103302 A1 | 5/2011 | Hall |
| 2011/0105151 A1 | 5/2011 | Hall |
| 2011/0177829 A1 | 7/2011 | Platt et al. |
| 2011/0201369 A1 | 8/2011 | Kim et al. |
| 2011/0230202 A1 | 9/2011 | Wood et al. |
| 2011/0244887 A1 | 10/2011 | Dupray et al. |
| 2011/0299685 A1 | 12/2011 | Hall |
| 2012/0016940 A1 | 1/2012 | Hall |

(56) References Cited

U.S. PATENT DOCUMENTS

| | | |
|---|---|---|
| 2012/0058814 A1 | 3/2012 | Lutnick et al. |
| 2012/0079080 A1 | 3/2012 | Pishevar |
| 2012/0084364 A1 | 4/2012 | Sivavakeesar |
| 2012/0094770 A1 | 4/2012 | Hall |
| 2012/0108326 A1 | 5/2012 | Hall |
| 2012/0128010 A1 | 5/2012 | Huang et al. |
| 2012/0157210 A1 | 6/2012 | Hall |
| 2012/0329538 A1 | 12/2012 | Hall |
| 2013/0012231 A1 | 1/2013 | Hall |
| 2014/0082369 A1 | 3/2014 | Waclawsky et al. |
| 2014/0100027 A1 | 4/2014 | Harris et al. |

OTHER PUBLICATIONS

Aggarwal, Sudhir et al., "Accuracy in dead reckoning based distributed multi-player games", SIGCOMM '04 Workshops, (Proceedings of 3rd ACM SIGCOMM Workshop on Network and System Support for Games), Aug. 30-Sep. 3, 2004, Portland, Oregon, pp. 161-165.
Bjerver, Martin, "Player Behaviour in Pervasive Games—using the City as a Game Board in Botfighters", Master of Science Thesis, KTH Computer Science and Communication, Stockholm, Sweden, 2006.
bzflag(6):tank battle game—linux man page, Google date Feb. 1, 2001, downloaded from http://linux.die.net/man/6/bzflag.
de Souza e Silva, Adriana, "Alien revolt (2005-2007): A case study of the first location-based mobile game in Brazil", IEEE Technology and Society Magazine, Spring 2008, pp. 18-28.
Dialogic, "Adding location based services to existing architectures", Application Note: Location-Based Services, 9862-02, Oct. 2007, 14 pages, downloaded from http://www.dialogic.com/-/media/products/docs/signaling-and-ss7-cornponents/9862_Add_Locationbased_Servs_an.pdf.
Gallagher, Sean, "Army prepares test of new wireless war game gear", Defense Systems, Jul. 7, 2008, downloaded from http://defensesystems.com/articles/2008/07/army-prepares-test-of-new-wireless-war-game-gear.aspx.
Hales, Jacek, "Ghost Recon: Advanced Warfighter Game Guide, [Mission 01] Contact!—Objective: Locate Ramirez with the Drone", 2007, downloaded from http://guides.gamepressure.com/ghostreconadvancedwarfighter/guide.asp?ID=986.
Hohfeld, Alexander, "In and out of reality: Janus-faced location awareness in ubiquitous games", Journal of Software, 2(6), Dec. 2007, 86-92.
Kim, Seong-Whan et al., "Kalman filter based dead reckoning algorithm for minimizing network traffic between mobile nodes in wireless GRID", Embedded and Ubiquitous Computing, Lecture Notes in Computer Science, 4096, 2006, 162-170.
Lindo, Wayne A. et al., "Network modeling and simulation in the OneTESS program", Fall Simulation Interoperability Workshop 2006, Orlando, Florida, USA, Sep. 10-15, 2006, 155ff.
MyCheats web page, "Ghost Recon: Advanced Warfighter Superguide, Reach Ramirez", (Jul. 19, 2006), downloaded from http://mycheats.1up.com/view/section/3139558/18404/ghost_recon_advanced_warfighter/pc.
Santos, Nuno et al., "Vector-field consistency for ad-hoc gaming", Middleware 2007, LNCS 4834, 2007, pp. 80-100.
Sotamaa, Olli, "All the world's a Botfighter Stage: Notes on location-based multi-user gaming", Proceedings of Computer Games and Digital Cultures Conference, Tampere University Press, 2002, pp. 35-44.
U.S. Appl. No. 13/327,472, filed Dec. 15, 2011, Hall.
U.S. Appl. No. 13/333,084, filed Dec. 21, 2011, Hall.
U.S. Appl. No. 11/264,834, filed Nov. 1, 2005, Hall.
U.S. Appl. No. 13/277,895, filed Oct. 20, 2011, Hall.
U.S. Appl. No. 13/563,429, filed Jul. 31, 2012, Hall.
U.S. Appl. No. 13/712,353, filed Dec. 12, 2012, Hall.
Corbett, et al. "A Partitioned Power and Location Aware MAC Protocol for Mobile Ad Hoc Networks," Technical Report No. 553, University of Sydney, School of Information Technologies, Jul. 2004, 7 pages.
Balasubramaniam, et al. "Interactive WiFi Connectivity for Moving Vehicles," Proceedings of SIGCOMM, Aug. 17-22, 2008, 12 pages.
Das, et al. "SPAWN: A Swarming Protocol for Vehicular Ad-Hoc Wireless Networks," Proceedings of $1^{81}$ ACM Vanet, Oct. 2004, 2 pages.
German Aerospace Center, Simulation of Urban Mobility, 2010, http://sumo.sourceforge.net, 1 page.
Gupta, et al., "The Capacity of Wireless Networks," IEEE Transactions on Information Theory, 46(2), Mar. 2000, 17 pages.
Hadaller, et al., "Vehicular Opportunistic Communication Under the Microscope," Proceedings of MobiSys, Jun. 11-14, 2007, 206-219.
Heissenbuttel, et al., "BLR: Beacon-Less Routing Algorithm for Mobile Ad-Hoc Networks," Elsevier's Computer Communications Journal, 27, 2003, 15 pages.
Hall, et al., "A Tiered Geocast Protocol for Long Range Mobile Ad Hoc Networking," Proceedings of the 2006 IEEE Military Communications Conf., 2006, 8 pages.
Hall, "Cheating Attacks and Resistance Techniques in Geogame Design," Proc. 2010 ACM FuturePiay Symposium, 2010, 82-89.
Hall, "An Improved Geocast for Mobile Ad Hoc Networking," IEEE Transactions on Mobile Computing, 2010, 1-14.
Hull, et al., "CarTel: A Distributed Mobile Sensor Computing System," Proceedings of ACM SenSys, Nov. 2006, 14 pages.
Eriksson, et al., "Cabernet: Vehicular Content Delivery Using WiFi," Proceedings of Mobicom, Sep. 2008, 12 pages.
Karp, et al, "GPSR: Greedy Perimeter Stateless Routing for Wireless Networks," Proceedings of Mobicom, 2000, ACM 2000, 12 pages.
Kuhn, et al., "Geometric Ad-Hoc Routing: of Theory and Practice," Proc. 2003 Symposium on Principles of Distributed Computing, ACM 2003, 10 pages.
Lee, et al., "CarTarrent: A Bit-Torrent System for Vehicular Ad-Hoc Networks," Mobile Networking for Vehicular Environments, Sep. 2007, 6 pages.
Lee, et al., "Efficient Geographic Routing in Multihop Wireless Networks," Proc. MobiHoc 2005, ACM, 2005, 12 pages.
Ni, et al., "The Broadcast Storm Problem in a Mobile Ad Hoc Network," Proceedings of the $5^1$ Annual ACM/IEEE International Conference on Mobile Computing and Networking, ACM, 1999, 151-162.
Niculescu, et al., "Trajectory Based Forwarding and Its Applications," Proc. Mobicom 2003, ACM, 2003, 13 pages.
Ns-2, "The Network Simulator," 2010, http:i/isi.eduinsnam/ns, 2 pages.
Panta, "GeoV2V: Vehicular Communications Using a Scalable Ad Hoc Geocast Protocol," AT&T Labs Research, 14 pages.
Yassein, et al., "Performance Analysis of Adjusted Probabilistic Broadcasting in Mobile Ad Hoc Networks," Proc. $11^1$ hInti. Conf. On Parallel and Distributed Systems Workshops, 2005, 27 pages.
Zorzi, et al., "Geographic Random Forwarding (GeRaF) for Ad Hoc and Sensor Networks: Multihop Peformance," IEEE Transactions on Mobile Computing, Dec. 2003, 11 pages.
Ko, et al., "Flooding-Based Geocasting Protocols for Mobile Ad Hoc Networks," Mobile Networks and Applications, Dec. 2002, 7, 471-480.
Social + Gaming—SWiK:, 2009, http://swik.net/social+ gaming.
What Wii games can I play over the internet with my family?How?, http://askville.amazon.com/Wii-games-play-Internet-Family/AnswerViewer.do?requestId=6796582(2007).
Schutzberg, "Phone-based GPS-based Games: Missing Pieces"; http://www.directionsmag.com/articlephp?article_id=939 (Aug. 17, 2005).
Hall, "RTEQ: Modeling and Validating Infinite-State Hard-Real-Time Systems", AT&T Labs Research, ASE 2007, Nov. 2007, 4 pages.
Illyas, "Body Personal, and Local Ad Hoc Wireless Networks", Chapter 1, CRC Press, 2003, 22 pages.
Ko et al., "Geocasting in Mobile Ad Hoc Networks: Location-based Multicast Algorithms", Technical Report TR-98-018 Texas A&M University, Sep. 1998.
Liao et al., "GRID: A Fully Location-Aware Routing Protocol for Mobile Ad Hoc Networks", Telecommunication Systems, 2001, 18, pp. 1-26.

(56) References Cited

OTHER PUBLICATIONS

Shih et al., A Distributed Slots Reservation Protocol for QoS Routing on TDMA-based Mobile Ad Hoc Networks, 2004, (ICON 2004), Proceedings, $12_h{}^1$, IEEE International Conference, Nov. 2004, 2, 660-664.

Shih et al., "CAPC: A Collision Avoidance Power Control MAC Protocol for Wireless Ad Hoc Networks", IEEE Communications Letters, Sep. 2005, 9(9), 859-861.

Tseng et al., "Fully Power-Aware and Location-Aware Protocols for Wireless Multi-hop Ad Hoc Networks", Proc. Of IEEE Intl. Conference on Computer Communications and Networks (ICCCn), 2002, 6 pages.

LBS Globe—Your definitive source for location-based services information Location-Enabled Mobile Gaming; http://www.nn4d.com/site/global/market/affiliate_sites/lbsglobe/ibsappiications/mobilegamingjsQ (2007).

"Sony bigwig hints at GPS-enabled PSP games/Technology Space"; Dec. 22, 2008, http://www.vesp acious.com/sony:-bigwig-.

Hall et al., "A Two-Level Quality of Service Scheme for Collision based on Mobile Ad Hoc Networks", IEEE, 1-4244-1513-06/07,2007, 8 pages.

"Boost Mobile Introduces First Location-Based, GPS Games in US" http://www.physorg.com/news5824.html (Aug. 16, 2005).

Maihofer, "A Survey of Geocast Routing Protocols," IEEE Communications Surveys, Jun. 2004, 32-42.

Manvi, et al., "Performance Analysis of AODV, DSR, and Swarm Intelligence Routing Protocols in Vehicular Ad Hoc Network Environment," Proceedings of IEEE Future Computer and Communications, Apr. 2009, 21-25.

Schwingenschlogl, "Geocast Enhancements of AODV for Vehicular Networks," ACM SIGMOBILE Mobile Computing and Communications Review, Jun. 2002, 18 pages.

Shevade, et al., "Enabling High-Bandwidth Vehicular Content Distribution," Proceedings of CoNEXT 2010, Nov. 30-Dec. 3, 2010, 12 pages.

Strange New Products: GPS-enabled Cell Phone Games http://www.strangenewproducts.com/2005/08/gps-enabled-cell-phone-games.html (Aug. 15, 2005.

Various Authors, The Wikipedia page for the "snake" computer game, Nov. 3, 2008 version, Wikipedia.com, downloaded by the USPTO from http://en.wikipedia.org/w/index.php?title=Snake_(video_game)&oldid=249370716 on Oct. 4, 2012.

Zahn, et al., "Feasibility of Content Dissemination Between Devices in Moving Vehicles," Proceedings of CoNEXT 2009, Dec. 1-4, 2009, 11 pages.

U.S. Appl. No. 13/875,735, filed May 2, 2013, Hall.

U.S. Appl. No. 13/890,423, filed May 9, 2013, Hall.

Nickles et al., "On building location aware applications using an open platform based on the NEXUS Augmented World Model," Software and Systems Modeling, Dec. 2004, 3(4), 303-313.

Nintendo, The computer game "Mario Kart OS", released in North America on Nov. 14, 2005, published by Nintendo, as evidenced by the game FAQ by Alex, downloaded from http://db.gamefaqs.com/portable/ds/file/mario_kart_ds_h.txt, with a game FAQ reported upload date of Jul. 15, 2007, p. 11.

Winkler, Additional date evidence for the Ars Electronica organization archive document http://archive.aec.at/submission/2004/U19/1043/, retrieved from http://web.archive.org/web/20050508084628/http://www.aec.at/en/archives/prix_archive/prixproject.asp?iProjectID=12899, 2005, 1 page.

Winkler, The computer game "GPS::Tron", as evidenced by the Ars Electronica organization archive document http://archive.aec.at/submission/2004/U19/1043/, where the document has an earliest archive.org verified publication date May 4, 2005, pp. 1-2.

Hall, "Combinatorial Communications Modeling of Real-Time Engagement Adjudication Architectures", 2005 IEEE Military Communications Conference, Oct. 2005, vol. 3, 1488-1494.

Harris, RF-6920 C2CE-CNR Situational Awareness Application Brochure, downloaded from http:/ /rf. harris.com/media/R F-6920 tcm26-9172.pdf, Nov. 2008, 2 pages.

Kaplan, et al., "The Analysis of a Generic Air-to-Air Missile Simulation Model", NASA Technical Memorandum 109057, Jun. 1994, 48 pages.

Trivette, Sensor integration for the One Tactical Engagement Simulation System (One TESS), downloaded from http://vault.swri .org/cms/papers/3793 Presentation_2005 SensorsGov OneTESS.pdf, 2005, 28 pgs.

U.S. Appl. No. 14/279,441, filed May 16, 2014, Hall.

\* cited by examiner

FIGURE 4
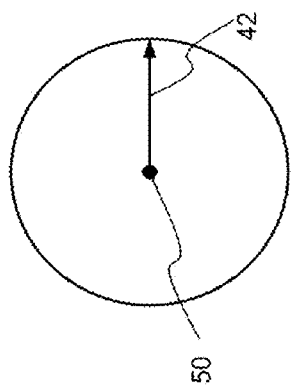
Figure 4A
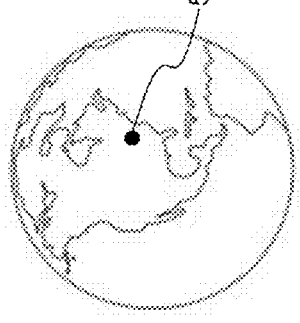
Figure 4C
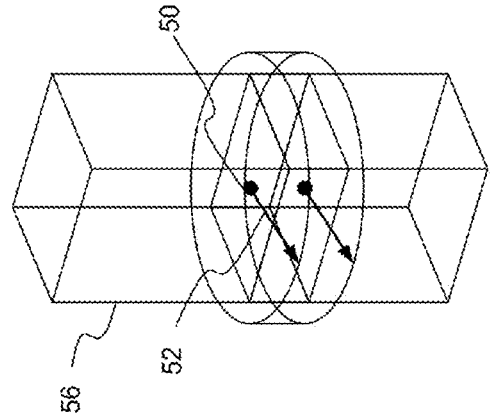
Figure 4B
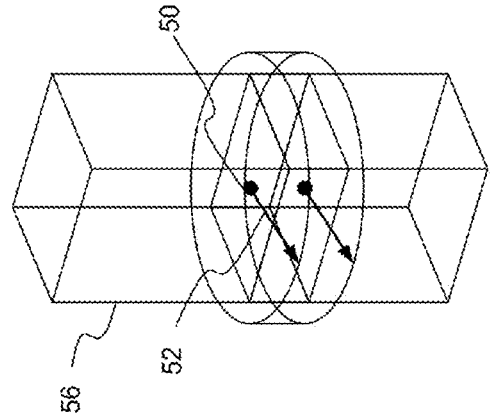
Figure 4D
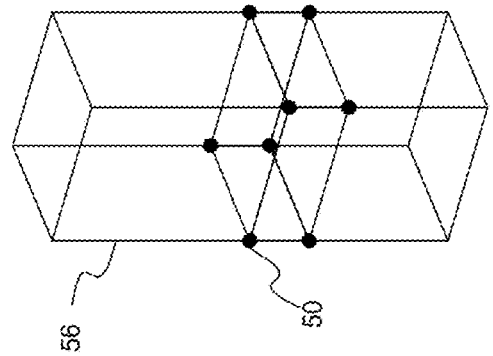
Figure 4E

GEOCAST PROTOCOL FOR WIRELESS SENSOR NETWORK

CROSS-REFERENCE TO RELATED APPLICATIONS

The instant application claims benefit to U.S. provisional patent application No. 61/711,397, filed Oct. 9, 2012. U.S. provisional patent application No. 61/711,397 is incorporated by reference herein in its entirety.

TECHNICAL FIELD

The technical field generally relates to wireless communications, and more specifically to wireless sensor networks.

BACKGROUND

Geographic broadcasting, often referred to as geocast, allows a device to send information to all other devices in a given geographic region. Propagation of information via geocast is not always robust. For example, unreliable wireless links, the number of radio transmission by devices in the geographic region, the number of devices in a geographic region, and power utilization can adversely affect robustness.

SUMMARY

The following presents a simplified summary that describes some aspects or embodiments of the subject disclosure. This summary is not an extensive overview of the disclosure. Indeed, additional or alternative embodiments of the subject disclosure may be available beyond those described in the summary.

Systems, methods, and protocols for providing location-based communication services in wireless sensor networks (WSNs) are described herein. An example system comprises a wireless ad-hoc geocast communication protocol (referred to as SGcast herein) that allows a device (e.g., a sensor node) to send messages to all devices in a given geographical region without the devices having knowledge about which devices are present in the region at the time of communication. A destination device (also referred to as a node) may be located outside the radio transmission range of a source device. Thus a geocast message may be forwarded by intermediate devices in multiple hops to the destination device.

The herein described systems, methods, and protocols for implementing wireless sensor networks (WSNs), also referred to herein as geocast for WSNs, comprise dynamic selection of forwarding devices (or nodes), dynamic forwarding decisions, and intelligent backoff.

Dynamic selection of forwarding nodes limits the number of transmissions by dynamically selecting the devices that forward a message. A novel concept, referred to as negative hops, is a communication hop that causes a geocast packet to diverge away from a destination region. Limiting the number of radio transmissions can reduce energy consumption and dynamically selecting the nodes that forward geocast messages allows for a sufficient number of transmissions to overcome any wireless link failures.

Dynamic forwarding decisions implement different heuristics for different nodes. Rather than depending on static heuristics to decide whether a node should forward a geocast packet, dynamic forwarding decisions use different heuristics depending on the amount of progress the packet has made towards the destination region. In an example embodiment, the severity of heuristics used by a node to make a packet forwarding decision is proportional to the number of negative hops a packet has traversed.

According to the herein described intelligent backoff scheme, nodes which are closer to a destination region backoff for a shorter period of time than those which are further away from the destination region. As a result, unnecessary radio transmissions may be suppressed and yet the geocast messages may progress towards the destination region quickly.

Using negative hops, different forwarding rules based on propagation characteristic of geocast packets, intelligent backoff schemes, SGcast may simultaneously achieve reliability, low energy consumption, robustness to network conditions, and no use of control traffic.

BRIEF DESCRIPTION OF THE DRAWINGS

Reference is made here to the accompanying drawings, which are not necessarily drawn to scale.

FIG. 4, comprising FIG. 4A, FIG. 4B, FIG. 4C, FIG. 4D, and FIG. 4E depicts example geocast regions or boundaries.

DETAILED DESCRIPTION OF ILLUSTRATIVE EMBODIMENTS

Figure 1:
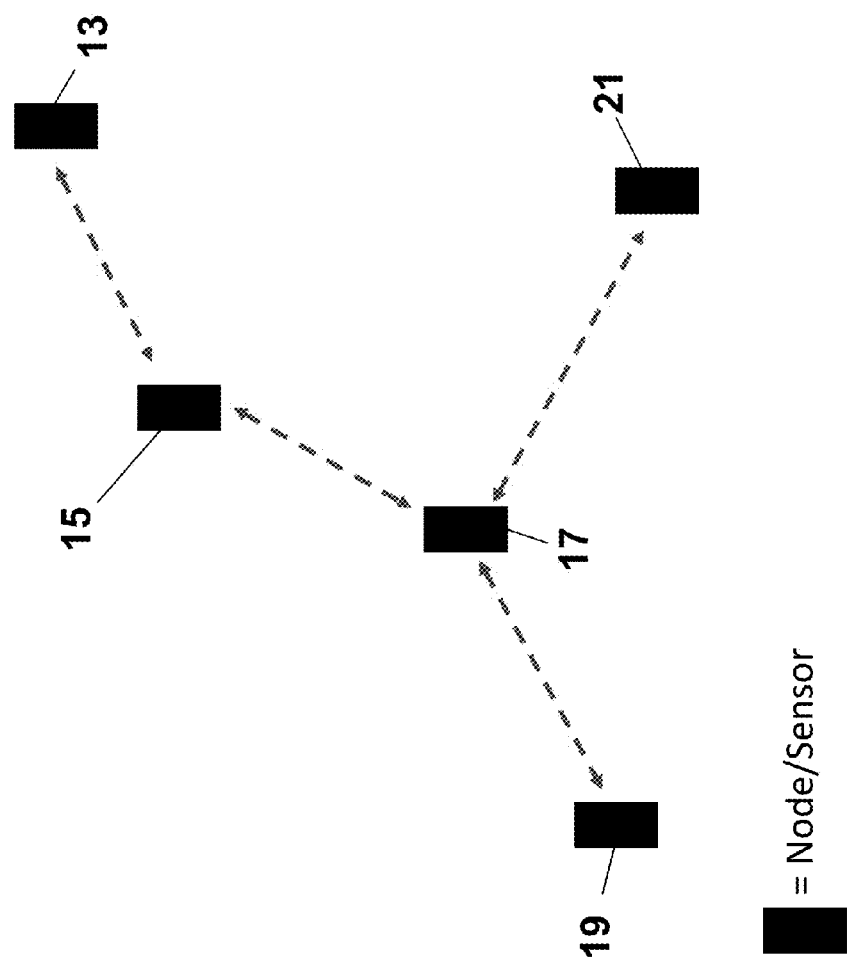
FIG. 1 illustrates an example mobile ad hoc network in which a mobile device configured to implement the SGcast protocol may be implemented.

Aspects of the instant disclosure are described more fully herein with reference to the accompanying drawings, in which example embodiments are shown. In the following description, for purposes of explanation, numerous specific details are set forth in order to provide an understanding of the various embodiments. However, the instant disclosure may be embodied in many different forms and should not be construed as limited to the example embodiments set forth herein. Like numbers refer to like elements throughout.

Various embodiments of geocast for WSNs, and implementation mechanisms for geocast for WSNs are described herein. The described embodiments are merely examples that may be embodied in various and alternative forms, and combinations thereof. As used herein, for example, "exemplary," and similar terms, refer expansively to embodiments that serve as an illustration, specimen, model, or pattern, and should not be construed to mean preferred or advantageous over other aspects or designs, nor is it mean to preclude equivalent exemplary structures and techniques known to those of ordinary skill in the art. The figures are not necessarily to scale and some features may be exaggerated or minimized, such as to show details of particular components. In some instances, well-known components, systems, materials, or methods have not been described in detail in order to avoid obscuring the instant disclosure. Therefore, specific structural and functional details disclosed herein are not to be interpreted as limiting, but rather as a basis for the claims and as a representative basis for teaching one skilled in the art how to employ the teachings instant application in various ways.

While the descriptions include a general context of computer-executable instructions, geocast for WSNs also may be implemented in combination with other program modules and/or as a combination of hardware and software. The term "application," or variants thereof, is used expansively herein to include routines, program modules, programs, components, data structures, algorithms, and the like. Applications can be implemented on various system configurations, including single-processor or multiprocessor systems, minicomputers, mainframe computers, personal computers, handheld computing devices, microprocessor-based, programmable consumer electronics, combinations thereof, or the like.

In an example embodiment, geocast for WSNs may be implemented via a scalable, wireless, geographic multicast ("geocast") protocol. Geocast for WSNs may be implemented over an ad hoc network of mobile communications devices (nodes), eliminating the need for traditional mobile communications infrastructure and central servers. Because no network infrastructure is required, geocast for WSNs may be implemented in remote areas with little or no network access. The scalable nature of the geocast protocol can enable implementation of geocast for WSNs equally well in both remote areas and crowded areas containing members of a field operations team and other users of mobile communications devices. Geocast for WSNs also may be implemented using tiered geocasting which can span great distances. For example, geocast for WSNs may span separate continents.

Nodes taking part in geocast for WSNs may be programmed with a geocast for WSNs application, which uses geolocation information obtained from a locating system, such as, for example, a global positioning system (GPS), or the like.

The geocast for WSNs application of each node may use movement data from an inertial unit, or the like, of the node.

The scalable tiered geocast communication protocol may be programmed into each node taking part in geocast for WSNs, and any node that operates to relay communications to or from the nodes taking part in geocast for WSNs. The nodes taking part in geocast for WSNs may share changed situation conditions, such as node geolocation, between them via geocast data packets transmitted over one or both of a first tier, short-range, network, and a second tier, long-range, network according to transmission heuristics of the tiered geocast protocol.

In an example embodiment, each node taking part in geocast for WSNs may be programmed with the scalable tiered geocast communication protocol. One example of a type of scalable protocol is the mobile ad hoc network geocast protocol. Using the tiered geocast protocol, the SGcast protocol may be occasioned in all types of network scenarios, including those in which relevant areas are densely populated with participating nodes, those in which areas are sparsely populated, and even in areas long-range infrastructure such as cell towers, Wi-Fi hotspot or other internet router are not reachable by the nodes.

Geocast protocols differ from a traditional Internet protocol (IP) such as the uniform datagram protocol (UDP) in that messages are addressed to a destination geocast region instead of an IP address, such as an UDP address. Utilizing the geocast protocol, nodes in a target region do not need to register to a group address, as required of some other protocols. In some example embodiments, each geocast data packet can be assigned, at origination, a globally unique packet serial number. The unique packet serial number can be read by participating devices according to the protocol to, for example, determine whether a particular data packet is being received for a first time or has been received before. The packet serial number and all other packet information may be positioned in a header or body of the data packet.

The geocast for WSNs application may be, in some embodiments, configured to store pre-set or previously identified geocast destination, locations, boundary, region, or the like.

Geocast data packets can be transmitted according to heuristics of a tiered geocast protocol, which is described in more detail herein, to a destination geocast region for reception by all devices located in the region that are programmed with the geocast protocol, i.e., participating devices.

Although basic geocasting over only a single network (e.g., long-range network) can enable communications in some situations where traditional networking is impractical or inadequate, it may be that, in some embodiments, one may selectively geocast over one or more of two or more networks (i.e., tiers) versus the flat configuration of a single network. The tiered geocast protocol of the present disclosure improves on single-network geocasting by providing the heuristics, or decision rules, for selectively propagating geocast data packets within a relatively short-range, peer-to-peer network, and bridging packets onto a long-range network for long-distance transport depending on various circumstances. Each participating node and other nodes (e.g., Wi-Fi access point or other router) can have forwarding rules, including geographical parameters, and a look-up table for use in implementing the rules.

In an example embodiment, the geocast system can be configured such that a transmitting node receives a confirmation that a geocast data packet was transmitted successfully. For example, it is contemplated that at least one of the nodes in a geocasting destination region, even if not a node actively participating, could return geocast a confirmation data packet indicating that the packet was received by a node in the region. In one contemplated embodiment, although the protocol is based on a geographical address and not a device-specific address, a device-specific address of a target node participating is included in a geocast and the target node initiates inclusion in a return geocast data packet of a confirmation of receipt message to the originating node.

In addition, in some embodiments, a geocast data packet can include one or more fields, such as in a header or body of the packet, in which information related to a path taken by a packet is recorded. For example, a receiving node (e.g., node or Internet router) receiving a geocast can retrieve data from the geocast header to identify an ordered list of the nodes whose transmissions led to the receiving node receiving it. In this way, path discovery may be integrated into the transmission process. Any node can also use this information to send a source-routed unicast back to any node along the path, which is termed reverse-path forwarding (RPF).

Although a two-tiered communication system, including a first short-range peer-to-peer network and a long-range network, is described herein, the SGcast protocol may be implemented in connection with a protocol and communication system using other types of networks as well as or instead of those described herein, and in connection with more than two network tiers.

Propagations over the short-range network can be made between devices programmed with the scalable tiered geocast protocol, whereby adjacent devices are within range of each other, such as radio range (e.g., 100 meters). The nodes and tiered geocast protocol can be configured to transmit geocast data packets over one or more short-range networks, including existing wireless local area networks (WLANs), such an IEEE 802.11 network. As an example, when a first node is about 900 meters from an edge of a geocasting region including a second node, a geocast data packet from the first device could be broadcasted and participating intermediate devices could receive and retransmit the geocast data packet until it reached the geocast region, without need for transmission over an Internet router or other base station. In this example, depending on the location of a retransmitting device, the geocast data packet can be broadcast to the geocast region in one or two hops.

Geocast for WSNs may be particularly suited to highly mobile devices without requiring connection to an infrastructure-based communications network. A mobile ad hoc network is an example of such a set of devices. Mobile ad hoc networks can extend the reach of data networking into areas and scenarios in which infrastructure-based networking is impossible or impractical. For example, mobile ad hoc networks can allow first responders to use networked messaging and information applications in a zone where the network infrastructure has been destroyed by a disaster. Mobile ad hoc networks can provide military units operating in battlefield situations lacking infrastructure the same types of benefits as infrastructure-based networks. Mobile ad hoc networks can allow networking among low resource nodes, such as man-worn devices powered by lightweight wearable batteries, by allowing units to relay each other's short-range transmissions, instead of each unit transmitting long range directly to the destination.

To better understand the SGcast protocol and applications thereof, a description of mobile ad hoc networks is provided. In is to be understood however, that applications of the SGcast protocol are not limited to mobile ad hoc networks. Rather, the SGcast protocol is applicable to any appropriate device or group of devices.

A mobile ad hoc network can comprises communications devices (also referred to as nodes) that communicate with each other via geographical broadcasting, referred to as geocasting. Geocasting is described in U.S. Pat. No. 7,525,933, entitled "System And Method For Mobile Ad Hoc Network," filed Nov. 30, 2005, issued Apr. 28, 2009, and is incorporated by reference herein in its entirety. Geocasting can use a protocol in which an IP address is replaced with a geographic address. Thus, each geocast message can comprise an indication of a location of a geographic region of intended reception of the geocast message. Generally, a packet may be sent to every communications device located within a specific geographic region. The packet can contain an indication of the location of the sender, an indication of the geographic region, a payload, or a combination thereof, or the like. The communications devices in the geographic region, and any other communications devices that can communicate with them, are referred to, collectively, as a mobile ad hoc network. No registration need be required to become a member of the mobile ad hoc network. Any communications device in the mobile ad hoc network can send a message to any or every communications device in the mobile ad hoc network. As communications devices move within communications range of any member of the mobile ad hoc network, they can become members of the mobile ad hoc network without requiring registration. The communications devices of the ad hoc network of communications devices may communicate with each other. The ad hoc network of communications devices does not require base station terminals to control communications between the mobile devices. In example embodiments, base stations or routers may be used to relay messages between different mobile ad hoc networks, or to use other network transports such as other traditional internet protocol networks, such as the internet, to bridge messages between mobile ad hoc networks. Each communications device may be capable of receiving and/or transmitting data packets to and/or from other communications devices in the mobile ad hoc network.

In an example embodiment, a communications device can transfer packets to other communications devices according to heuristic decision rules that determine whether a receiving device will re-transmit a received packet. These rules can effectively guide packets to their destinations and control communication traffic within the ad hoc network. The decision rules can achieve this control by using statistics obtained and recorded by a communications device as it receives packets transmitted within reception range within its environment. This distributed packet transfer mechanism cab result in packets "flowing" to and throughout the geocast region specified in each packet. The communications devices in the geocast region can receive and process each distinct packet, typically rendering the content to the user via a user interface of a communications device. Two packets may be distinct if they contain distinct geocast identifiers. However, a re-transmitted copy of a packet generally will contain the same geocast identifier as the original packet.

FIG. 1 illustrates an example mobile ad hoc network in which a mobile device configured to implement the SGcast protocol may be implemented. Communications devices, also referred to herein as devices, mobile devices, or nodes, in the mobile ad hoc network can communicate via RF encoded with geographic information, via Bluetooth technology, via Wi-Fi (e.g., in accordance with the 802.11 standard), or the like, or any combination thereof. For example, as depicted in FIG. 1, communication devices (nodes) 13, 15, 17, 19, and 21 can form a mobile ad hoc network. As shown in FIG. 1, communication device 13 can communicate with communications device 15 directly (e.g., via Bluetooth). Communication device 15 can communicate with communications device 17, and thus can retransmit information received from communications device 13 to communications device 17, and vice versa (retransmit information received from communications device 17 to communications device 13). Communications device 17 can communicate with communications devices 19 and 21, and can relay information from/to communications devices 19 and/or 21 to/from communications devices 13 and/or 15.

Although not depicted in FIG. 1, it is possible, in a mobile ad hoc network, that, for a pair of nodes (A and B for example), node A can receive from node B but node B cannot receive from node A. In an example embodiment, this asymmetric style of communication may be potentially likely in a mobile ad hoc network.

In an example embodiment, communications devices that receive a message can retransmit the message in accordance with the scalable wireless geocast protocol. For example, a communication device's ability to retransmit a message can be based on the number of times the message was previously received, the communication device's proximity with respect to the communications devices from which the message was sent, and/or the communication device's proximity to the geocast region. This can be implemented as a three step location-based approach, which is described in detail in the aforementioned U.S. Pat. No. 7,525,933. First, in accordance with the location-based approach, the receiving communication device determines whether it has previously received the same query/response at least a predetermined number (N) of times. If not, it retransmits the query/response over the ad hoc network of communications devices. If so, the communications device progresses to the second step and determines whether the sending communications device is closer than some minimum distance away. If no prior transmitter of the query/response was closer than some minimum distance away, the communications device retransmits the query/response over the ad hoc network of communications devices. Otherwise, the communications device progresses to the third step and determines whether it is closer to the center of the geocast region than any sending communications device from which the query/response was received. If so, the communications device transmits the query/response over the ad hoc network of communications devices. If not, the communications device does not retransmit the query/response.

This location-based approach prevents the receiving communications device from retransmitting a message that was most likely already retransmitted by another communications device located close to it (and thus most likely reaching the same neighboring communications devices that it can reach). In addition, this location-based approach reduces the chance that the communications device will retransmit the same message multiple times to the same neighboring communications devices.

As mentioned above, a mobile ad hoc network does not require a communications network infrastructure or a Wi-Fi access point. However, in an example configuration, a mobile ad hoc network can utilize Wi-Fi access points and/or a communications network infrastructure.

Figure 2:
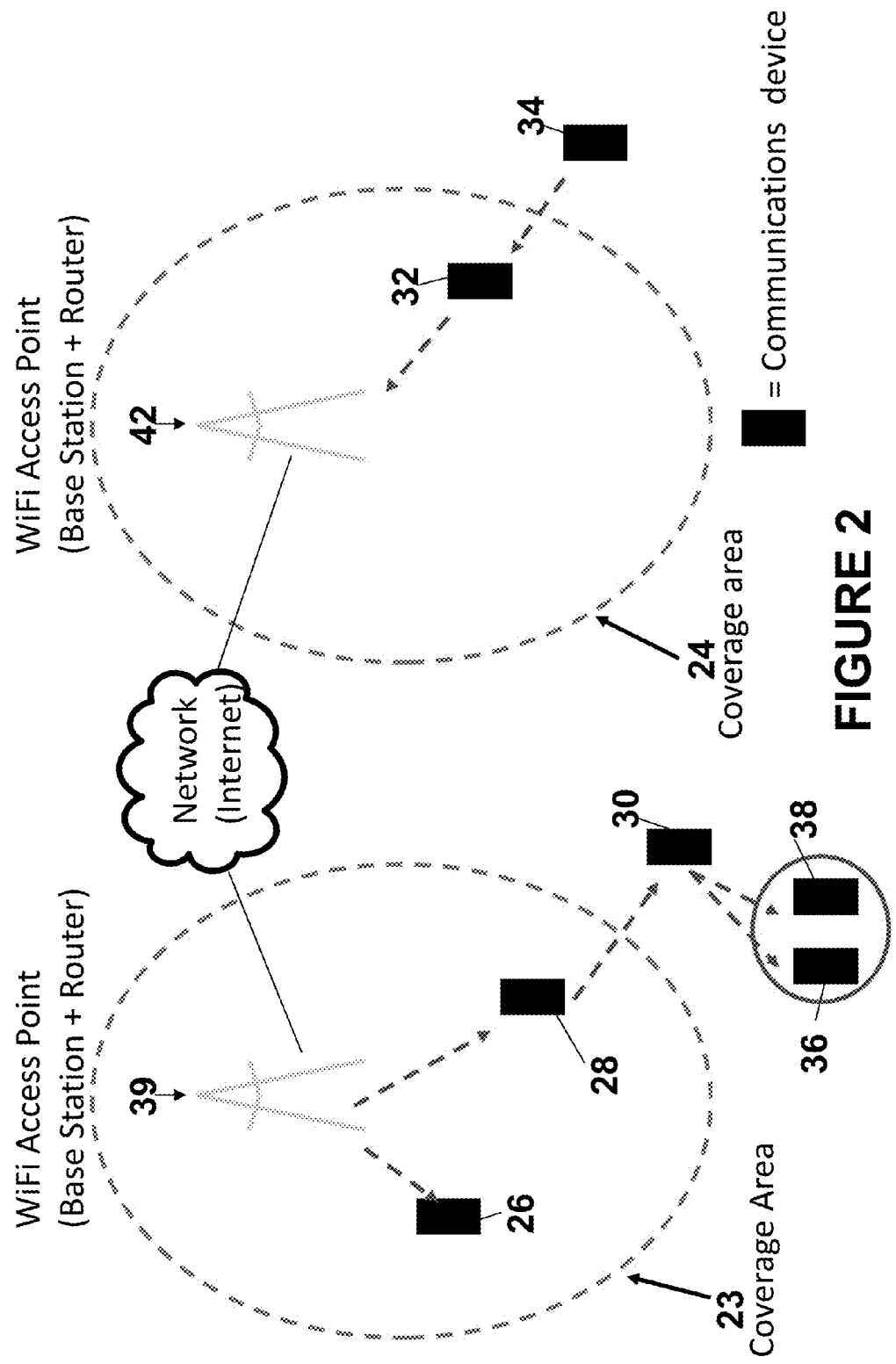
FIG. 2 illustrates an example ad hoc network utilizing a Wi-Fi access point.

FIG. 2 illustrates an example ad hoc network utilizing a Wi-Fi access point. As depicted in FIG. 2, communication devices 26, 28, 30, 36, and 38 form a mobile ad hoc network and communication device 32 and 34 form another mobile ad hoc network. Coverage area 23, which is the area covered by a Wi-Fi access point 39, covers communication devices 26 and 28. Coverage area 24, which is the area covered by another WiFi access point 42 covers communication device 32. As shown in FIG. 2, communication device 34 transmits to communication device 32 directly (e.g., via Bluetooth). Communication device 32 retransmits to a WiFi access point 42 which in turn may retransmit to the other WiFi access point 39 via a network such as the Internet, for example. Communication devices 26 and 28 receive the transmission from the WiFi access point 39, and communication device 28 retransmits directly to communication device 30. And, as depicted, communication device 30 retransmits to other communication devices 36 and 38.

Figure 3:
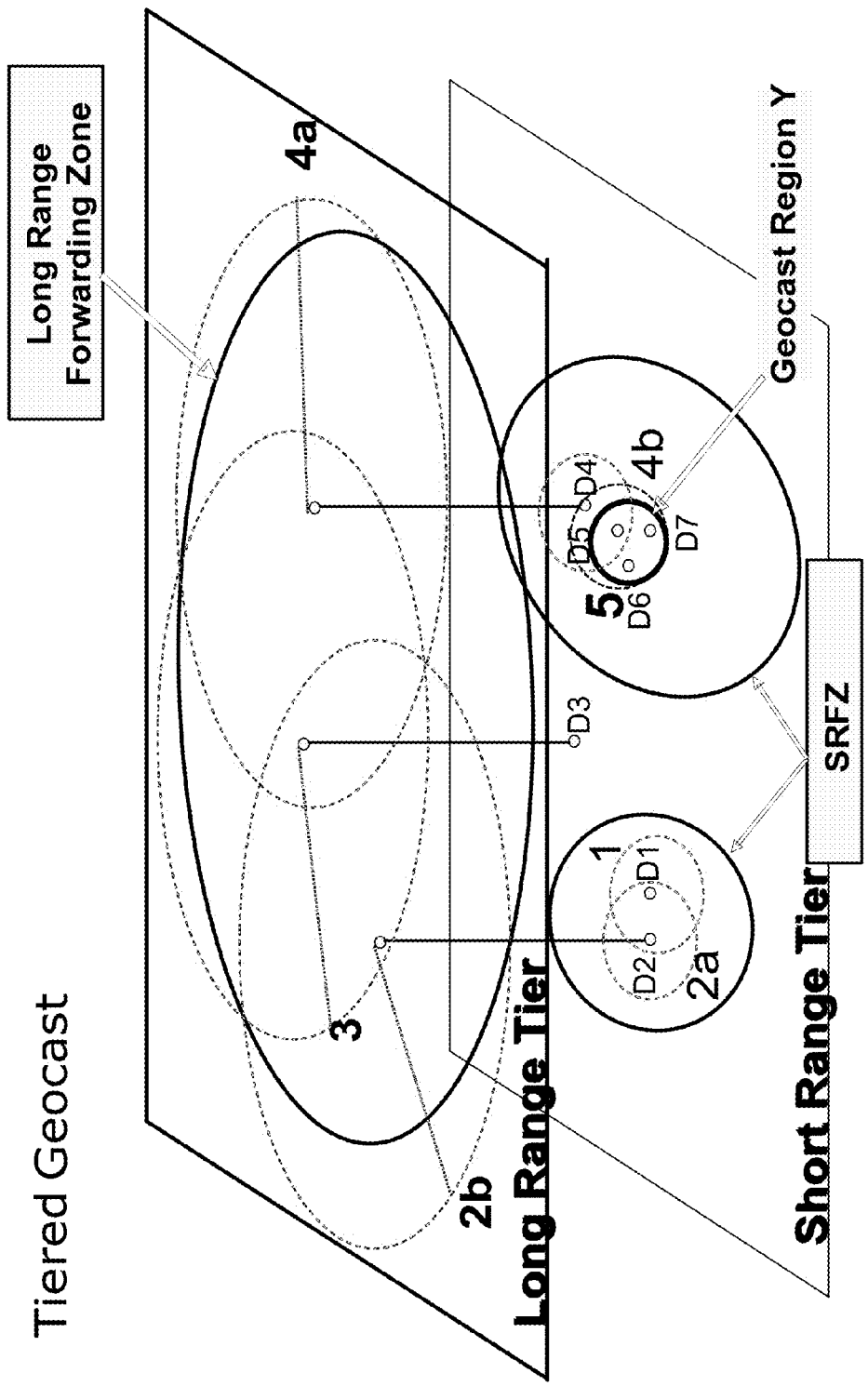
FIG. 3 illustrates an example mobile ad hoc network in which the SGcast protocol may be implemented utilizing tiered geocasting and forwarding zones.

FIG. 3 illustrates an example mobile ad hoc network in which the SGcast protocol may be implemented utilizing tiered geocasting and forwarding zones. Tiered geocasting uses long range (LR) transmitters (such as communications devices, etc.), infrastructure, a communications network, a cellular tower, or a combination thereof, when available. Tiered geocasting assumes that at least one tier is usable by at least one of the communications devices. A long range tier is a tier wherein characteristic message transfers between devices occur over a longer physical range than those over some other tier. A long range tier can be wireless, wired, or a combination thereof.

A forwarding zone can be utilized to implement tiered geocasting. A common forwarding zone can be defined for all geocast packets or different forwarding zones can be defined for each type of geocast packet. Forwarding zones (as shown in FIG. 3, for example and without limitation) can be defined differently in different tiers, even for the same packet type or even same packet. Thus, forwarding heuristics can be applied independently per tier, with bridging at multi-tier capable nodes. In an example embodiment, a communications device retransmits a packet only if the communications device is located within the forwarding zone defined for the packet's type. This determination is in addition to the determinations described above and, if the communications device is not in the forwarding zone, the packet will not be retransmitted, even if one or more of the above conditions would otherwise have caused a retransmission hold.

As depicted in FIG. 3, nodes (e.g., communications devices) D1, D2, D3, D4, D5, D6, and D7, are at various locations within short range (SR) and long range (LR) tiers. All of devices D1, D2, D3, D4, D5, D6, and D7 together form a mobile ad hoc network, with devices D5, D6, and D7 being located in geocast region Y, hence being targets of a message sent by D1. Each communications device D1, D2, D3, D4, D5, D6, and D7 can determine its own geographical location through any type of location determination system including, for example, the Global Positioning System (GPS), assisted GPS (A-GPS), time difference of arrival calculations, configured constant location (in the case of non-moving nodes), any combination thereof, or any other appropriate means. Each communications device is operable to transmit and receive packets on a mobile ad hoc network. In addition, at any given time, some subset (possibly all) of the communications devices may be operable to transmit and receive packets over the long range tier network. For example, though not a limitation, in FIG. 3, devices D2, D3, and D4 can transmit and receive messages over both the short and long range tiers. Note that this latter fact is indicated visually in the diagram by D2, D3, and D4 each having two dots (one in the short range tier and one in the long range tier) connected by a vertical line. The long-rang tier network can be any network in which packets can be transmitted from one long range capable communications device to another long range capable communications device. Such packet networks can include, for example, an infrastructure-based network comprising wireless base stations (for up- and down-link) operating on a separate frequency from that used by an ad hoc network. In addition, the long rang tier network also could be implemented simply as another instance of an ad hoc network using distinct radio frequencies and possibly longer radio ranges.

Communications device D1 transmits the message, and communications device D2 receives the transmission from communications device D1. Communications device D2 retransmits (transmission 2a), within the short range tier and in accordance with the heuristics for the short range forwarding zone (SRFZ) as well as within the long range tier (transmission 2b). Communications D2, with long range transmission capability (in the long range tier) retransmits in the long range tier as well (transmission 2b). Communications device D3 receives the transmission 2b from communications device D2 and retransmits (as transmission 3) in the long range tier only. Communications device D4 receives the transmission 3 from communications device D3 and retransmits both on the long and short range tiers, resulting in transmission 4a in the long range tier and 4b in the short range tier. Communications device D5, within geocast region Y, receives the transmission 4a, and in turn retransmits (transmission 5) within the geocast region Y. Transmission 5 is received by the other devices in geocast region Y, namely devices D6 and D7, thus completing the geocast message transfer.

Geocast origination, destination, and termination regions can be defined by geographic parameters and may have any size and shape. As examples, the regions may be defined by three or more bounding geographic coordinates, forming a triangle, rectangle, or other shape, or a single geographic coordinate and a radius or diameter, forming a geocast region.

FIG. 4, comprising FIG. 4A, FIG. 4B, FIG. 4C, FIG. 4D, and FIG. 4E depicts example geocast regions or boundaries. A geocast region may be defined to be a single point 50, as depicted in FIG. 4A. A point geocast region may be defined by a longitude value and a latitude value (not shown). A point above the surface of the earth could be defined by providing an altitude value in addition to longitude and latitude values. A geocast region may also comprise multiple single points (not shown) such as the single point 50. Location points such as point 50 may be used as the building blocks for more complex geocast region geometries, as described herein. FIG. 4B depicts a geocast region defined by a point 50 in combination with a radius 52. The geocast region of this example may comprise the area enclosed by the radius, and may include the space above the area as well. A geocast region could also be defined as the overlap region between two or more circular geocast regions (not shown). FIG. 4C depicts a more complex geometry formed from a series of points 50 interconnected with straight boundary lines. This technique of geocast region definition is similar to the techniques typically used in the definition of parcels of real property. FIGS. 4D and 4E depict the creation of one or more geocast regions within a single geographic footprint. FIG. 4D depicts creating a geocast region for a specific floor of a building 56. The single floor geocast region is defined as the volume of space between upper and lower areas, each formed using a series of points 50 set at corners of the buildings. FIG. 4E depicts an alternate technique for defining a single floor geocast region in building 56. Upper and lower points 50 are defined in the middle of the ceiling and the floor of the geocast region respectively. The single floor geocast region is then defined as the volume of space between an upper area and a lower area defined by a pair of radii 52 extending from the middle points. Geocast regions may also be defined to change in size, geographic location, etc. with time (not shown), essentially allowing the creation of geocast regions in four dimensions. For example a region may be defined to change size, shape, and/or geographic location over time as the number of participating nodes fluctuates. Information defining a particular geocast region (e.g., a series of points) can be communicated in an addressing portion of a geocast message. Geocast subregions may be defined within a particular geocast region using the above techniques. It should be noted that the techniques described with reference to FIGS. 4A-4E are merely examples, and the scope of the instant disclosure should not be limited thereto. Other region geometries and techniques for defining regions may be recognized by those skilled in the art, and are meant to be included within the scope of the instant disclosure.

In some embodiments, a geocast region can be selected by making one or more selections on a map and/or from a list. A region can be selected from a list displayed on a mobile communications device, or the like. The list can comprise real world locations. For example, one can scroll through a list by touching the display surface of a mobile communications device, or the like, by providing a voice command (e.g., "Scroll List"), by entering text on which to search, by moving the device, or any appropriate combination thereof. In another example embodiment, the selection of a region, or the like can be made by selecting a location on the map by a finger, fingers, and/or any other appropriate device, and, for example, dragging away or gesture-pinching, from the selected location to create the size of the a circle, oval, rectangular, square, polygon, or any appropriate shape (two dimensional or three dimensional) representing a destination, termination, boundary, region, or the like. In various example embodiments, locations, such as addresses, and/or region dimensions, building names, institution names, landmarks, etc. may be input in other ways by a player, such as by typing, gesture, and/or voice input. Indeed, many variations of textual, graphical, and audio inputs, either alone or in combination, may be utilized for selecting a geocast region in accordance with example embodiments of the present disclosure.

As described above, geocast allows a sensor node to send messages to all nodes in a given geographical region without the sender node having any knowledge about which nodes are present in that region. Developing a robust geocast protocol for practical sensor networks takes several factors into consideration. For example, a goal could be that geocast messages be reliably delivered to the destination region in the presence of unreliable wireless links, a typical characteristic of practical sensor network deployments. The protocol could minimize the number of radio transmissions and avoid control traffic to save energy, which is a scarce resource in sensor networks. The protocol could be robust against a wide range of network densities. Described herein is the design, implementation, and evaluation of a reliable, robust, and energy-efficient geocast protocol that achieves these goals (referred to as SGcast herein).

Wireless Sensor Networks (WSNs) may comprise categories of protocols at the network layer. For example a collection protocol comprise be a many-to-one routing protocol which allows sensor nodes to send data (e.g., sensor readings) to one or a small number of collection points (e.g., base stations) in the network. A dissemination protocol may comprise a one-to-many protocol that allows a base station to disseminate information (e.g., code updates, network commands, etc.) to all or a subset of sensor nodes in the network. And a geocast protocol may allow a node to send messages to all nodes within a given geographic area without the sender node having any knowledge about which nodes are present in that area. The destination nodes may be located outside the radio transmission range of the source node. Thus the geocast message may be forwarded by intermediate nodes to the destination area.

WSNs provide the ability to assign location specific tasks to nodes. For example, using geocast, a user may instruct all nodes in an area where fire is spreading to report temperature readings at a fast rate. In many practical cases, it may be difficult or even impossible to know which nodes are present in a given area at a given time because of the ad-hoc nature of deployment (e.g., sensors dropped from an airplane), node mobility, incremental node deployment (addition of new sensors to the network to adapt to changing user and network requirements), large number of nodes, or the like. As a result, unicast or multicast communications may not be possible. Even if a user knows which nodes are present in a given area at a given time, sending separate unicast messages to each node in the area may be inefficient because of high bandwidth usage and energy consumption. Multicasting may be difficult because a sensor node may not know beforehand, which multicast groups it should be a member of. Thus geocast is a useful communication primitive in many practical scenarios.

As described herein geocast for WSNs utilizing SGcast may be reliable, robust, energy efficient, and not require traffic control. SGcast may exhibit reliability in that the protocol may achieve a high percentage of hits percentage, the percentage of sensor nodes in the destination area that successfully receive the geocast packets (hit %). The SGcast may exhibit robustness in that the protocol may be robust against a wide range of network conditions, such as link disparities and node densities, which are characteristics of practical WSNs. The SGcast may exhibit energy efficiency in that the protocol may use a small number of radio transmissions to save energy. The SGcast does not require traffic control to learn about the current network conditions and adapt the protocol accordingly because control packets incur additional energy and bandwidth overheads. SGcast is a geocast protocol that simultaneously achieves these four goals. SGcast is a very light-weight protocol that does not maintain neighbor tables or broadcast any control packets. Sensor nodes may use a set of local rules to make packet forwarding decisions, without requiring any local or global knowledge about the network.

SGcast may use various novel techniques to efficiently deliver geocast packets to nodes in the destination region. In various example embodiments, SGcast may utilize negative hops (a measure of divergence of geocast propagation from the destination area) to choose potential forwarding nodes such that redundant transmissions are avoided. SGcast may implement different rules for different nodes to make packet forwarding decisions based on the progress the packet has made towards the destination region. SGcast may apply an intelligent backoff scheme so that proper nodes may be chosen to forward the geocast packet, and transmissions from undesired nodes may be suppressed.

Using small number of radio transmissions and achieving a high hit % may be conflicting goals because of the forwarding node selection (FNS) problem. A geocast protocol may increase the number of forwarding nodes to combat inherent unreliability of wireless links in sensor networks to achieve a high hit %. However, this also may increase the total number of radio transmissions, and thus the energy consumption, in the network. On the other hand, decreasing the number of forwarding nodes may reduce energy consumption, but also may degrade hit %.

Although the use of forwarding zone may limit the number of redundant broadcasts, it essentially transforms the FNS problem to a problem of defining the forwarding zone. The size of the zone may be large enough to allow sufficient nodes to forward the packet to achieve a high hit %, and small enough to reduce the number of radio transmissions. Furthermore, the definition of forwarding zone may be a function of current network conditions, mainly node density and link qualities. In networks which are sparse or have bad links, a forwarding zone may be large, while in dense networks or networks with good links, a forwarding zone may be small. Since node density and link qualities may vary significantly in WSNs (both temporally and spatially), forwarding zones may be defined dynamically. Defining forwarding zones dynamically may be challenging because periodic control traffic may be utilized in order for sensor nodes to learn about the current network conditions. Moreover, knowledge about a single-hop neighborhood may not be sufficient. Current network conditions in an entire area between the originator node and the destination area may be known to define a good size and shape of the forwarding zone. It may be challenging for a node to obtain such semi-global information in WSNs with frequently changing network conditions.

Figure 5:
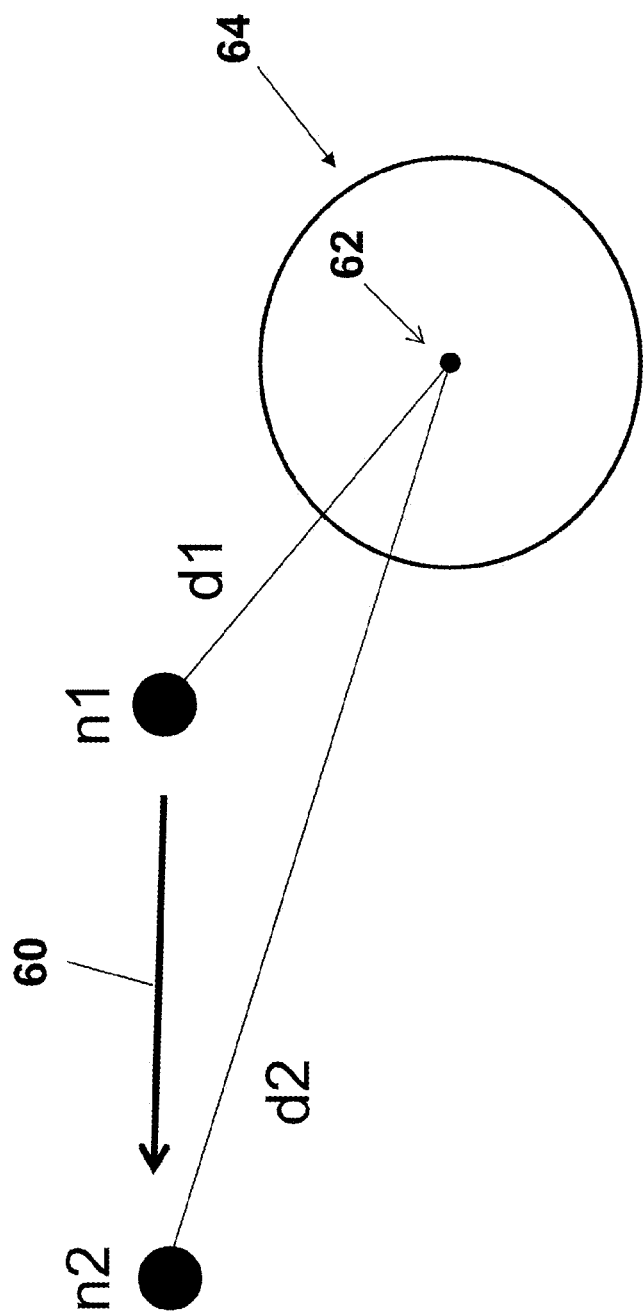
FIG. 5 is a diagram of an example depiction of a negative hop.

FIG. 5 is a diagram of an example depiction of a negative hop. Instead of defining forwarding zone explicitly, SGcast introduces a novel concept of a negative hop. A negative hop is a communication hop that may cause the geocast packet to diverge away from the destination region. For example, referring to FIG. 5, when a node n2 receives a geocast packet from a node n1, the n1 to n2 hop (indicated by arrow 60) is referred to as a negative hop if n1 is closer to the destination region than n2. As shown in FIG. 5, the distance from node n1 to the center 62 of the destination region 64 is d1. The distance from node n2 the center 62 of the destination region 64 is d2. As depicted in FIG. 5, d1 is less than d2, thus the n1 to n2 hop is a negative hop.

In various example embodiments of SGcast, the geocast packet header includes a NumNegHops field, which represents the number of negative hops a packet has traversed. The originator of the geocast packet may initialize the NumNegHops field to 0 (zero) and each intermediate node may increment the NumNegHops field if the neighboring node from which it received the packet is closer to the destination area than itself (in various example embodiments, the location of the transmitter also may be included in the geocast packet header). SGcast may limit the propagation of geocast beyond a threshold value n of NumNegHops. The threshold value of negative hops, n, may comprise any appropriate value, such as, for example, 0, 1, 2, etc. Thus by using NumNegHops, SGcast may implicitly learn about the current network conditions by using the propagation path already traversed by the geocast packet. The implicit forwarding zone defined by using NumNegHops is dynamic because the value of NumNegHops is a function of current network density and link qualities.

Figure 6:
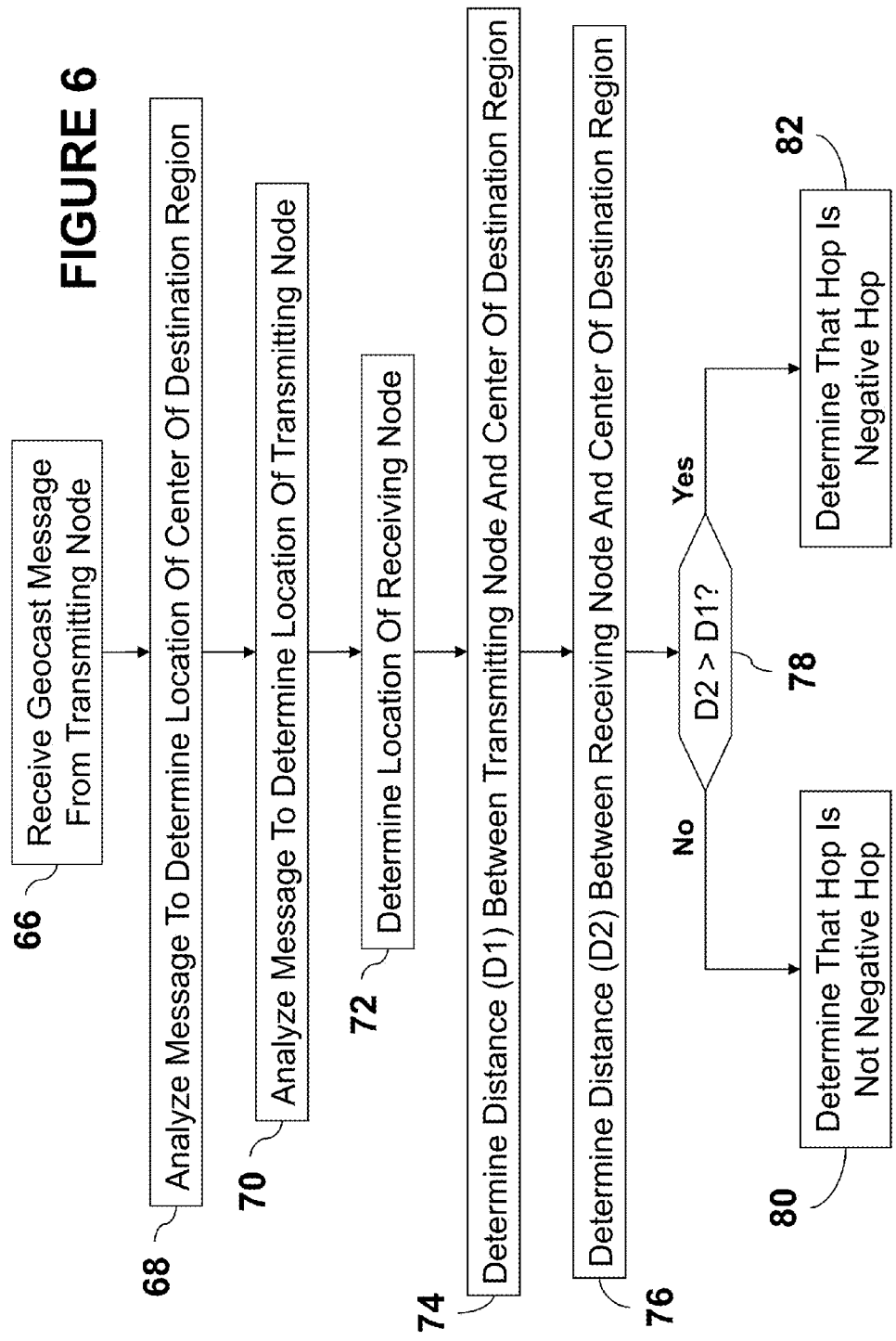
FIG. 6 is a flow diagram of an example process for determining a negative hop.

FIG. 6 is a flow diagram of an example process for determining a negative hop. At step 66 a node may receive a geocast message. The receiving node may analyze the received message at step 68 to determine the center location of the destination region. It is to be understood that the center of the destination region is an example portion of the destination region, and that any appropriate portion of the destination region may be used. In an example embodiment, an indication of the location of the destination region may be contained in the received message (e.g., header, body, etc.). At step 70, the receiving node may analyze the received message to determine the center location of the transmitting node. In an example embodiment, an indication of the location of the transmitting node may be contained in the received message (e.g., header, body, etc.). At step 72, the location of the receiving node may be determined. The location of the receiving node may be determined by any appropriate means. At step 74, the distance, D1, between the transmitting node the center location of the destination region may be determined. At step 76, the distance, D2, between the receiving node the center location of the destination region may be determined. It may be determined, at step 78 if D2 is greater than D1. This may be accomplished by comparing D2 with D1. If D2 is greater than D1, the transmitting node is closer to the center location of the destination region than the receiving node. If D2 is not greater than D1, the transmitting node is not closer to the center location of the destination region than the receiving node. If it is determined (step 78) that D2 is greater than D1, it is determined, at step 82, that the received geocast message constitutes a negative hop. If it is determined (step 78) that D2 is not greater than D1, it is determined, at step 80, that the received geocast message does not constitute a negative hop.

In various example embodiments of SGcast, different nodes may use different heuristics to determine whether a message (e.g., geocast packet) should be forwarded. Different nodes may use different heuristics depending on an amount of progress a packet has made towards the destination region. The value of NumNegHops may be used as a metric. The severity of heuristics used by a node to make a packet forwarding decision may be proportional to a value of NumNegHops. For example, if a node receives a geocast packet with NumNegHops=0, the receiving node knows that the packet is progressing well towards the destination and thus may use a mild heuristic that can be easily satisfied. On the other hand, if NumNegHops=5, the node knows that 5 hops traversed by the packet have deviated from the destination area, thus a strict rule may be applied to inhibit making a forwarding decision.

Figure 7:
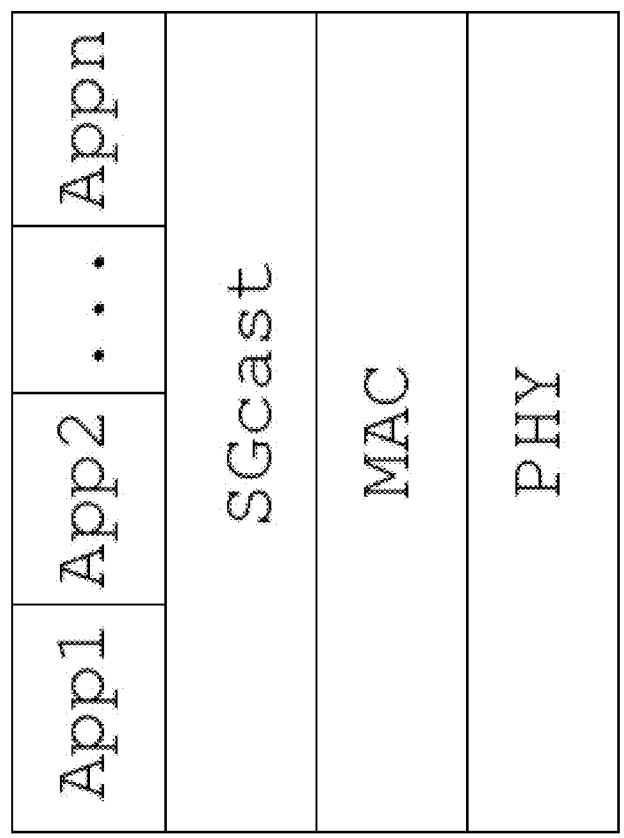
FIG. 7 is an illustration of an example positioning of SGcast within network layers.

FIG. 7 is an illustration of an example positioning of SGcast within network layers. As shown in FIG. 7, SGcast is a network layer protocol that may sit between application and MAC layers. Unlike existing geocast protocols which rely on the backoff mechanism of MAC layer, SGcast introduces its own backoff scheme. Existing MAC layers for sensor networks (e.g., widely used IEEE 802.15.4) are not designed with geocast in mind. They are meant to provide fair medium access to all nodes in a local neighborhood. In SGcast, nodes which are closer to the destination area may backoff for a shorter period of time than those which are further away.

Figure 8:
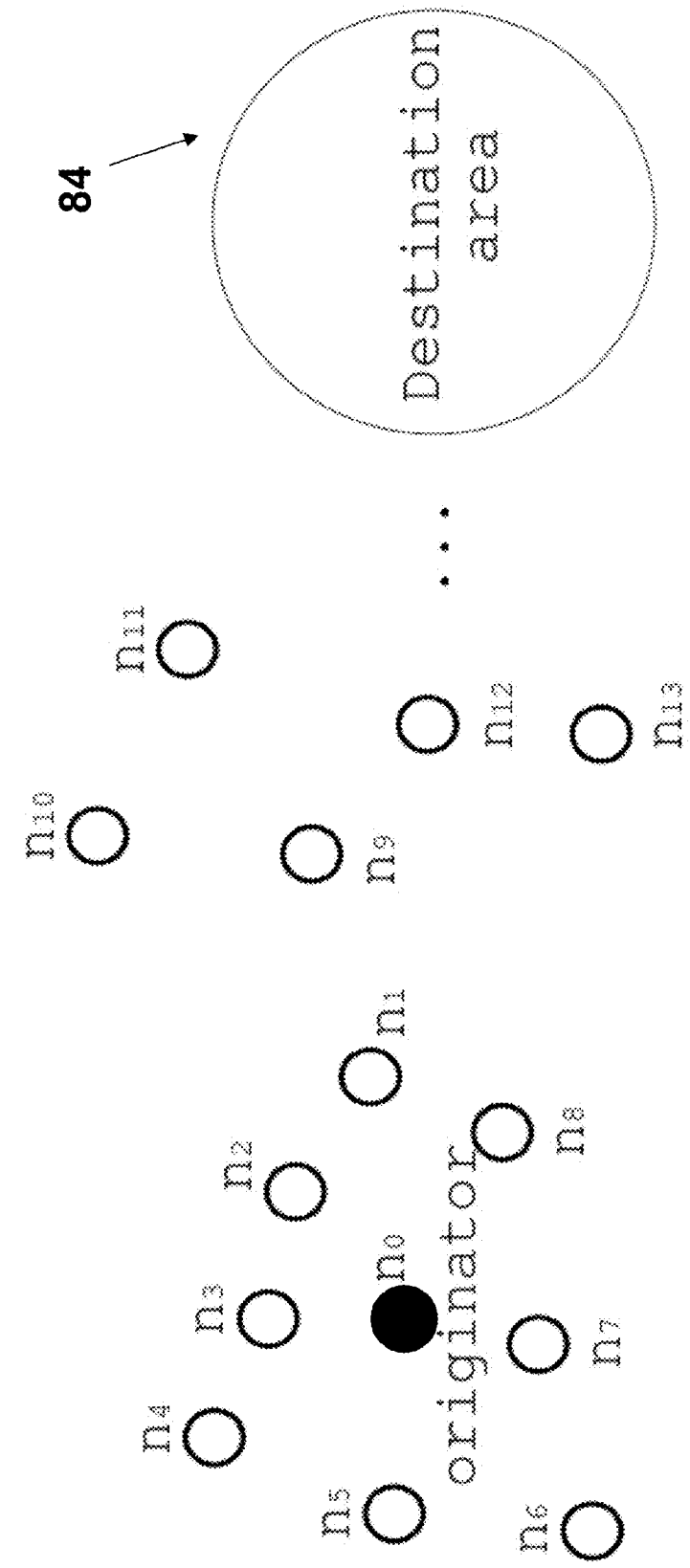
FIG. 8 illustrates an example depiction of an implementation of aspects of SGcast.

FIG. 8 illustrates an example depiction of an implementation of aspects of SGcast. As depicted in FIG. 8, node n0 depicts an originator of a geocast packet. The circular region 84 depicts the destination region. The originator node, n0, wants to send a geocast packet to all nodes (not shown in FIG. 8) in the destination region 84. Among nodes n1, n2, . . . , n8, that hear the geocast packet broadcast by node n0, the backoff period generated by SGcast layer at node n1 may be the smallest because it is closer to the destination area than n2, n3, . . . , n8. As a result, node n1 may broadcast the packet first. Various factors may be considered for nodes n2, n3, . . . , n8, to make a forwarding decision. First, NumNegHops is now 1, so stricter heuristic may be applied as opposed to a NumNegHops=0. Second, M heuristic, described in more detail below, may have less chance of being true. (M heuristic is true if a node has heard less than m number of geocast packets for a given globally unique geocast id, gid). Third, when node n9 hears node n1's transmission, it may transmit early since it is closer to the destination area, thereby making it even more difficult for nodes to the left of node n9 to make a forwarding decision. Thus, "nonoptimal" nodes (like n1, n2, . . . , n8 which do not enhance the progress of the packet towards the destination area) may transmit the packet before more optimal nodes like n1, n2, and n3, thereby increasing the number of radio transmissions, and possibly causing congestion if the network is dense.

One potential issue with protocols that greedily choose nodes closer to the destination area to forward the geocast packet is the local maximum problem, which can result in a geocast packet reaching a node that does not have any neighbor closer to the destination area than itself. This can prevent the packet from reaching the destination area in schemes that select only one neighbor to forward the packet (e.g. protocols that use unicast communication to deliver the packet from the originator node to the destination area). However, in SGcast the severity of this problem is mitigated because of various inherent redundancies present in the SGcast protocol. First, generally there are multiple paths with NumNegHops=0. So, a given geocast may reach the destination area via multiple paths having NumNegHops=0. Second, even if NumNegHops is greater than 0 (but less than the threshold value n), it does not necessarily mean that the packet will be dropped. With higher NumNegHops, progressively stricter heuristics may be applied. Those heuristics may still be satisfied, especially for small values of NumNegHops. Also, SGcast may use T-heuristic (explained in more detail below) to further mitigate the local minimum problem.

When an application generates a geocast packet, it may include the destination region in the geocast packet header. The destination region may be any appropriate regions as described herein, such as with reference to FIG. 4 for example. The application layer may give the geocast packet to SGcast at the network layer. SGcast may add the following fields to the geocast packet header: globally unique geocast id (gid), NumNegHops, and its own location. In an example embodiment, gid may be a tuple comprising a originator node id and a monotonically increasing sequence number. NumNegHops may be the number of negative hops the packet has traversed. NumNegHops may be initialized to 0 by the originator of packet. The originator may broadcast the geocast packet.

Figure 9:
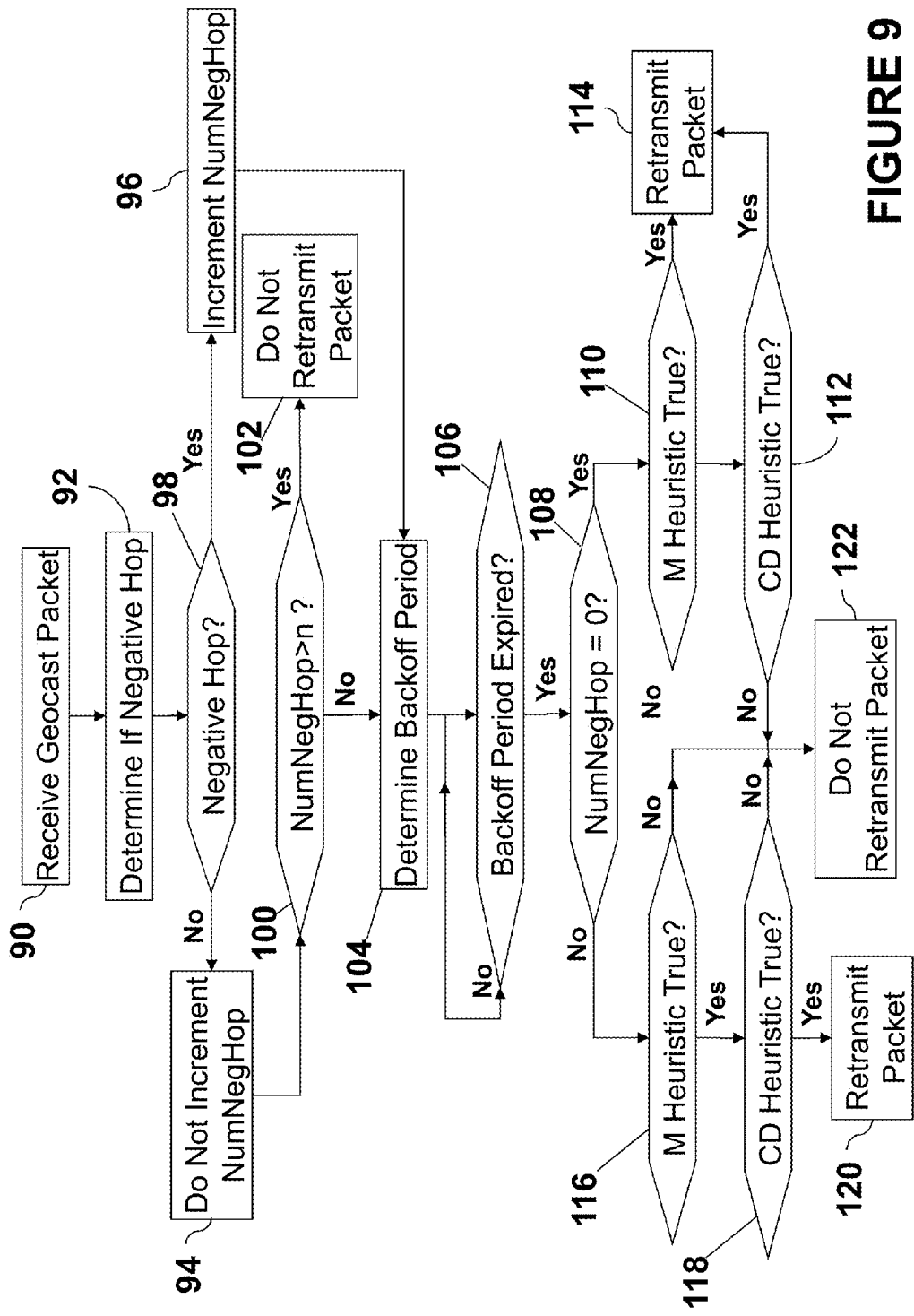
FIG. 9 is a flow diagram of a process for implementing an example embodiment of the SGcast protocol.

FIG. 9 is a flow diagram of a process for implementing an example embodiment of the SGcast protocol. A node may receive a broadcast geocast packet at step 90. The receiving node may determine if the received packet constitutes a negative hop at step 92. In an example embodiment, the receiving node may use the locations of the transmitter, destination area (both may be present in the geocast packet header), and its own location to compare its distance to the destination area with that of the transmitter. If it is determined (at step 98) that the received packet constitutes a negative hop, the value of a counter or a value in a field, such as NumNegHops, may be incremented at step 96. If it is determined (at step 98) that the received packet does not constitute a negative hop, the value of a counter or a value in a field, such as NumNegHops, is not incremented (step 94). If it is determined, at step 100, that the value of NumNegHops is greater than n (a threshold value), the node may drop the packet, and thus the packet is not retransmitted (step 102). A rationale may be that the packet has traversed n hops which have deviated from the destination area and has incurred many (possibly) redundant transmissions. If it is determined at step 100 that the value of NumNegHops is not greater than n, the threshold value, the packet may be transmitted (not shown in FIG. 9). In another example embodiment, the receiving node may determine a backoff period at step 104. Backoff periods may be any appropriate period of time. For example, backoff periods may be on the order of milliseconds. The backoff period for the receiving node may be proportional to the receiving node's distance to the destination region, wherein the closer the node is to the destination region with respect to other nodes, the shorter the backoff period. Backoff periods may be predetermined or determined dynamically.

Figure 10:
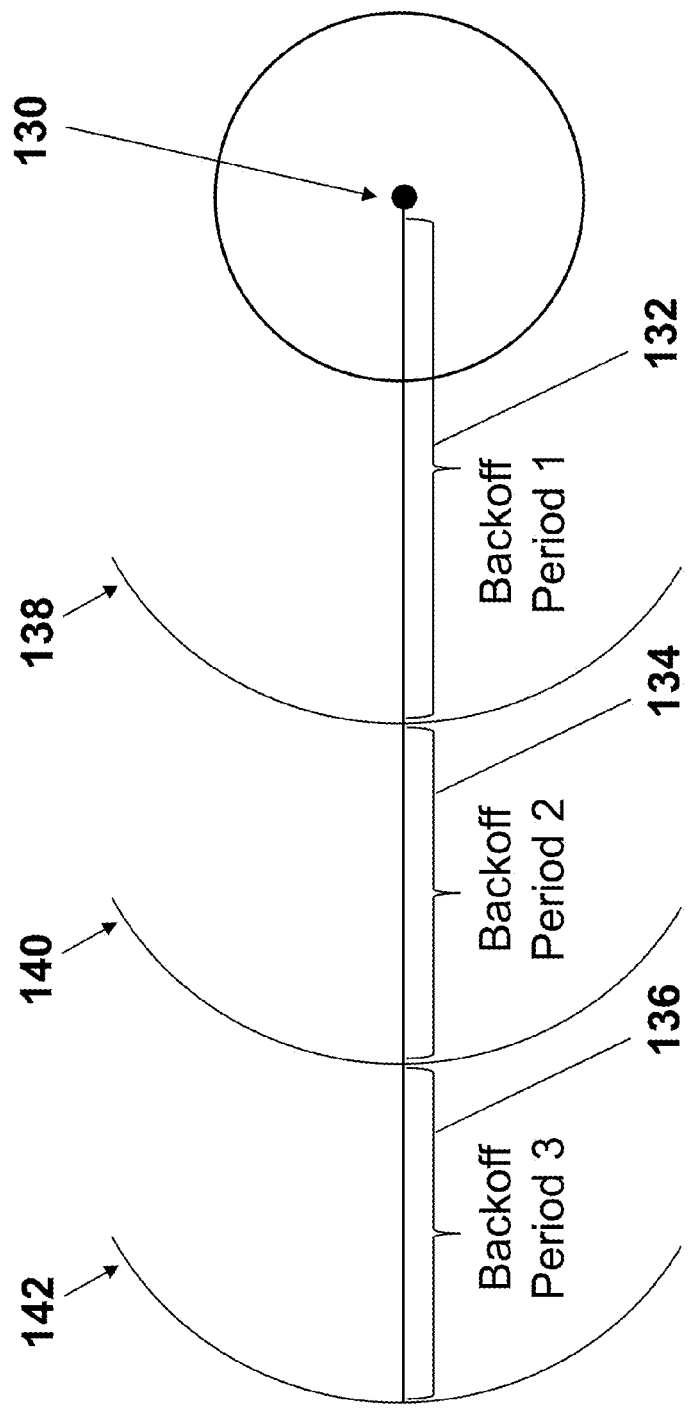
FIG. 10 is an illustration of an example implementation of different backoff periods being assigned to different ranges of distances from a destination region.

In an example embodiment, a different backoff period may be assigned to each of multiple ranges of distances. FIG. 10 is an illustration of an example implementation of different backoff periods being assigned to different ranges of distances from a destination region. As depicted in FIG. 10, the center of the destination region is indicated as location 130. Arcs 138, 140, and 142 represent constant radius perimeters around the destination region center 130. The closest range of distances from the center 130 is indicated as range 132. Range 132 extends from the destination region center 130 to perimeter 138. The next closest range of distances from the center 130 is indicated as range 134. Range 134 extends from perimeter 138 to perimeter 140. And the range of distances furthest away from the center 130 is indicated as range 136. Range 136 extends from perimeter 140 to perimeter 142. In an example embodiment, each of range 132, range 134, and range 136 may be assigned a backoff period. As depicted in FIG. 10, range 132 is assigned backoff period 1, range 134 is assigned backoff period 2, and range 136 is assigned backoff period 3. Backoff period 1, backoff period 2, and backoff period 3 may have different values such that nodes located in a range that is closer to the destination center 130 may backoff for a shorter period of time than node which are further away from the destination center 130. For example, backoff period 1 may have a value of 5 milliseconds, backoff period 2 may have a value of 7 milliseconds, and backoff period 3 may have a value of 10 milliseconds. Thus, a node located in range 132 would operate in accordance with a 5 millisecond backoff period. A node located in range 134 would operate in accordance with a 7 millisecond backoff period. And a node located in range 136 would operate in accordance with a 10 millisecond backoff period. It is to be understood that the geometry, range values, and backoff period values depicted in FIG. 10 are examples and not meant to be limiting. Any appropriate geometry may be used, such as geometries described with reference to FIG. 4. Any appropriate number or ranges may be used. Any appropriate arrangement of ranges may be used. Any appropriate distance covered by a range may be used. Any appropriate number of backoff periods may be used. Any appropriate backoff period value may be used.

Referring again to FIG. 9, it may be determined, at step 106, if the backoff period has expired. If it is determined, at step 106, that the backoff period has not expired, the process continues to determine if the backoff period has expired. If it is determine, at step 106, that the backoff period has expired, the receiving node uses heuristics to determine if the packet is to be retransmitted. More specifically, when the backoff period expires (as determined at step 106), the receiving node checks a set of heuristics depending on the value of counter or field, such as NumNegHops. SGcast provides a flexible framework so that different levels of severity can be used for different values of NumNegHops. The severity of the heuristic may be increased as NumNegHops increases. In an example embodiment, the following two levels of heuristics may be used.

If NumNegHops is 0, Heuristic=M ∨ CD
If NumNegHops is 1, Heuristic=M^CD

As shown, each heuristic may have 2 sub-heuristics. The M heuristic is true if the node has heard less than m number of geocast packets with the given gid. The number of copies of each geocast message (e.g., transmissions having the same identifier) received by the device may be counted. If this number is less than or equal to a parameter M (e.g., 2 for example), the device may retransmit (geocast) the received geocast message. The M heuristic may provide an efficient suppression mechanism in dense networks and may make SGcast scalable with node density. The M heuristic may limit the number of transmissions in a local neighborhood, avoiding redundant transmissions and preventing congestion in the network. The M heuristic also may provide redundancy in sparse networks. The M heuristic also may help the propagation get out of local minima it might otherwise be stuck in by hill climbing directly toward the destination.

The CD heuristic is true if the node is closer to the destination area than any other nodes from which it has heard geocast packets for this gid. Note that if receipt of a packet constitutes a negative hop, the CD heuristic is false. In an example embodiment, the receiving device may determine a first distance from the receiving device to a point (e.g., the center point) in a geocast region. The receiving device also may determine a distance between the point and the transmitting device. The receiving device may retransmit the received packet if the first distance is less than second distance.

Thus, it may be determined at step 108 if the value of a counter or field, such as NumNegHops is equal to zero. If the value is equal to zero, the decision whether to retransmit the packet may be based on the consideration of heuristics (e.g., M or CD) considered in the alternative. If the value is not equal to zero, the decision whether to retransmit the packet may be based on the cumulative consideration of heuristics (e.g., M and CD). More specifically, if it is determined, at step 108, that the value of the counter or field, such as NumNegHops is equal to zero, it is determined if the M heuristic is true at step 110. If it is determined (at step 110) that the M heuristic is true, the packet is retransmitted at step 114. If it is determined (at step 110) that the M heuristic is false, it is determined, at step 112, if the CD heuristic is true. If it is determined, at step 112, that the CD heuristic is true, the packet is retransmitted at step 114. If it is determined, at step 112, that the CD heuristic is false, the packet is not retransmitted (step 122).

If it is determined, at step 108 that the value of the counter or field, such as NumNegHops is not equal to zero (e.g., value equal to 1 or greater), it is determined if the M heuristic is true at step 116. If it is determined (at step 116) that the M heuristic is false, the packet is not retransmitted (step 122), If it is determined (at step 116) that the M heuristic is true, it is determined, at step 118, if the CD heuristic is true. If it is determined, at step 118, that the CD heuristic is false, the packet is not retransmitted (step 122). If it is determined, at step 118, that the CD heuristic is true, the packet is retransmitted at step 120.

It is to be understood that the steps depicted in FIG. 9 need not be performed in the exact order as depicted in FIG. 9. Steps may be performed in any appropriate order. And, all steps need not be performed.

Figure 11:
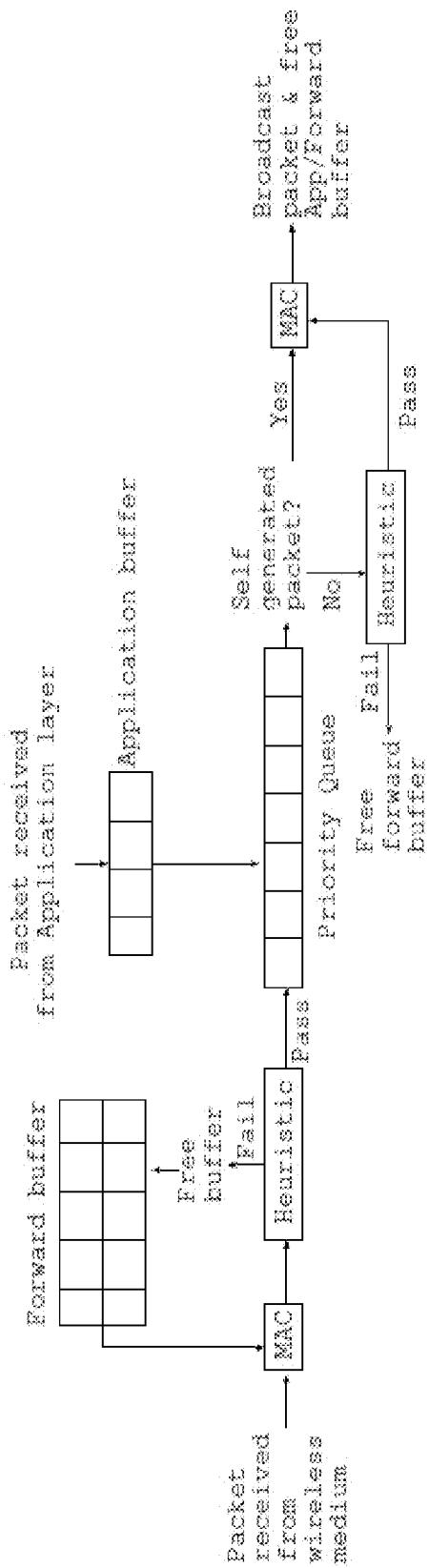
FIG. 11 depicts an example SGcast packet flow framework.

FIG. 11 depicts an example SGcast packet flow framework. The SGcast protocol may comprise two packet buffers. The SGcast protocol may comprise a forward buffer for geocast packets that are received from other nodes and application. And the SGcast protocol may comprise a buffer for packets that are received from applications running on the same node. The use of separate buffers for these two types of geocast packets may help to reduce memory usage. Generally, the number of packets that a node forwards is greater than the number of packets it generates itself. By using smaller application buffer and larger forward buffer instead of a single buffer, the amount of unused buffer space may be reduces When a node implementing the SGcast protocol receives a geocast packet to forward from the wireless medium via an underlying MAC/PHY layer, instead of copying the contents of the packet to the forward buffer, the node may return a new buffer (pointer) from the forward buffer to the MAC/PHY layer and may keep the received buffer. Quickly returning the buffer instead of performing a time-consuming memory copy operation (e.g., memcpy( )) to copy the packet contents to the forward buffer to the MAC/PHY layer may prevent the contents of the received packet from being corrupted due to the node receiving multiple packets in a quick succession. Because the SGcast protocol may be a small component of the entire software stack running on the sensor node and many other applications and protocols use the same MAC/PHY layer, if the buffer is not quickly returned to the MAC/PHY layer, a subsequently received packet (geocast packet or a packet from any other protocol) may corrupt the earlier packet. If the forward buffer is full and SGcast receives a request to forward a packet from the MAC/PHY layer, it may drop (not forward) the packet.

Figure 12:
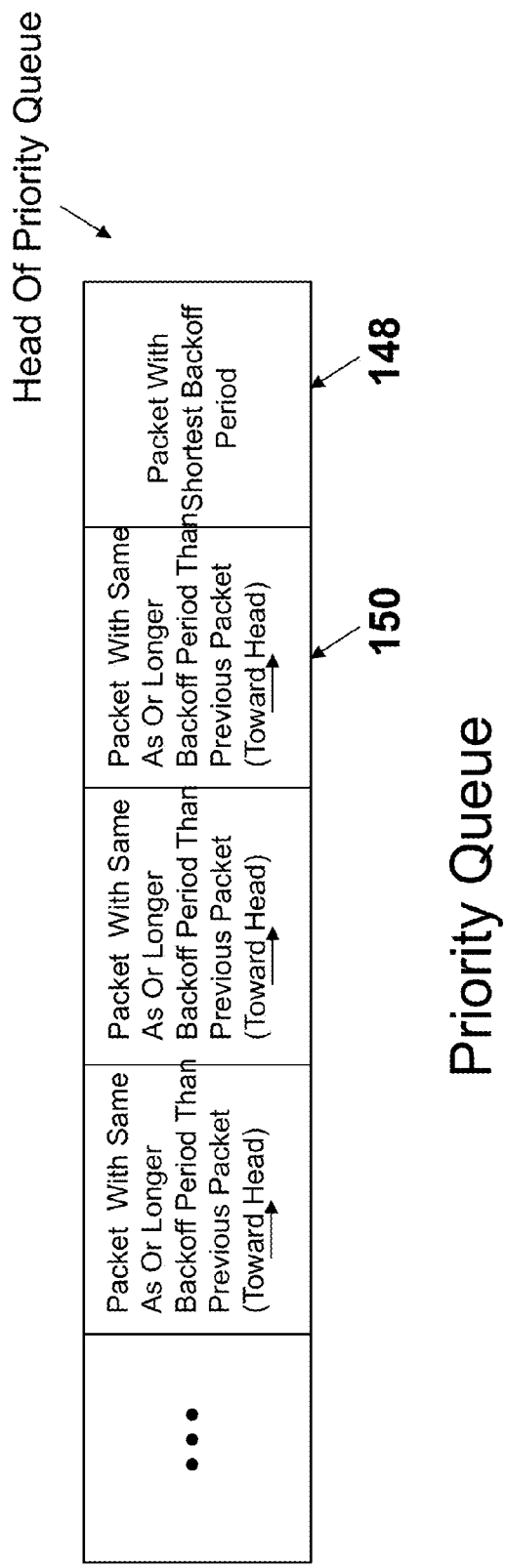
FIG. 12 is a diagram of an example priority queue.

FIG. 12 is a diagram of an example priority queue 146. After the geocast packet is buffered in the forward buffer, a heuristic check may be performed based on the value of NumNegHops as described herein. If the heuristic check fails, the packet may be dropped. Otherwise, a backoff interval (proportional to the node's distance to the destination area) may be computed and the packet may be enqueued in a priority queue 146. The priority queue 146 may use the backoff interval as the priority. A packet with the smallest backoff interval may be placed at the head of the queue 148, the next spot 150 may be occupied by the packet with the second smallest (or same size) backoff period, and so on. As depicted in FIG. 12, a previous packet is a packet that is next in line to the right, toward the head of the priority queue. The size of the priority queue may be the sum of the sizes of forward and application buffers. When the packet reaches the head of the queue and backoff period expires, the packet may be dequeued and a heuristic check(s) may be performed again. If the heuristic check(s) is passed, the packet may be given to the MAC/PHY layer for broadcasting. Otherwise, the packet may be dropped. In either case, the forwarding buffer used by the packet may be freed. Note that the SGcast protocol performs the heuristic check(s) twice. An example purpose of the first heuristic check (performed immediately after receiving the packet from MAC/PHY and before enqueuing in the priority queue) is to save memory. A packet that fails the heuristic check(s) before being enqueued in the priority queue fails the latter check anyway (performed after the packet is enqueued and reaches the head of the queue). By dropping the packet early, memory usage may be reduced. The second heuristic may be performed late just before transmitting the packet, thereby allowing sufficient time for the node to hear other packets transmitted by its neighbors that might cause the heuristic check to fail. The late heuristic check may reduce the number of redundant radio transmissions.

When a node operating the SGcast protocol receives a request from the application layer to send a geocast packet and if the application buffer is full, the node may inform the application layer that the request is denied. The application layer may implement its own retransmission policy. If the application buffer is available, the packet may be enqueued in the priority queue by selecting a backoff interval such that the packet is placed at the head of the queue. In an example embodiment, the packet is placed at the head of the queue if the queue is empty. Otherwise, the packet is placed just behind the head to let the packet already at the head be transmitted first. In this way, packet corruption in the middle of a transmission may be avoided. Use of the backoff mechanism may ensure that among the nodes in a local neighborhood that receive a geocast packet with a given gid, the node with the least distance to the destination area transmits the packet first. Since none of the nodes except the originating node has the geocast packet with this gid, the backoff mechanism may not be compromised by giving a high priority to its own packet. Also, the self-generated geocast packet may not undergo any heuristic check because it is the first node that will transmit the geocast packet for this gid and thus the heuristic is always true.

Figure 13:
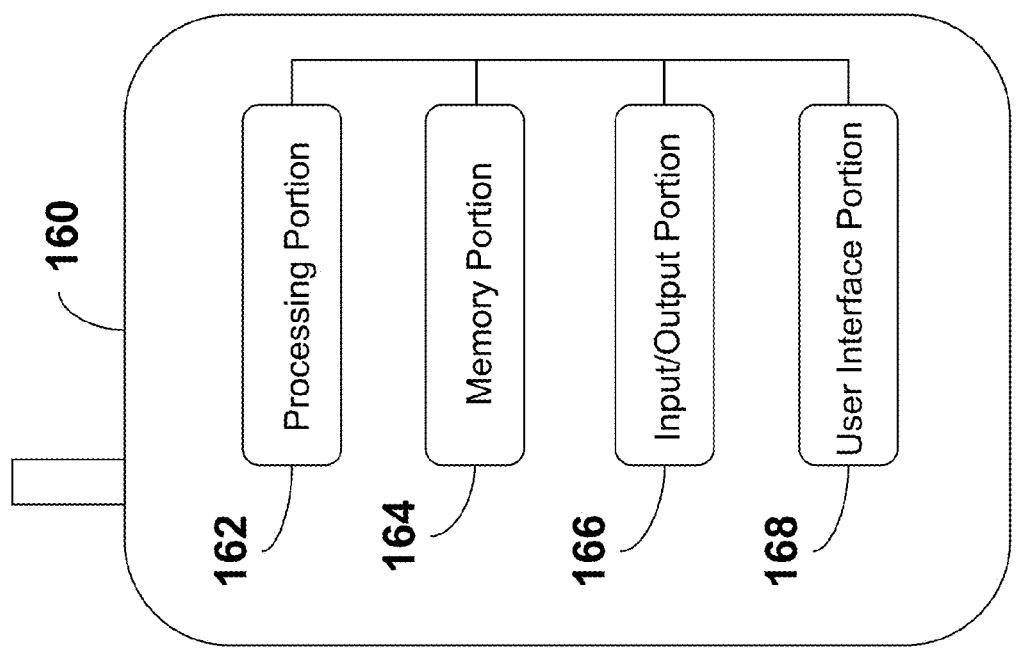
FIG. 13 is a block diagram of an example communications device configured to facilitate use of the SGcast protocol.

FIG. 13 is a block diagram of an example communications device (also referred to as a node) 160 configured to facilitate use of the SGcast protocol. In an example configuration, communications device 160 comprises a mobile wireless device. The communications device 160, however, may comprise any appropriate device, examples of which include a portable computing device, such as a laptop, a personal digital assistant ("PDA"), a portable phone (e.g., a cell phone or the like, a smart phone, a video phone), a portable email device, a portable gaming device, a TV, a DVD player, portable media player, (e.g., a portable music player, such as an MP3 player, a Walkman, etc.), a portable navigation device (e.g., GPS compatible device, A-GPS compatible device, etc.), or a combination thereof. The communications device 160 can include devices that are not typically thought of as portable, such as, for example, a public computing device, a navigation device installed in-vehicle, a set top box, or the like. The mobile communications device 160 can include non-conventional computing devices, such as, for example, a kitchen appliance, a motor vehicle control (e.g., steering wheel), etc., or the like.

As evident from the herein description, a node, and thus a communications device, is not to be construed as software per se.

The communications device 160 may include any appropriate device, mechanism, software, and/or hardware for facilitating use of the SGcast protocol as described herein. In an example embodiment, the ability to facilitate use of the SGcast protocol is a feature of the communications device 160 that can be turned on and off. Thus, in an example embodiment, an owner of the communications device 160 may opt-in or opt-out of this capability.

In an example embodiment, the communications device 160 comprises a processor and memory coupled to the processor. The memory may comprise executable instructions that when executed by the processor cause the processor to effectuate operations associated with use of the SGcast protocol.

In an example configuration, the communications device 160 comprises a processing portion 162, a memory portion 164, an input/output portion 166, and a user interface (UI) portion 168. Each portion of the mobile communications device 160 comprises circuitry for performing functions associated with each respective portion. Thus, each portion can comprise hardware, or a combination of hardware and software. It is emphasized that the block diagram depiction of communications device 160 is exemplary and not intended to imply a specific implementation and/or configuration. For example, in an example configuration, the communications device 160 may comprise a cellular phone and the processing portion 162 and/or the memory portion 164 may be implemented, in part or in total, on a subscriber identity module (SIM) of the mobile communications device 160. In another example configuration, the communications device 160 may comprise a laptop computer. The laptop computer can include a SIM, and various portions of the processing portion 162 and/or the memory portion 164 can be implemented on the SIM, on the laptop other than the SIM, or any combination thereof.

The processing portion 162, memory portion 164, and input/output portion 166 are coupled together to allow communications therebetween. In various embodiments, the input/output portion 166 comprises a receiver of the communications device 160, a transmitter of the communications device 160, or a combination thereof. The input/output portion 166 is capable of receiving and/or providing information pertaining to use of the SGcast protocol as described herein. In various configurations, the input/output portion 166 may receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or a combination thereof.

The processing portion 162 may be capable of performing functions pertaining to use of the SGcast protocol as described herein. In a basic configuration, the communications device 160 may include at least one memory portion 164. The memory portion 164 may comprise a storage medium having a tangible physical structure. Thus, the memory portion 164 is not to be construed as a transient signal per se. The memory portion 164 may store any information utilized in conjunction with the SGcast protocol as described herein. Depending upon the exact configuration and type of processor, the memory portion 164 may be volatile (such as some types of RAM), non-volatile (such as ROM, flash memory, etc.), or a combination thereof. The mobile communications device 160 may include additional storage (e.g., removable storage and/or non-removable storage) including, but not limited to, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or any other medium which can be used to store information and which can be accessed by the mobile communications device 160.

The communications device 160 also may contain a user interface (UI) portion 168 allowing a user to communicate with the communications device 160. The UI portion 168 may be capable of rendering any information utilized in conjunction with the SGcast protocol as described herein. The UI portion 168 may provide the ability to control the communications device 160, via, for example, buttons, soft keys, voice actuated controls, a touch screen, movement of the mobile communications device 160, visual cues (e.g., moving a hand in front of a camera on the mobile communications device 160), or the like. The UI portion 168 may provide visual information (e.g., via a display), audio information (e.g., via speaker), mechanically (e.g., via a vibrating mechanism), or a combination thereof. In various configurations, the UI portion 168 may comprise a display, a touch screen, a keyboard, an accelerometer, a motion detector, a speaker, a microphone, a camera, a tilt sensor, or any combination thereof. The UI portion 168 may comprise means for inputting biometric information, such as, for example, fingerprint information, retinal information, voice information, and/or facial characteristic information.

The UI portion 168 may include a display for displaying multimedia such as, for example, application graphical user interfaces (GUIs), text, images, video, telephony functions such as Caller ID data, setup functions, menus, music, metadata, messages, wallpaper, graphics, Internet content, device status, preferences settings, map and location data, routes and other directions, points of interest (POI), and the like.

In some embodiments, the UI portion may comprise a user interface (UI) application. The UI application may interface with a client or operating system (OS) to, for example, facilitate user interaction with device functionality and data. The UI application may aid a user in entering message content, viewing received messages, answering/initiating calls, entering/deleting data, entering and setting user IDs and passwords, configuring settings, manipulating address book content and/or settings, interacting with other applications, or the like, and may aid the user in inputting selections and maneuvers associated with the SGcast protocol as described herein.

Although not necessary to facilitate the use and/or implementation of the SGcast protocol, a communications device can be part of and/or in communications with various wireless communications networks. Some of which are described below.

Figure 14:
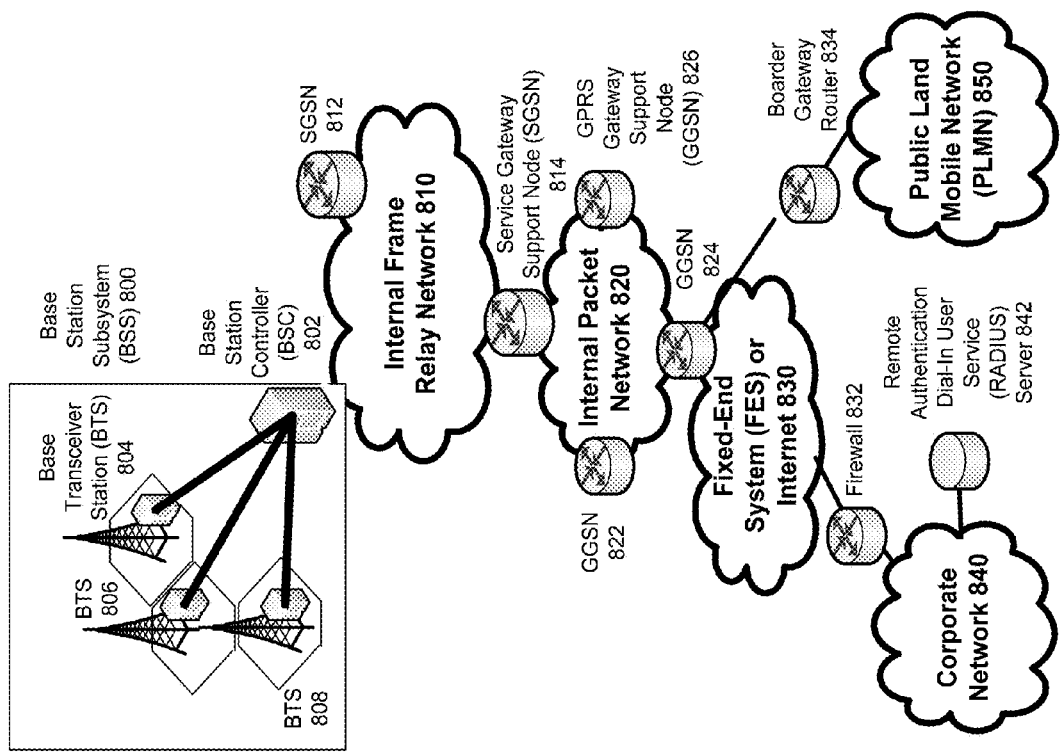
FIG. 14 depicts an overall block diagram of an example packet-based mobile cellular network environment, such as a GPRS network, within which the SGcast protocol may be implemented.

FIG. 14 depicts an overall block diagram of an example packet-based mobile cellular network environment, such as a GPRS network, within which the SGcast protocol may be implemented. In the example packet-based mobile cellular network environment shown in FIG. 14, there are a plurality of Base Station Subsystems ("BSS") 800 (only one is shown), each of which comprises a Base Station Controller ("BSC") 802 serving a plurality of Base Transceiver Stations ("BTS") such as BTSs 804, 806, and 808. BTSs 804, 806, 808, etc. are the access points where users of packet-based mobile devices become connected to the wireless network. In example fashion, the packet traffic originating from user devices is transported via an over-the-air interface to a BTS 808, and from the BTS 808 to the BSC 802. Base station subsystems, such as BSS 800, are a part of internal frame relay network 810 that can include Service GPRS Support Nodes ("SGSN") such as SGSN 812 and 814. Each SGSN is connected to an internal packet network 820 through which a SGSN 812, 814, etc. can route data packets to and from a plurality of gateway GPRS support nodes (GGSN) 822, 824, 826, etc. As illustrated, SGSN 814 and GGSNs 822, 824, and 826 are part of internal packet network 820. Gateway GPRS serving nodes 822, 824 and 826 mainly provide an interface to external Internet Protocol ("IP") networks such as Public Land Mobile Network ("PLMN") 850, corporate intranets 840, or Fixed-End System ("FES") or the public Internet 830. As illustrated, subscriber corporate network 840 may be connected to GGSN 824 via firewall 832; and PLMN 850 is connected to GGSN 824 via boarder gateway router 834. The Remote Authentication Dial-In User Service ("RADIUS") server 842 may be used for caller authentication when a user of a mobile cellular device calls corporate network 840.

Generally, there can be a several cell sizes in a GSM network, referred to as macro, micro, pico, femto and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. Femto cells have the same size as pico cells, but a smaller transport capacity. Femto cells are used indoors, in residential, or small business environments. On the other hand, umbrella cells are used to cover shadowed regions of smaller cells and fill in gaps in coverage between those cells.

Figure 15:
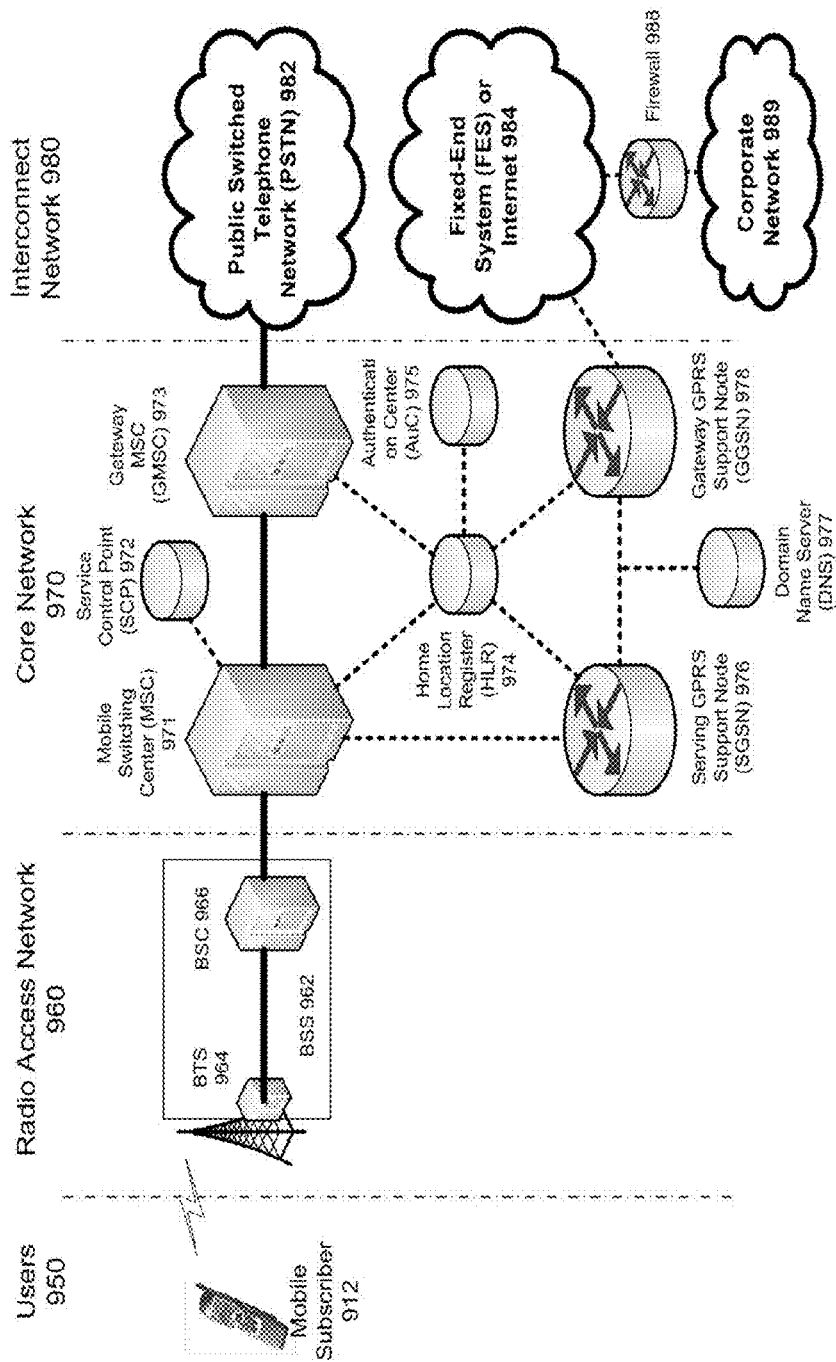
FIG. 15 illustrates an architecture of a typical GPRS network within which the SGcast protocol may be implemented.

FIG. 15 illustrates an architecture of a typical GPRS network within which the SGcast protocol can be implemented. The architecture depicted in FIG. 15 is segmented into four groups: users 950, radio access network 960, core network 970, and interconnect network 980. Users 950 comprise a plurality of end users. Note, device 912 is referred to as a mobile subscriber in the description of network shown in FIG. 15. In an example embodiment, the device depicted as mobile subscriber 912 comprises a communications device (e.g., communications device 160). Radio access network 960 comprises a plurality of base station subsystems such as BSSs 962, which include BTSs 964 and BSCs 966. Core network 970 comprises a host of various network elements. As illustrated in FIG. 15, core network 970 may comprise Mobile Switching Center ("MSC") 971, Service Control Point ("SCP") 972, gateway MSC 973, SGSN 976, Home Location Register ("HLR") 974, Authentication Center ("AuC") 975, Domain Name Server ("DNS") 977, and GGSN 978. Interconnect network 980 also comprises a host of various networks and other network elements. As illustrated in FIG. 15, interconnect network 980 comprises Public Switched Telephone Network ("PSTN") 982, Fixed-End System ("FES") or Internet 984, firewall 988, and Corporate Network 989.

A mobile switching center can be connected to a large number of base station controllers. At MSC 971, for instance, depending on the type of traffic, the traffic may be separated in that voice may be sent to Public Switched Telephone Network ("PSTN") 982 through Gateway MSC ("GMSC") 973, and/or data may be sent to SGSN 976, which then sends the data traffic to GGSN 978 for further forwarding.

When MSC 971 receives call traffic, for example, from BSC 966, it sends a query to a database hosted by SCP 972. The SCP 972 processes the request and issues a response to MSC 971 so that it may continue call processing as appropriate.

The HLR 974 is a centralized database for users to register to the GPRS network. HLR 974 stores static information about the subscribers such as the International Mobile Subscriber Identity ("IMSI"), subscribed services, and a key for authenticating the subscriber. HLR 974 also stores dynamic subscriber information such as the current location of the mobile subscriber. Associated with HLR 974 is AuC 975. AuC 975 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 15, when mobile subscriber 912 initiates the attach process by turning on the network capabilities of the mobile device, an attach request is sent by mobile subscriber 912 to SGSN 976. The SGSN 976 queries another SGSN, to which mobile subscriber 912 was attached before, for the identity of mobile subscriber 912. Upon receiving the identity of mobile subscriber 912 from the other SGSN, SGSN 976 requests more information from mobile subscriber 912. This information is used to authenticate mobile subscriber 912 to SGSN 976 by HLR 974. Once verified, SGSN 976 sends a location update to HLR 974 indicating the change of location to a new SGSN, in this case SGSN 976. HLR 974 notifies the old SGSN, to which mobile subscriber 912 was attached before, to cancel the location process for mobile subscriber 912. HLR 974 then notifies SGSN 976 that the location update has been performed. At this time, SGSN 976 sends an Attach Accept message to mobile subscriber 912, which in turn sends an Attach Complete message to SGSN 976.

After attaching itself with the network, mobile subscriber 912 then goes through the authentication process. In the authentication process, SGSN 976 sends the authentication information to HLR 974, which sends information back to SGSN 976 based on the user profile that was part of the user's initial setup. The SGSN 976 then sends a request for authentication and ciphering to mobile subscriber 912. The mobile subscriber 912 uses an algorithm to send the user identification (ID) and password to SGSN 976. The SGSN 976 uses the same algorithm and compares the result. If a match occurs, SGSN 976 authenticates mobile subscriber 912.

Next, the mobile subscriber 912 establishes a user session with the destination network, corporate network 989, by going through a Packet Data Protocol ("PDP") activation process. Briefly, in the process, mobile subscriber 912 requests access to the Access Point Name ("APN"), for example, UPS.com, and SGSN 976 receives the activation request from mobile subscriber 912. SGSN 976 then initiates a Domain Name Service ("DNS") query to learn which GGSN node has access to the UPS.com APN. The DNS query is sent to the DNS server within the core network 970, such as DNS 977, which is provisioned to map to one or more GGSN nodes in the core network 970. Based on the APN, the mapped GGSN 978 can access the requested corporate network 989. The SGSN 976 then sends to GGSN 978 a Create Packet Data Protocol ("PDP") Context Request message that contains necessary information. The GGSN 978 sends a Create PDP Context Response message to SGSN 976, which then sends an Activate PDP Context Accept message to mobile subscriber 912.

Once activated, data packets of the call made by mobile subscriber 912 can then go through radio access network 960, core network 970, and interconnect network 980, in a particular fixed-end system or Internet 984 and firewall 988, to reach corporate network 989.

Figure 16:
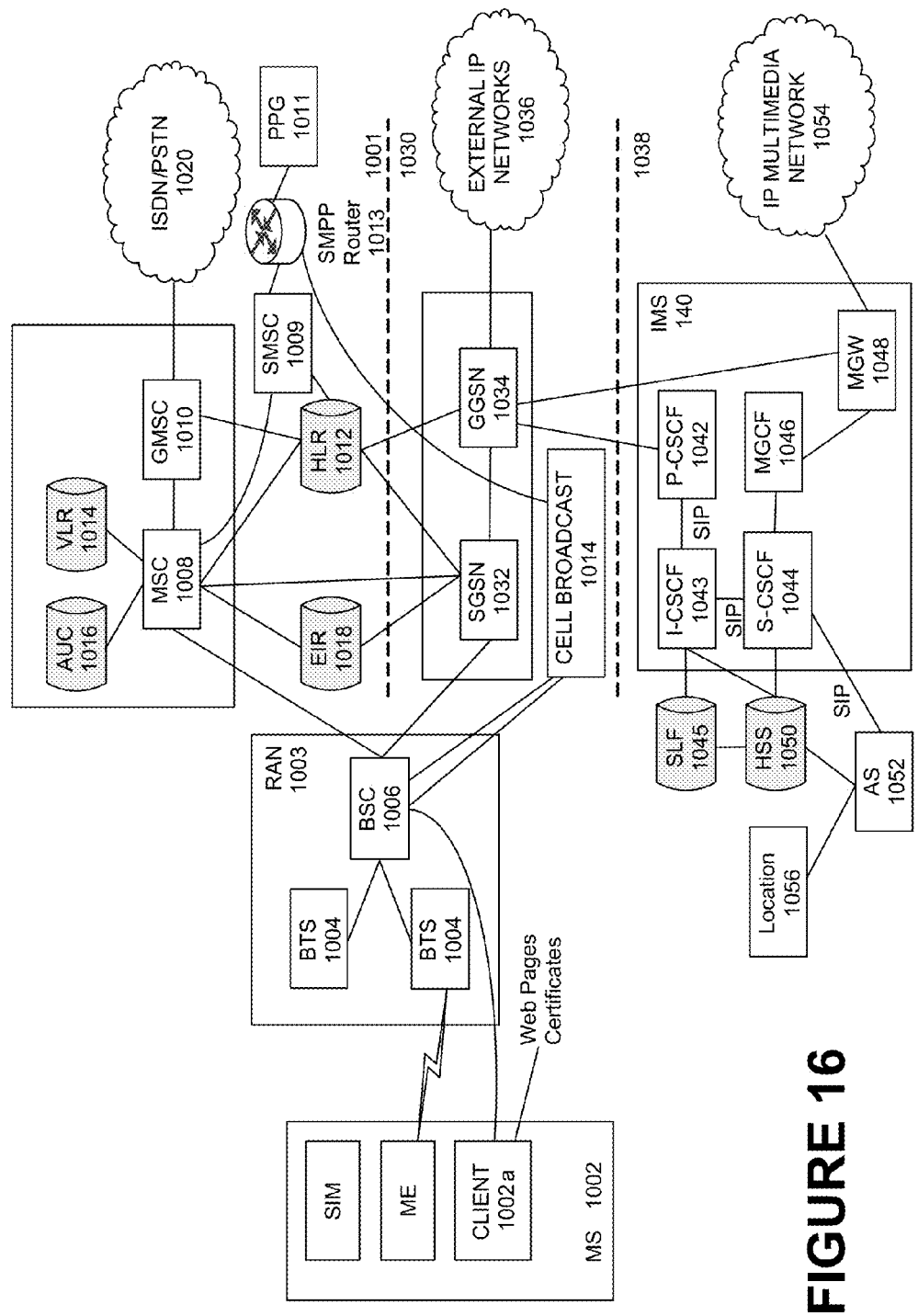
FIG. 16 illustrates an example block diagram view of a GSM/GPRS/IP multimedia network architecture within which the SGcast protocol may be implemented.

FIG. 16 illustrates an example block diagram view of a GSM/GPRS/IP multimedia network architecture within which the SGcast protocol may be implemented. As illustrated, the architecture of FIG. 16 includes a GSM core network 1001, a GPRS network 1030 and an IP multimedia network 1038. The GSM core network 1001 includes a Mobile Station (MS) 1002, at least one Base Transceiver Station (BTS) 1004 and a Base Station Controller (BSC) 1006. The MS 1002 is physical equipment or Mobile Equipment (ME), such as a mobile phone or a laptop computer that is used by mobile subscribers, with a Subscriber identity Module (SIM) or a Universal Integrated Circuit Card (UICC). The SIM or UICC includes an International Mobile Subscriber Identity (IMSI), which is a unique identifier of a subscriber. The BTS 1004 is physical equipment, such as a radio tower, that enables a radio interface to communicate with the MS. Each BTS may serve more than one MS. The BSC 1006 manages radio resources, including the BTS. The BSC may be connected to several BTSs. The BSC and BTS components, in combination, are generally referred to as a base station (BSS) or radio access network (RAN) 1003.

The GSM core network 1001 also includes a Mobile Switching Center (MSC) 1008, a Gateway Mobile Switching Center (GMSC) 1010, a Home Location Register (HLR) 1012, Visitor Location Register (VLR) 1014, an Authentication Center (AuC) 1018, and an Equipment Identity Register (EIR) 1016. The MSC 1008 performs a switching function for the network. The MSC also performs other functions, such as registration, authentication, location updating, handovers, and call routing. The GMSC 1010 provides a gateway between the GSM network and other networks, such as an Integrated Services Digital Network (ISDN) or Public Switched Telephone Networks (PSTNs) 1020. Thus, the GMSC 1010 provides interworking functionality with external networks.

The HLR 1012 is a database that contains administrative information regarding each subscriber registered in a corresponding GSM network. The HLR 1012 also contains the current location of each MS. The VLR 1014 is a database that contains selected administrative information from the HLR 1012. The VLR contains information necessary for call control and provision of subscribed services for each MS currently located in a geographical area controlled by the VLR. The HLR 1012 and the VLR 1014, together with the MSC 1008, provide the call routing and roaming capabilities of GSM. The AuC 1016 provides the parameters needed for authentication and encryption functions. Such parameters allow verification of a subscriber's identity. The EIR 1018 stores security-sensitive information about the mobile equipment.

A Short Message Service Center (SMSC) 1009 allows one-to-one Short Message Service (SMS) messages to be sent to/from the MS 1002. A Push Proxy Gateway (PPG) 1011 is used to "push" (i.e., send without a synchronous request) content to the MS 1002. The PPG 1011 acts as a proxy between wired and wireless networks to facilitate pushing of data to the MS 1002. A Short Message Peer to Peer (SMPP) protocol router 1013 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1002 sends a location update including its current location information to the MSC/VLR, via the BTS 1004 and the BSC 1006. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 1030 is logically implemented on the GSM core network architecture by introducing two packet-switching network nodes, a serving GPRS support node (SGSN) 1032, a cell broadcast and a Gateway GPRS support node (GGSN) 1034. The SGSN 1032 is at the same hierarchical level as the MSC 1008 in the GSM network. The SGSN controls the connection between the GPRS network and the MS 1002. The SGSN also keeps track of individual MS's locations and security functions and access controls.

A Cell Broadcast Center (CBC) 14 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1034 provides a gateway between the GPRS network and a public packet network (PDN) or other IP networks 1036. That is, the GGSN provides interworking functionality with external networks, and sets up a logical link to the MS through the SGSN. When packet-switched data leaves the GPRS network, it is transferred to an external TCP-IP network 1036, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one of three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 1030 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while received data and vice versa.

The IP multimedia network 1038 was introduced with 3GPP Release 5, and includes an IP multimedia subsystem (IMS) 1040 to provide rich multimedia services to end users. A representative set of the network entities within the IMS 1040 are a call/session control function (CSCF), a media gateway control function (MGCF) 1046, a media gateway (MGW) 1048, and a master subscriber database, called a home subscriber server (HSS) 1050. The HSS 1050 may be common to the GSM network 1001, the GPRS network 1030 as well as the IP multimedia network 1038.

The IP multimedia system 1040 is built around the call/session control function, of which there are three types: an interrogating CSCF (I-CSCF) 1043, a proxy CSCF (P-CSCF) 1042, and a serving CSCF (S-CSCF) 1044. The P-CSCF 1042 is the MS's first point of contact with the IMS 1040. The P-CSCF 1042 forwards session initiation protocol (SIP) messages received from the MS to an SIP server in a home network (and vice versa) of the MS. The P-CSCF 1042 may also modify an outgoing request according to a set of rules defined by the network operator (for example, address analysis and potential modification).

The I-CSCF 1043, forms an entrance to a home network and hides the inner topology of the home network from other networks and provides flexibility for selecting an S-CSCF. The I-CSCF 1043 may contact a subscriber location function (SLF) 1045 to determine which HSS 1050 to use for the particular subscriber, if multiple HSS's 1050 are present. The S-CSCF 1044 performs the session control services for the MS 1002. This includes routing originating sessions to external networks and routing terminating sessions to visited networks. The S-CSCF 1044 also decides whether an application server (AS) 1052 is required to receive information on an incoming SIP session request to ensure appropriate service handling. This decision is based on information received from the HSS 1050 (or other sources, such as an application server 1052). The AS 1052 also communicates to a location server 1056 (e.g., a Gateway Mobile Location Center (GMLC)) that provides a position (e.g., latitude/longitude coordinates) of the MS 1002.

The HSS 1050 contains a subscriber profile and keeps track of which core network node is currently handling the subscriber. It also supports subscriber authentication and authorization functions (AAA). In networks with more than one HSS 1050, a subscriber location function provides information on the HSS 1050 that contains the profile of a given subscriber.

The MGCF 1046 provides interworking functionality between SIP session control signaling from the IMS 1040 and ISUP/BICC call control signaling from the external GSTN networks (not shown). It also controls the media gateway (MGW) 1048 that provides user-plane interworking functionality (e.g., converting between AMR- and PCM-coded voice). The MGW 1048 also communicates with other IP multimedia networks 1054.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

Figure 17:
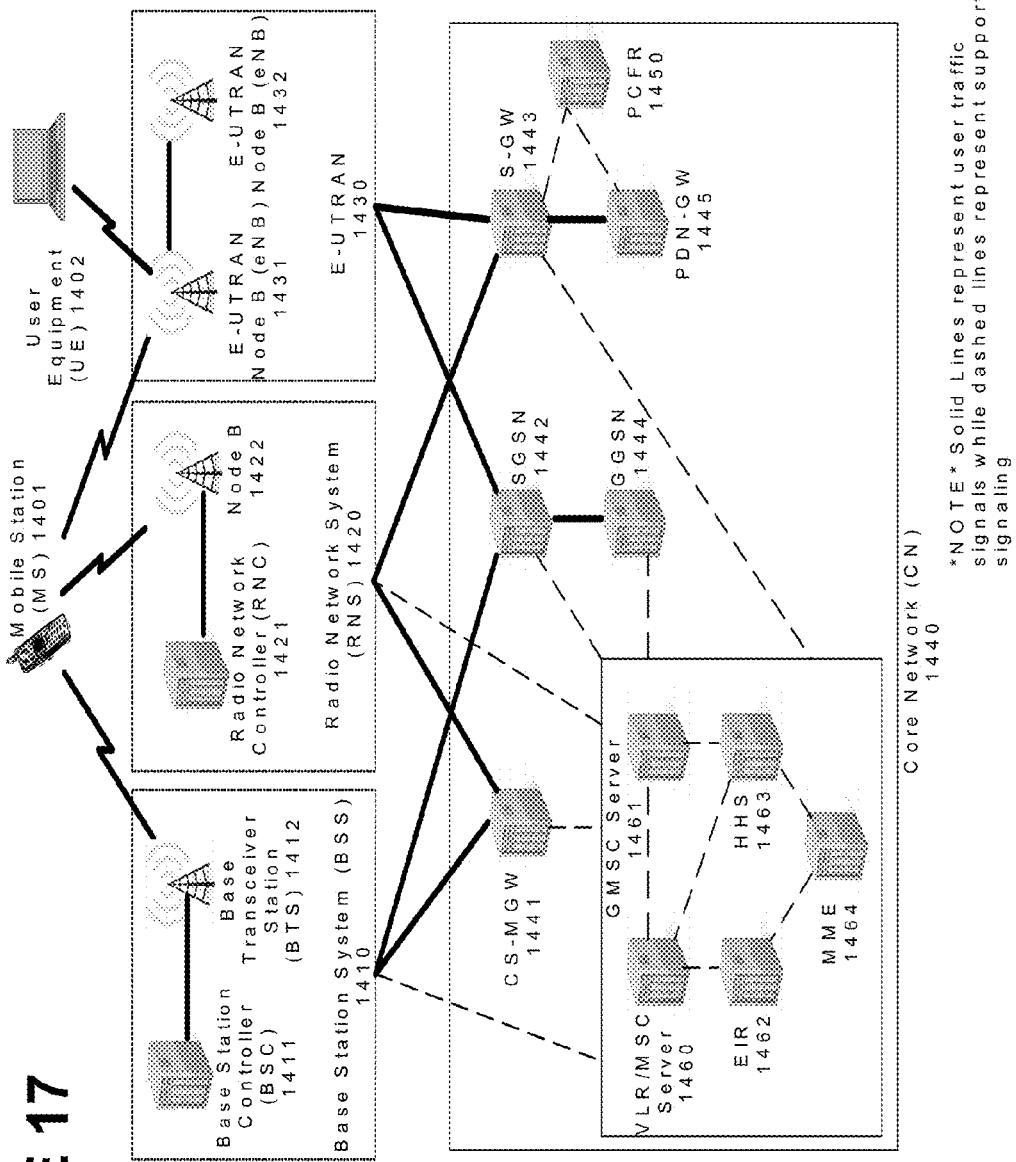
FIG. 17 illustrates a PLMN block diagram view of an example architecture in which the SGcast protocol may be incorporated.

FIG. 17 illustrates a PLMN block diagram view of an example architecture in which the SGcast protocol may be incorporated. Mobile Station (MS) 1401 is the physical equipment used by the PLMN subscriber. In one illustrative embodiment, communications device 200 may serve as Mobile Station 1401. Mobile Station 1401 may be one of, but not limited to, a cellular telephone, a cellular telephone in combination with another electronic device or any other wireless mobile communication device.

Mobile Station 1401 may communicate wirelessly with Base Station System (BSS) 1410. BSS 1410 contains a Base Station Controller (BSC) 1411 and a Base Transceiver Station (BTS) 1412. BSS 1410 may include a single BSC 1411/BTS 1412 pair (Base Station) or a system of BSC/BTS pairs which are part of a larger network. BSS 1410 is responsible for communicating with Mobile Station 1401 and may support one or more cells. BSS 1410 is responsible for handling cellular traffic and signaling between Mobile Station 1401 and Core Network 1440. Typically, BSS 1410 performs functions that include, but are not limited to, digital conversion of speech channels, allocation of channels to mobile devices, paging, and transmission/reception of cellular signals.

Additionally, Mobile Station 1401 may communicate wirelessly with Radio Network System (RNS) 1420. RNS 1420 contains a Radio Network Controller (RNC) 1421 and one or more Node(s) B 1422. RNS 1420 may support one or more cells. RNS 1420 may also include one or more RNC 1421/Node B 1422 pairs or alternatively a single RNC 1421 may manage multiple Nodes B 1422. RNS 1420 is responsible for communicating with Mobile Station 1401 in its geographically defined area. RNC 1421 is responsible for controlling the Node(s) B 1422 that are connected to it and is a control element in a UMTS radio access network. RNC 1421 performs functions such as, but not limited to, load control, packet scheduling, handover control, security functions, as well as controlling Mobile Station 1401's access to the Core Network (CN) 1440.

The evolved UMTS Terrestrial Radio Access Network (E-UTRAN) 1430 is a radio access network that provides wireless data communications for Mobile Station 1401 and User Equipment 1402. E-UTRAN 1430 provides higher data rates than traditional UMTS. It is part of the Long Term Evolution (LTE) upgrade for mobile networks and later releases meet the requirements of the International Mobile Telecommunications (IMT) Advanced and are commonly known as a 4G networks. E-UTRAN 1430 may include of series of logical network components such as E-UTRAN Node B (eNB) 1431 and E-UTRAN Node B (eNB) 1432. E-UTRAN 1430 may contain one or more eNBs. User Equipment 1402 may be any user device capable of connecting to E-UTRAN 1430 including, but not limited to, a personal computer, laptop, mobile device, wireless router, or other device capable of wireless connectivity to E-UTRAN 1430. The improved performance of the E-UTRAN 1430 relative to a typical UMTS network allows for increased bandwidth, spectral efficiency, and functionality including, but not limited to, voice, high-speed applications, large data transfer and IPTV, while still allowing for full mobility.

An example embodiment of a mobile data and communication service that may be implemented in the PLMN architecture described in FIG. 17 is the Enhanced Data rates for GSM Evolution (EDGE). EDGE is an enhancement for GPRS networks that implements an improved signal modulation scheme known as 8-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Typically Mobile Station 1401 may communicate with any or all of BSS 1410, RNS 1420, or E-UTRAN 1430. In a illustrative system, each of BSS 1410, RNS 1420, and E-UTRAN 1430 may provide Mobile Station 1401 with access to Core Network 1440. The Core Network 1440 may include of a series of devices that route data and communications between end users. Core Network 1440 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched-Media Gateway Function (CS-MGW) 1441 is part of Core Network 1440, and interacts with Visitor Location Register (VLR) and Mobile-Services Switching Center (MSC) Server 1460 and Gateway MSC Server 1461 in order to facilitate Core Network 1440 resource control in the CS domain. Functions of CS-MGW 1441 include, but are not limited to, media conversion, bearer control, payload processing and other mobile network processing such as handover or anchoring. CS-MGW 1440 may receive connections to Mobile Station 1401 through BSS 1410, RNS 1420 or both.

Serving GPRS Support Node (SGSN) 1442 stores subscriber data regarding Mobile Station 1401 in order to facilitate network functionality. SGSN 1442 may store subscription information such as, but not limited to, the International Mobile Subscriber Identity (IMSI), temporary identities, or Packet Data Protocol (PDP) addresses. SGSN 1442 may also store location information such as, but not limited to, the Gateway GPRS Support Node (GGSN) 1444 address for each GGSN where an active PDP exists. GGSN 1444 may implement a location register function to store subscriber data it receives from SGSN 1442 such as subscription or location information.

Serving Gateway (S-GW) 1443 is an interface which provides connectivity between E-UTRAN 1430 and Core Network 1440. Functions of S-GW 1443 include, but are not limited to, packet routing, packet forwarding, transport level packet processing, event reporting to Policy and Charging Rules Function (PCRF) 1450, and mobility anchoring for inter-network mobility. PCRF 1450 uses information gathered from S-GW 1443, as well as other sources, to make applicable policy and charging decisions related to data flows, network resources and other network administration functions. Packet Data Network Gateway (PDN-GW) 1445 may provide user-to-services connectivity functionality including, but not limited to, network-wide mobility anchoring, bearer session anchoring and control, and IP address allocation for PS domain connections.

Home Subscriber Server (HSS) 1463 is a database for user information, and stores subscription data regarding Mobile Station 1401 or User Equipment 1402 for handling calls or data sessions. Networks may contain one HSS 1463 or more if additional resources are required. Example data stored by HSS 1463 include, but is not limited to, user identification, numbering and addressing information, security information, or location information. HSS 1463 may also provide call or session establishment procedures in both the PS and CS domains.

The VLR/MSC Server 1460 provides user location functionality. When Mobile Station 1401 enters a new network location, it begins a registration procedure. A MSC Server for that location transfers the location information to the VLR for the area. A VLR and MSC Server may be located in the same computing environment, as is shown by VLR/MSC Server 1460, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 1401 registration or procedures for handover of Mobile Station 1401 to a different section of the Core Network 1440. GMSC Server 1461 may serve as a connection to alternate GMSC Servers for other mobile stations in larger networks.

Equipment Identity Register (EIR) 1462 is a logical element which may store the International Mobile Equipment Identities (IMEI) for Mobile Station 1401. In a typical embodiment, user equipment may be classified as either "white listed" or "black listed" depending on its status in the network. In one embodiment, if Mobile Station 1401 is stolen and put to use by an unauthorized user, it may be registered as "black listed" in EIR 1462, preventing its use on the network. Mobility Management Entity (MME) 1464 is a control node which may track Mobile Station 1401 or User Equipment 1402 if the devices are idle. Additional functionality may include the ability of MME 1464 to contact an idle Mobile Station 1401 or User Equipment 1402 if retransmission of a previous session is required.

Various experiments were conducting using the SGcast protocol. Different networks of various node densities and link qualities were compared. Experiments were performed using TMote sensor nodes. TMote is a sensor node comprising 10 KB RAM, 48 KB program memory, 8 MHz processor, and a 250 Kbps radio. TOSSIM simulations were used for large scale evaluations.

Experiments were conducted using four test bed networks. Testbed NW1 is a small scale network of 10 sensor nodes deployed in two floors of a home building. Testbed NW2 is a small scale network of 10 sensor nodes deployed in a single floor of a home building. Testbed NW3 is a moderate scale network of 23 sensor nodes deployed in a single floor of a large office building. And testbed NW4 is a moderate scale network of 23 sensor nodes deployed in a single room of an office building. In NW4, all sensor nodes were within transmission range of each other.

Figure 18:
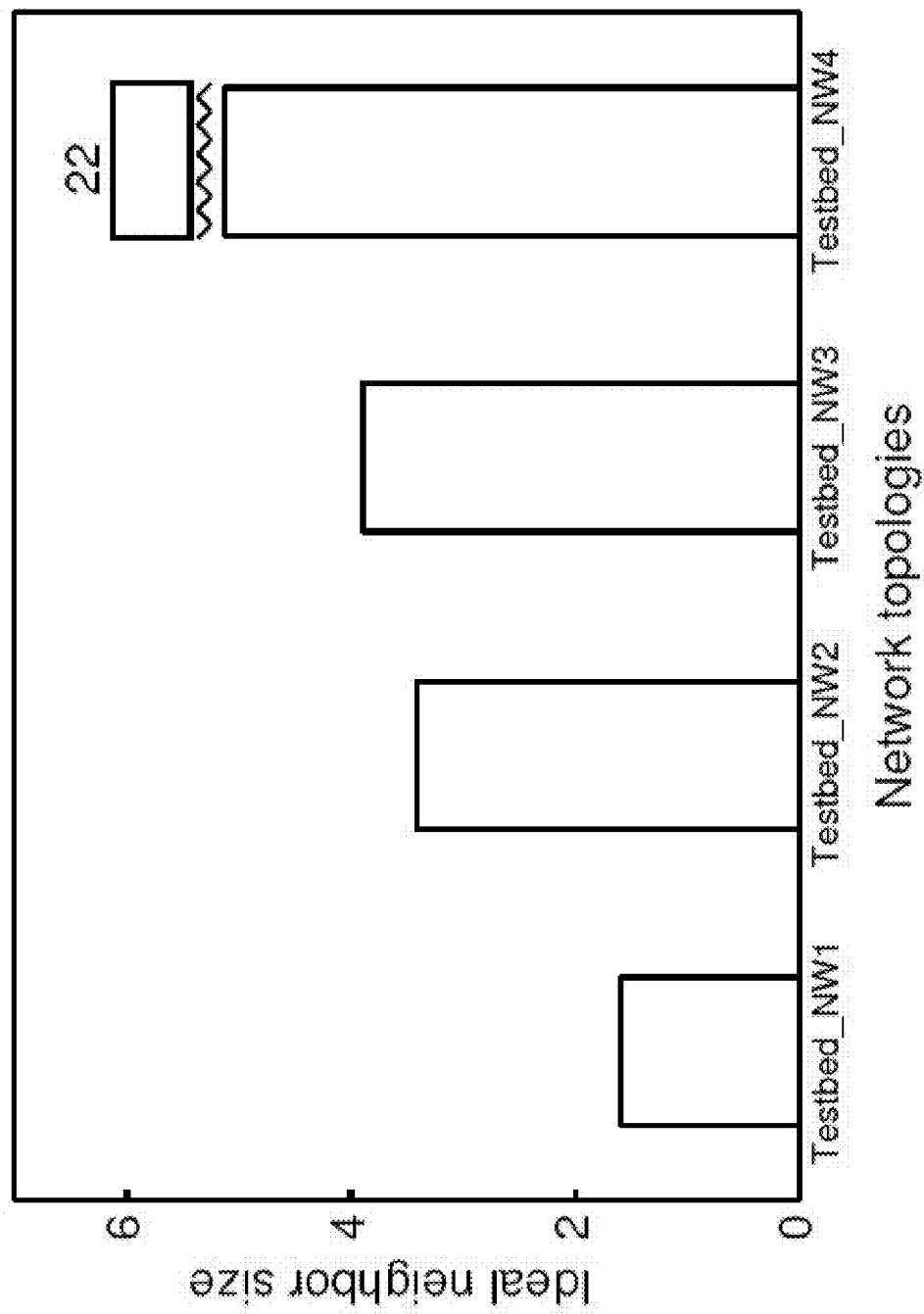
FIG. 18 illustrates average numbers of neighbors for various networks.

In all experiments, the output transmission power of each node was set to the minimum possible value to increase the size of the network in terms of number of hops. In order to quantify densities of these networks, we performed the following experiment. In each network, each node broadcasted 100 packets. Each node counted the number of packets that it received. Note that these were simple single hop broadcasts, not geocast communications. The time interval between any two successive packet broadcasts was sufficiently large so that no two broadcasts interfered with each other. The average number of nodes that received a broadcast transmission (neighborhood size) was a measure of ideal node density (in the absence of interfering transmissions) of these networks. The average number of neighbors for each network is shown in FIG. 18.

Testbed NW1 was the most sparse network while Testbed NW4 was the most dense. Also, link qualities in home networks were different from those in office networks. Compared to the home environment, office environment had a large number of WiFi access points and terminals. Thus, Testbed NW3 and Testbed NW4 were subjected to more external interference than Testbed NW1 and Testbed NW2. In the experiments, it was found that Testbed NW1 was about 4 to 7 hops wide, Testbed NW2 was about 2 to 3 hops wide, Testbed NW3 was about 4 to 7 hops wide, and Testbed NW4 was 1 hop wide.

Parameters used in the experiments include m=2, the parameter of M heuristic; n=2, the threshold value of NumNegHops. All nodes within radius R1 of the geocast originator node and within radius R2 of the center of the destination area were in the forwarding zone. R1 and R2 were chosen as 5 times the transmission range of the nodes. In the experiments, the approximate average transmission range was derived by using the information about average number of neighbors (described above) and known distances between the nodes. For each network, a node at one corner of the network generated geocast packets and transmitted them to a circular destination area situated at another corner of the network. Each experiment was run for 15 minutes during which the originator transmitted a geocast packet every 10 seconds. Each experiment was repeated 5 times. The packet loss due to queue overflow was close to 0 for the data rates used in the experiments. The results presented here are average values.

Figure 19:
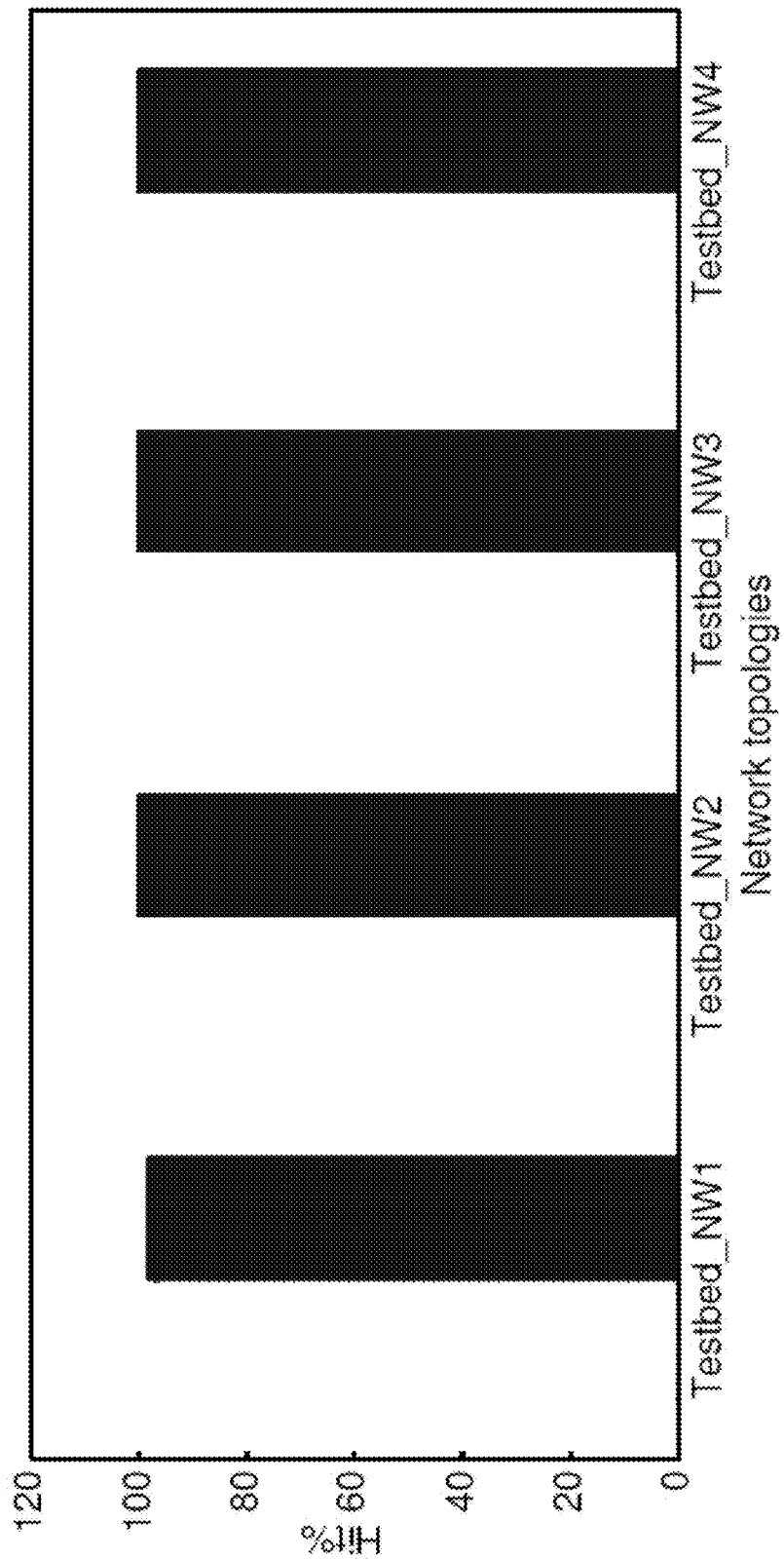
FIG. 19 illustrates a comparison of hit % of the SGcast protocol.
Figure 20:
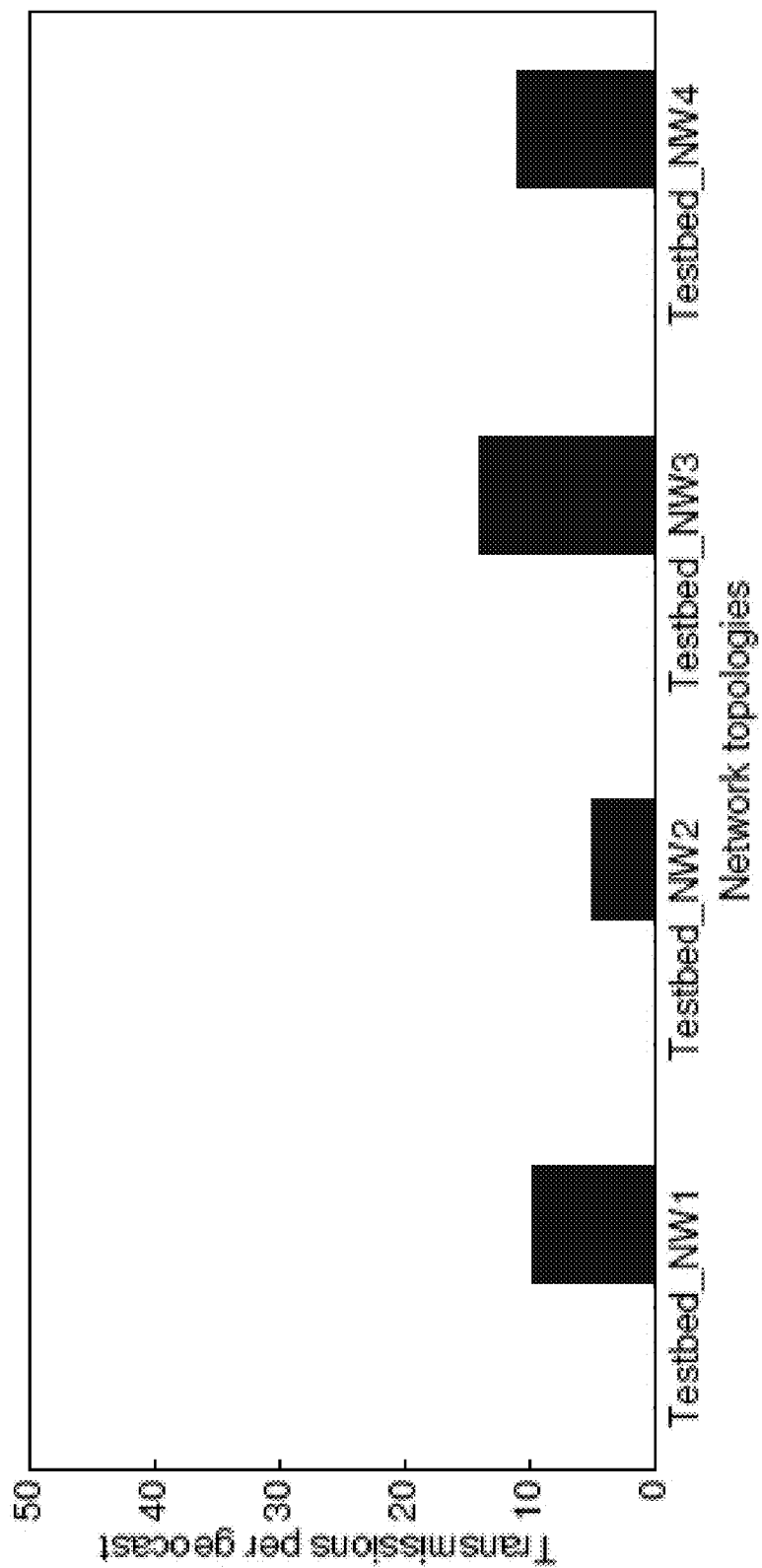
FIG. 20 illustrates numbers of radio transmissions per geocast.

FIG. 19 illustrates a comparison of hit % of SGcast. It was found that the SGcast protocol delivered geocast packets reliably to nearly 100% of nodes in the destination area for these small and moderate sized networks. However, as shown in FIG. 20, the number of radio transmissions per geocast was smaller. The number of radio transmissions may be a measure of energy consumption of the protocol because radio activities may be the most energy-expensive operations in sensor networks. For many existing sensor platforms, transmitting 1 bit may be about 3 orders of magnitude more energy expensive than executing a cpu instruction. Various design features of SGcast may contribute to reducing the number of radio transmissions, in achieving high hit %, and in making the SGcast protocol robust to dynamic network conditions.

Using NumNegHops to define implicit forwarding zones dynamically instead of static forwarding zones may limit the spread of geocast propagation away from the destination area and may make the protocol robust against node densities. Using different heuristics for geocast paths with different values of NumNegHops and distance-based backoff mechanism may ensure that those nodes are selected for forwarding which cause the geocast packet to progress towards the destination area. These techniques effectively suppress transmissions from undesired nodes, and yet provide sufficient redundancy so that even if some transmissions fail, the geocast packet still has a high probability of reaching the destination area.

Figure 21:
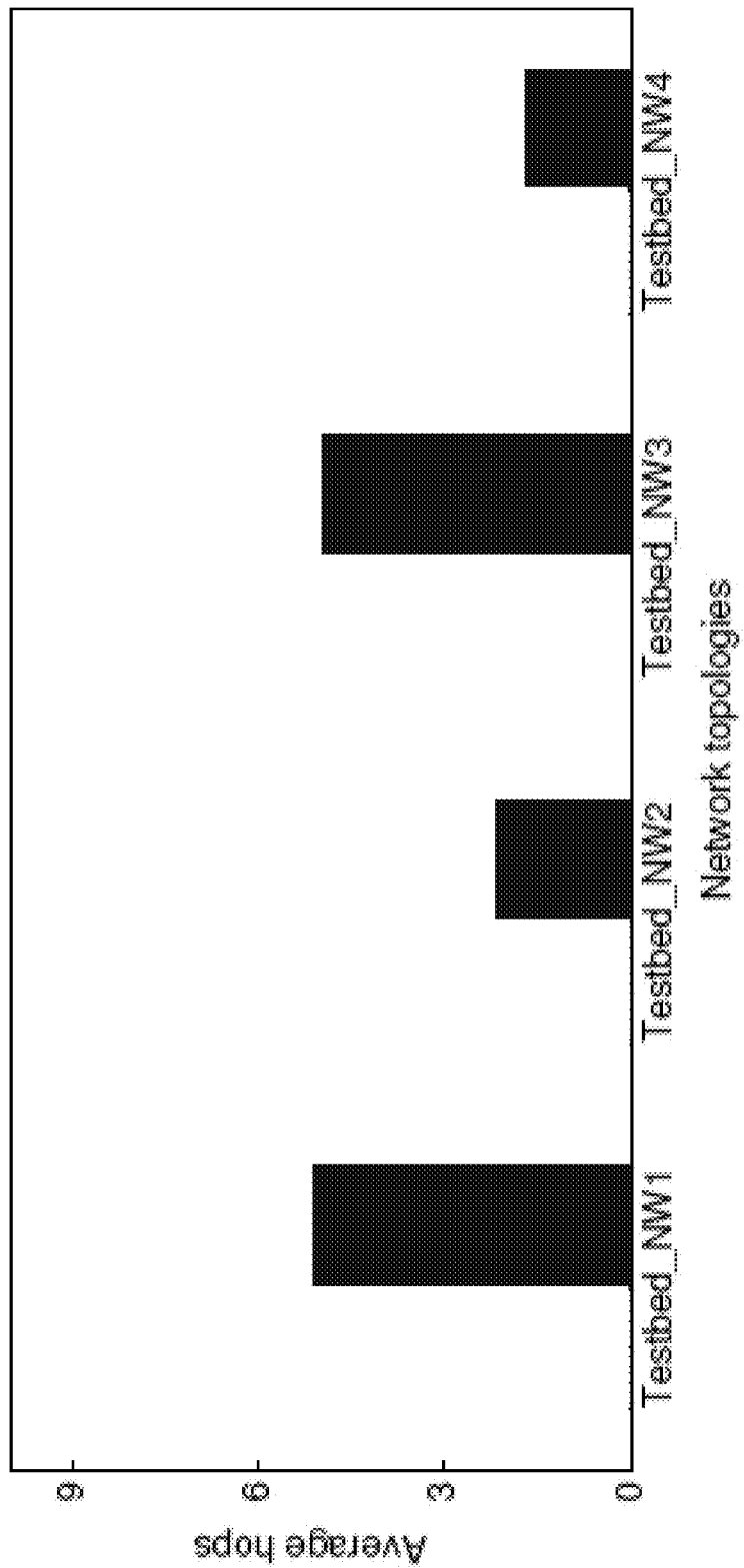
FIG. 21 shows average number of hops required by the SGcast protocol to deliver geocast packets to the destination area.

FIG. 21 shows average number of hops required by the SGcast protocol to deliver geocast packets to the destination area. In Testbed NW2 and Testbed NW4, the networks are spread in a small area. But in Testbed NW1 and Testbed NW3 where networks are spread across relatively large areas, the SGcast protocol reduced the number of hops. Many of the hops were in negative directions deviating away from the destination area.

Figure 22:
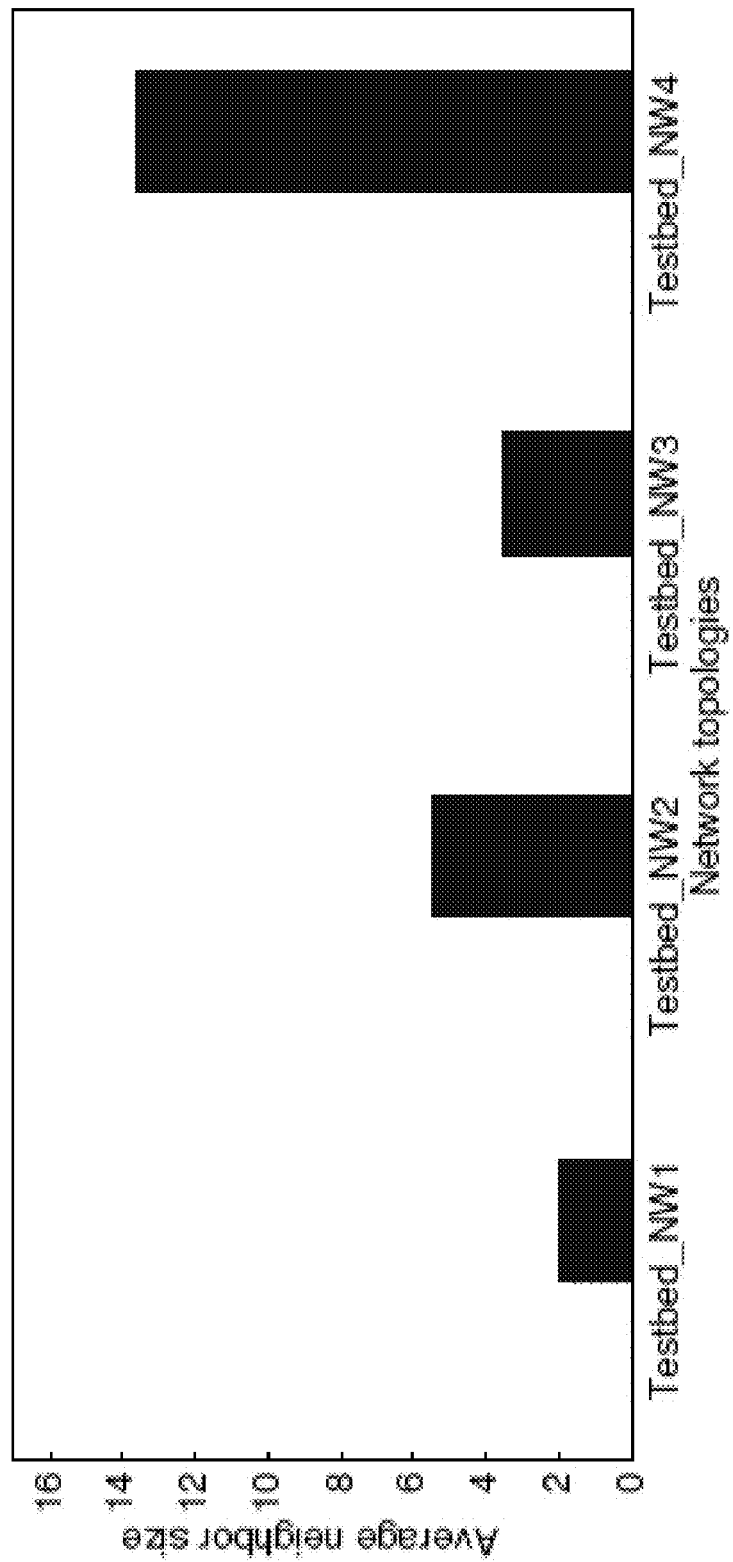
FIG. 22 depicts a comparison in terms of average neighborhood sizes.

FIG. 22 depicts a comparison in terms of average neighborhood sizes (the number of nodes that received a geocast packet transmission). It was found that the average neighborhood size for the SGcast protocol was close to ideal one (FIG. 18).

Various simulations using the SGcast protocol were conducted. TOSSIM simulations were used to evaluate performance of the SGcast protocol in large networks. Two deployment scenarios were considered: WSNs deployed in indoor office building and outdoor football field settings. Various parameters (e.g., path loss exponent, white Gaussian noise parameters, shadowing components, etc.) that are used to characterize the radio environment were based on a theoretical model.

Six (6) networks were considered for indoor environments (IN NW1, . . . , IN NW6) and six (6) networks were considered for outdoor football field environment (FB NW1, . . . , FB NW6). Except FB NW5 and FB NW6, each network comprised 100 nodes arranged in a 10×10 grid fashion. The difference between different networks was the distance between two successive nodes in the grid. FB NW5 and FB NW6 were 500 and 1000-node random networks, respectively. Like in testbed networks, the following experiments were used to quantify the ideal node densities of these networks. Each node in the network broadcasted 100 packets. Each node counted the number of packets that it received.

Figure 23:
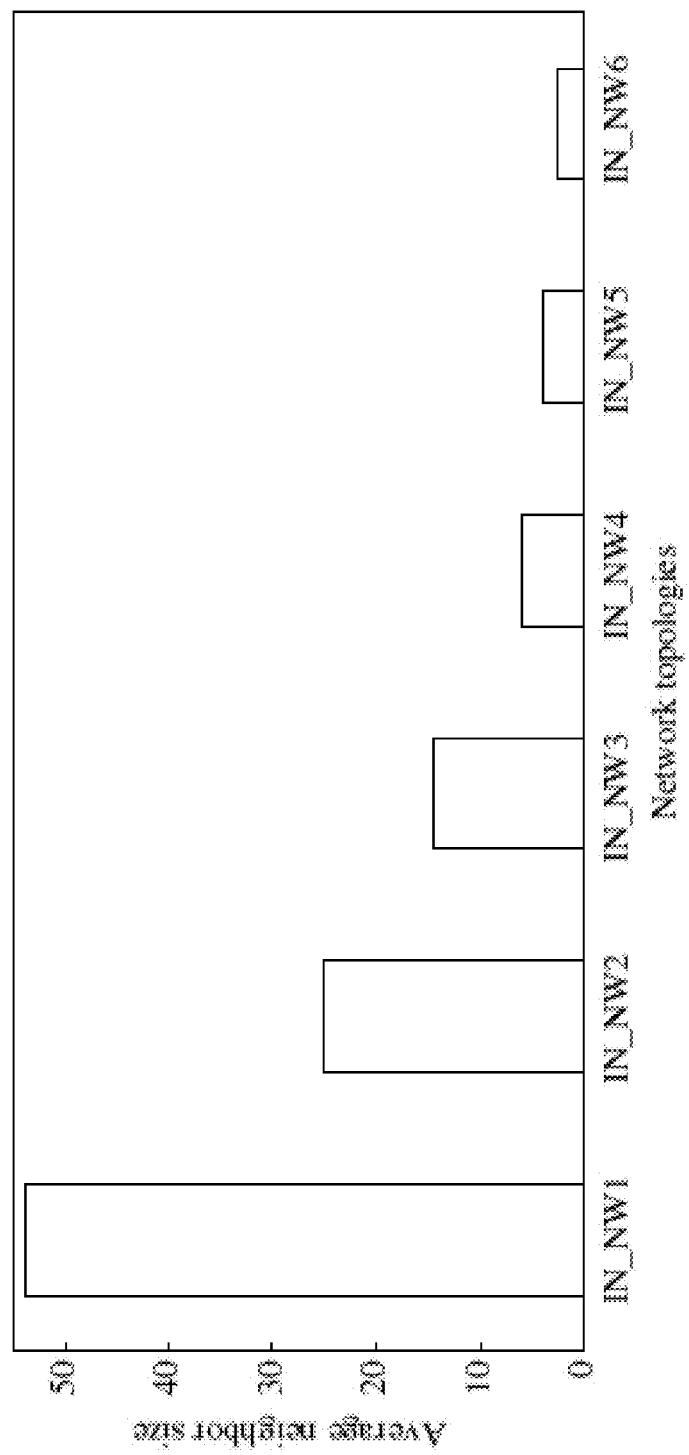
FIG. 23 illustrates the average number of neighbors in each of these networks.
Figure 24:
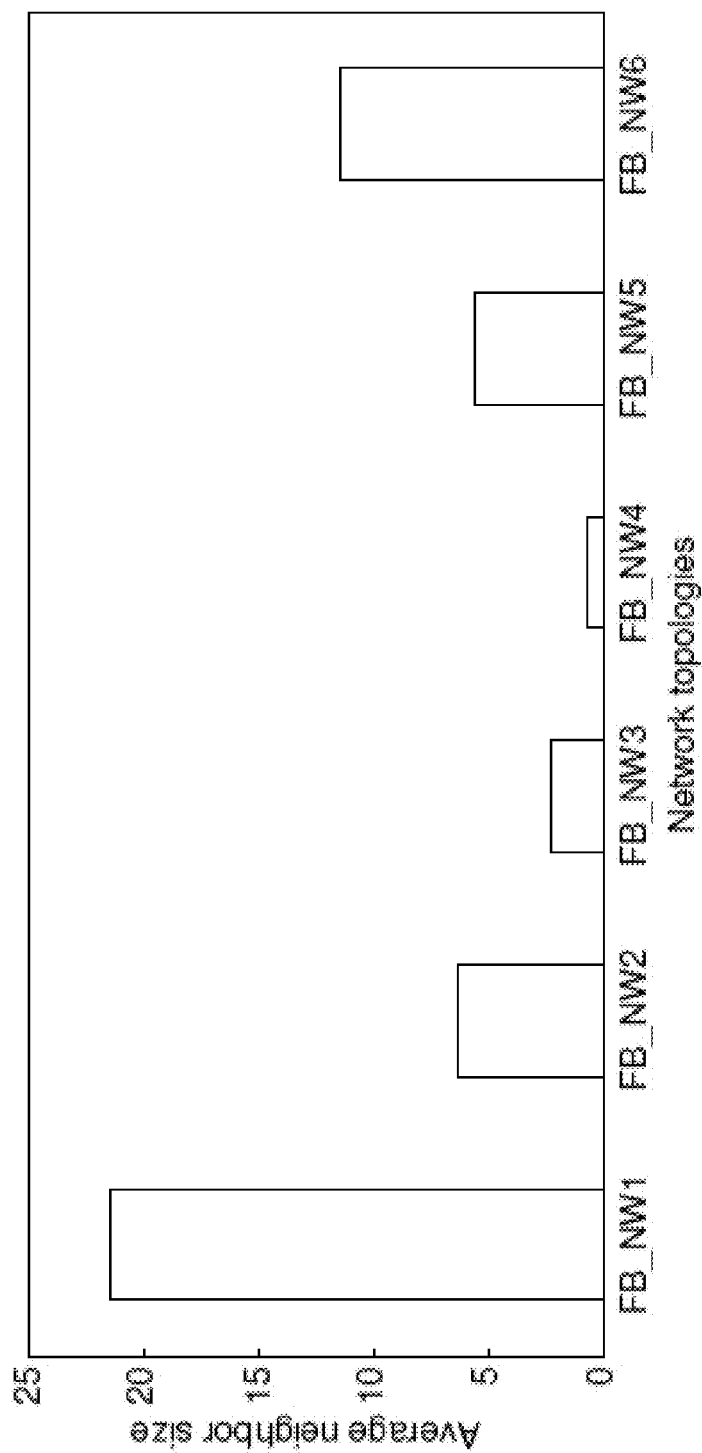
FIG. 24 is another illustration of the average number of neighbors in each of these networks.

FIG. 23 and FIG. 24 illustrate the average number of neighbors in each of these networks. As depicted in FIG. 23 and FIG. 24, the networks used for the experiments exhibited a wide variation in node densities. For geocast experiments, each node selected a time instant randomly from a [5 sec, 15 sec] interval and sent a geocast packet to a randomly selected circular destination area in the network. This process was repeated for the experiment duration of one hour. Each experiment was repeated 3 times. The results presented here are average values. Simulation parameters were the same as those used in the actual experiments described herein.

Figure 25:
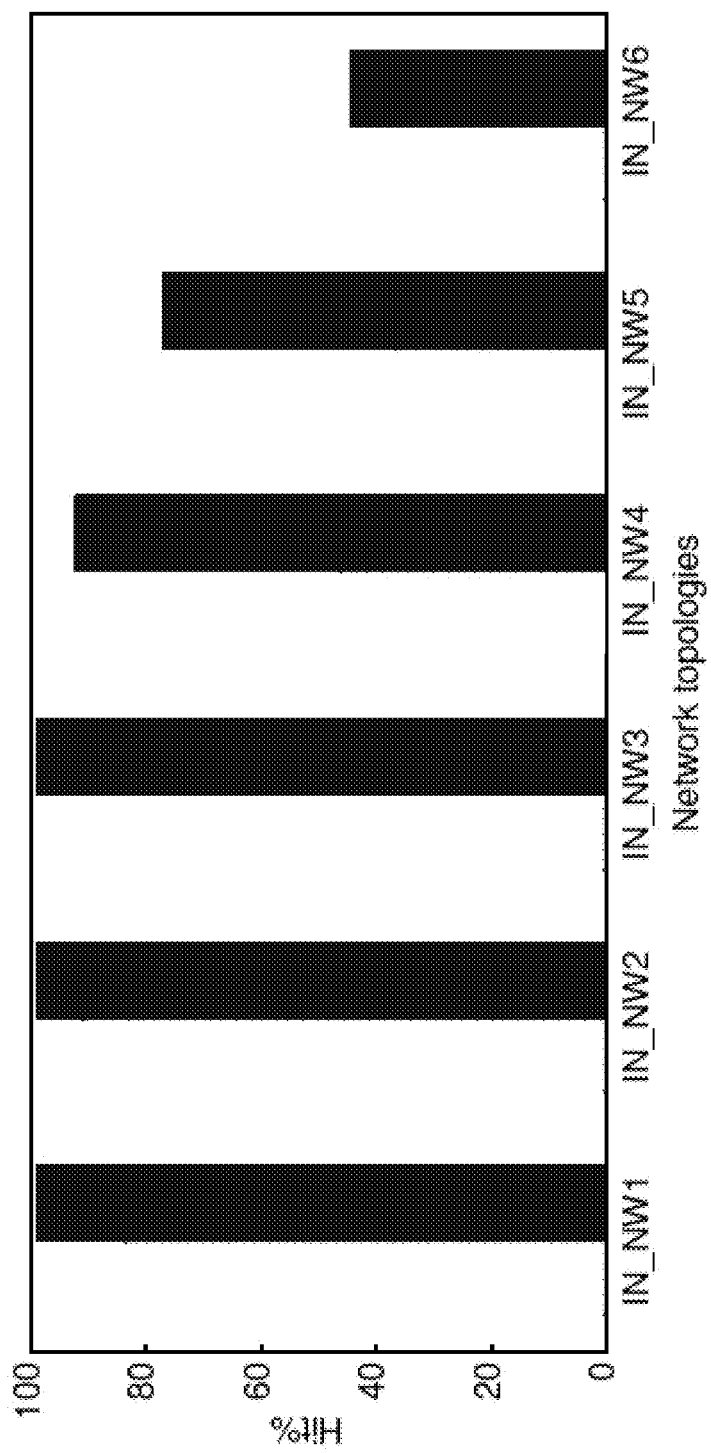
FIG. 25 illustrates a comparison of the SGcast protocol in terms of hit % for indoor networks.
Figure 26:
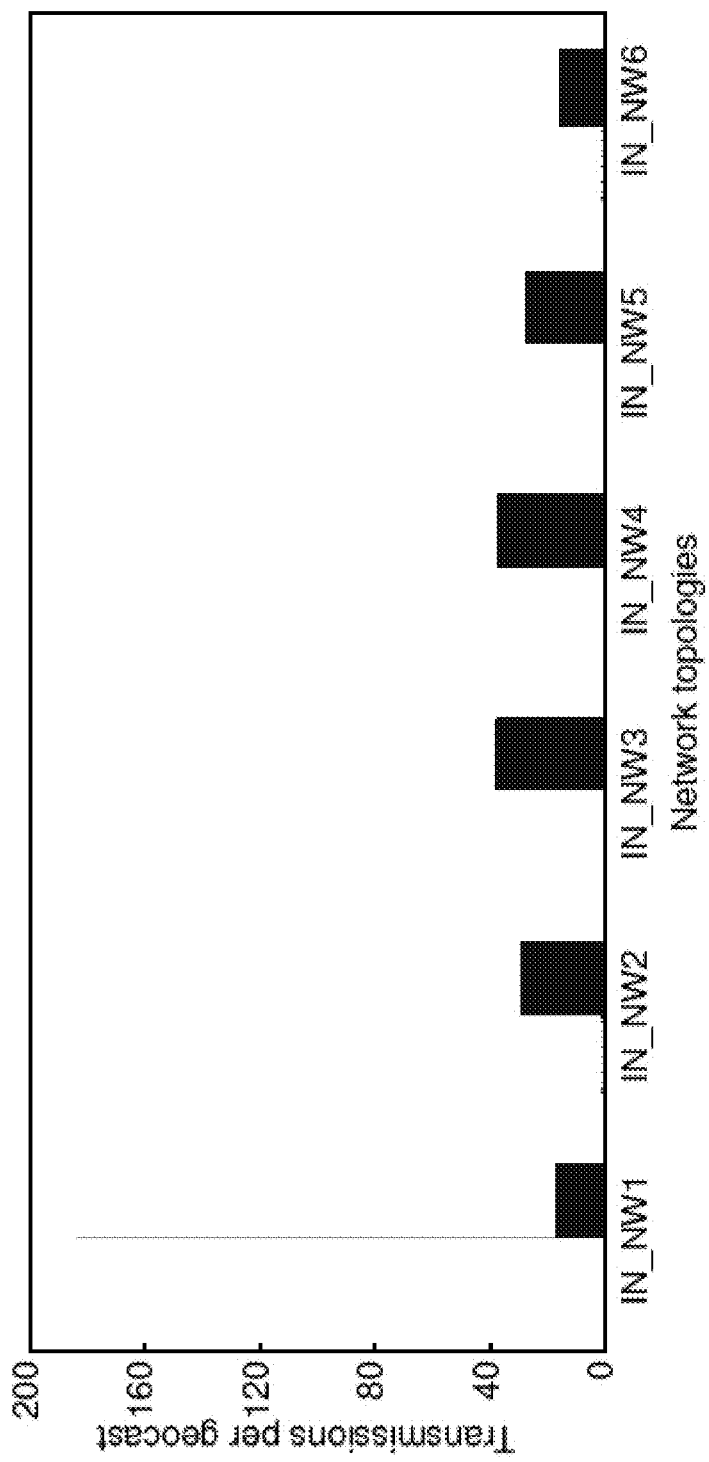
FIG. 26 illustrates a comparison of the SGcast protocol in terms of the number of transmissions per geocast for indoor networks.
Figure 27:
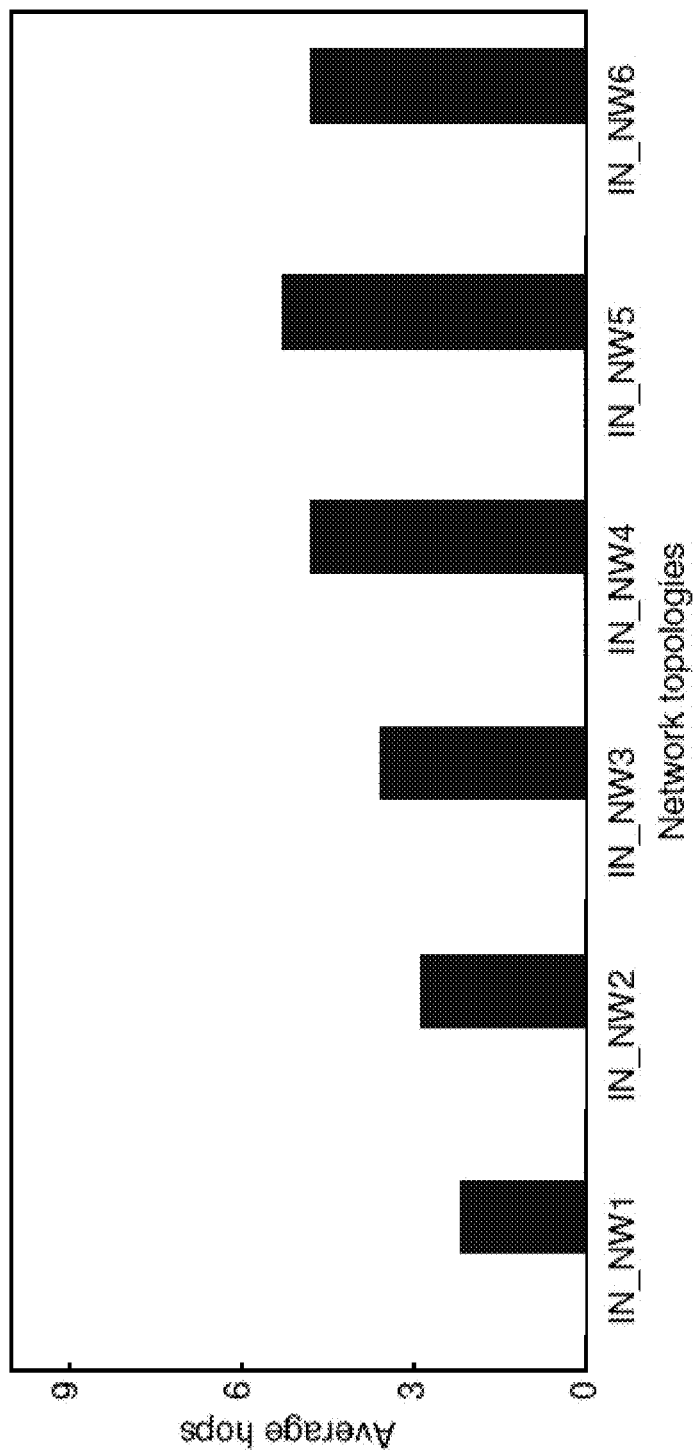
FIG. 27 illustrates a comparison of the SGcast protocol in terms of the average number of hops taken by geocast packets to reach the nodes in the destination area for indoor networks.
Figure 28:
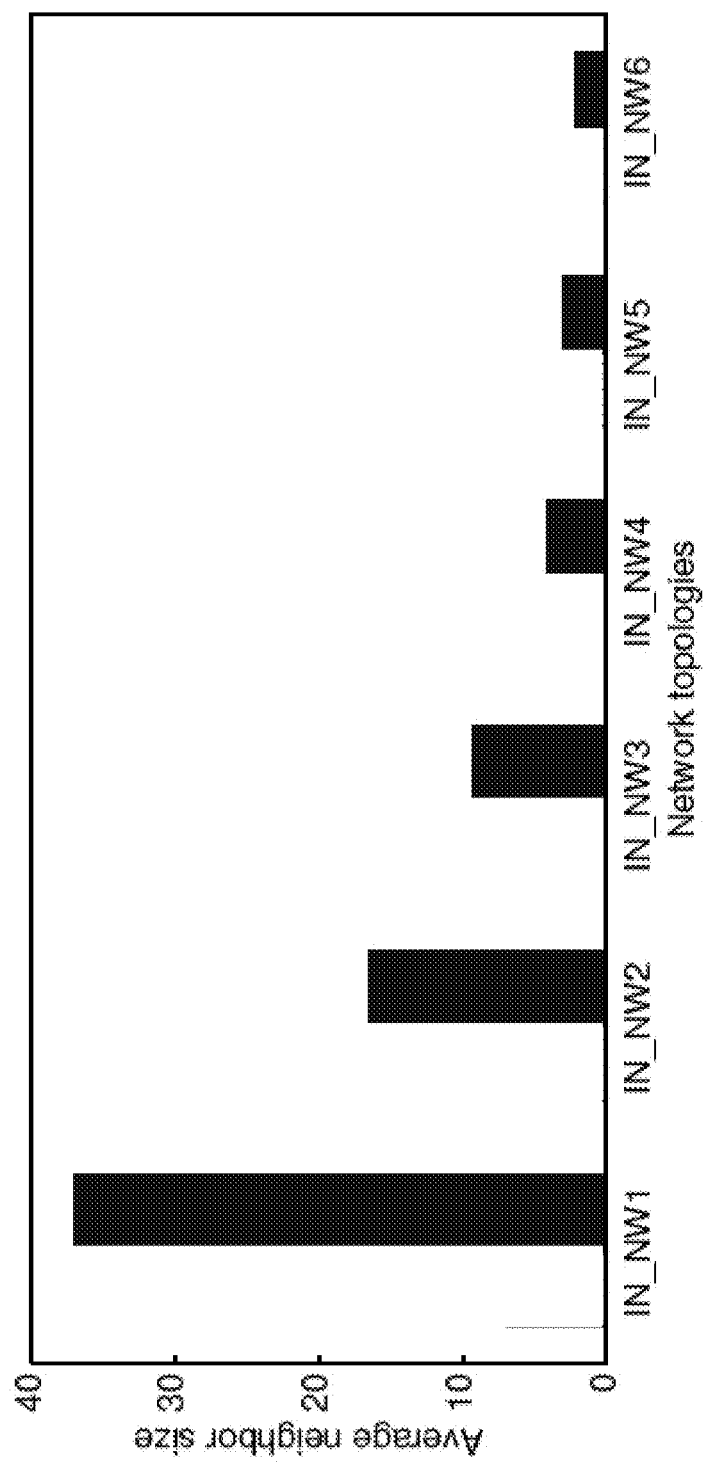
FIG. 28 illustrates a comparison of the SGcast protocol in terms of the average neighborhood size for indoor networks.

FIG. 25 illustrates a comparison of the SGcast protocol in terms of hit % for indoor networks. FIG. 26 illustrates a comparison of the SGcast protocol in terms of the number of transmissions per geocast for indoor networks. FIG. 27 illustrates a comparison of the SGcast protocol in terms of the average number of hops taken by geocast packets to reach the nodes in the destination area for indoor networks. And FIG. 28 illustrates a comparison of the SGcast protocol in terms of the average neighborhood size for indoor networks.

Figure 29:
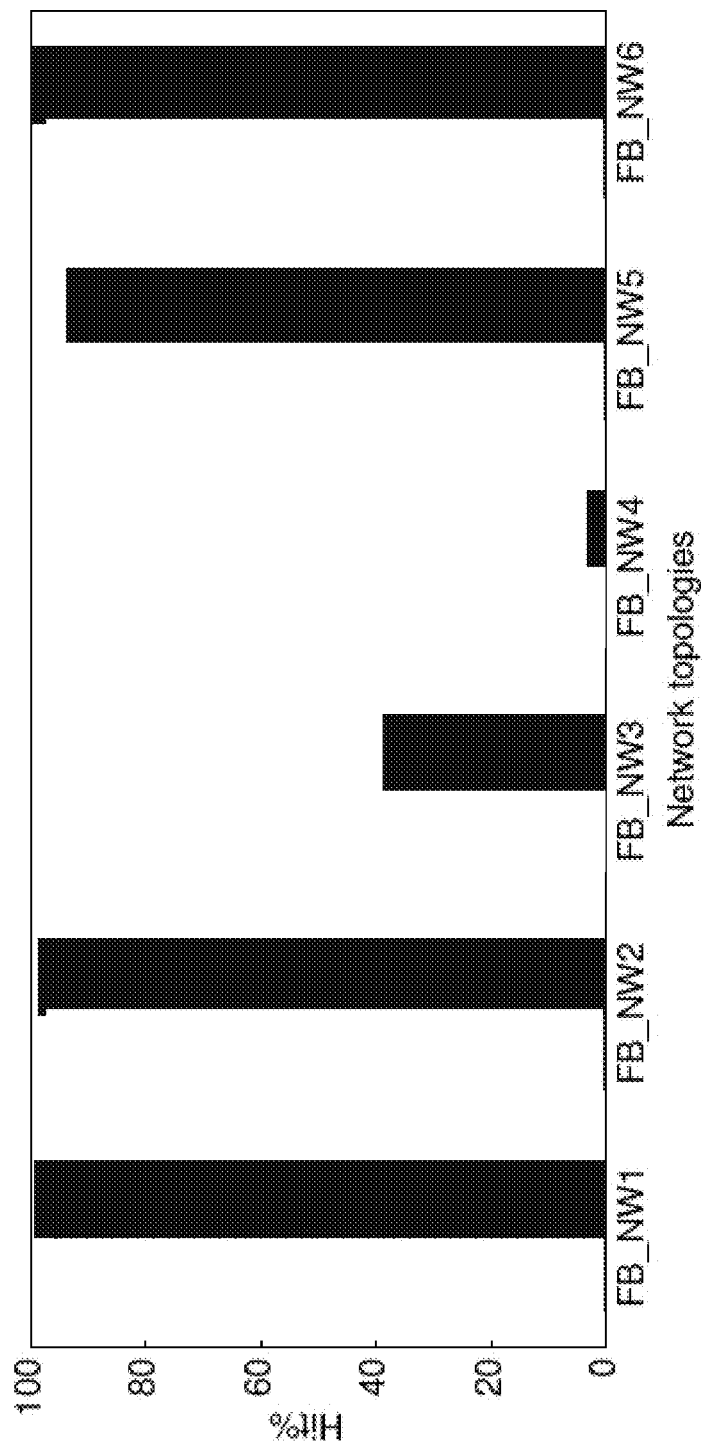
FIG. 29 illustrates a comparison of the SGcast protocol in terms of hit % for outdoor networks.
Figure 30:
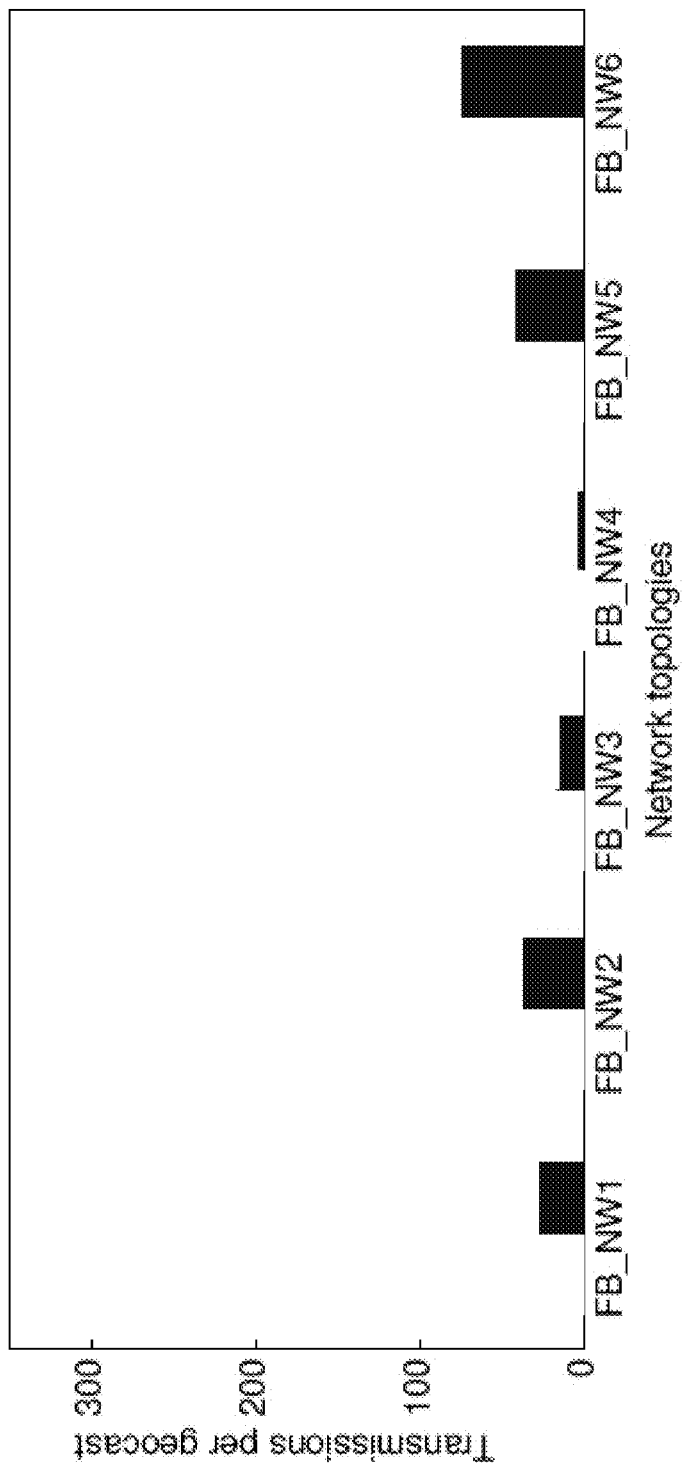
FIG. 30 illustrates a comparison of the SGcast protocol in terms of the number of transmissions per geocast for outdoor networks.
Figure 31:
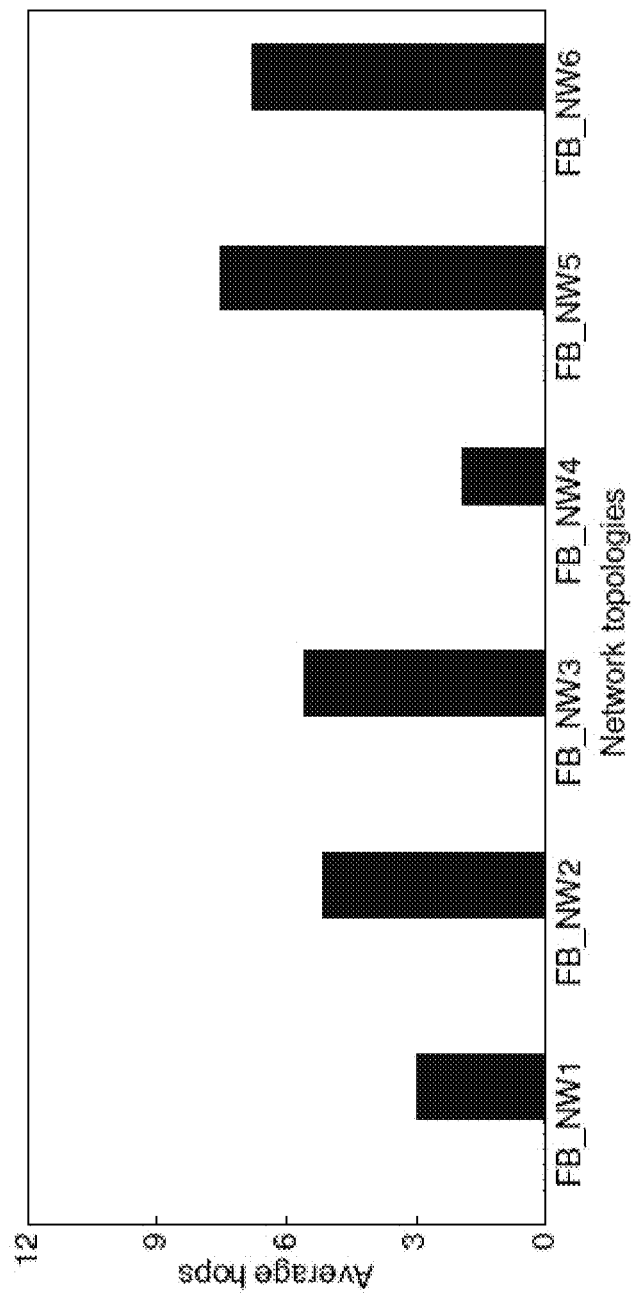
FIG. 31 illustrates a comparison of the SGcast protocol in terms of the average number of hops taken by geocast packets to reach the nodes in the destination area for outdoor networks.
Figure 32:
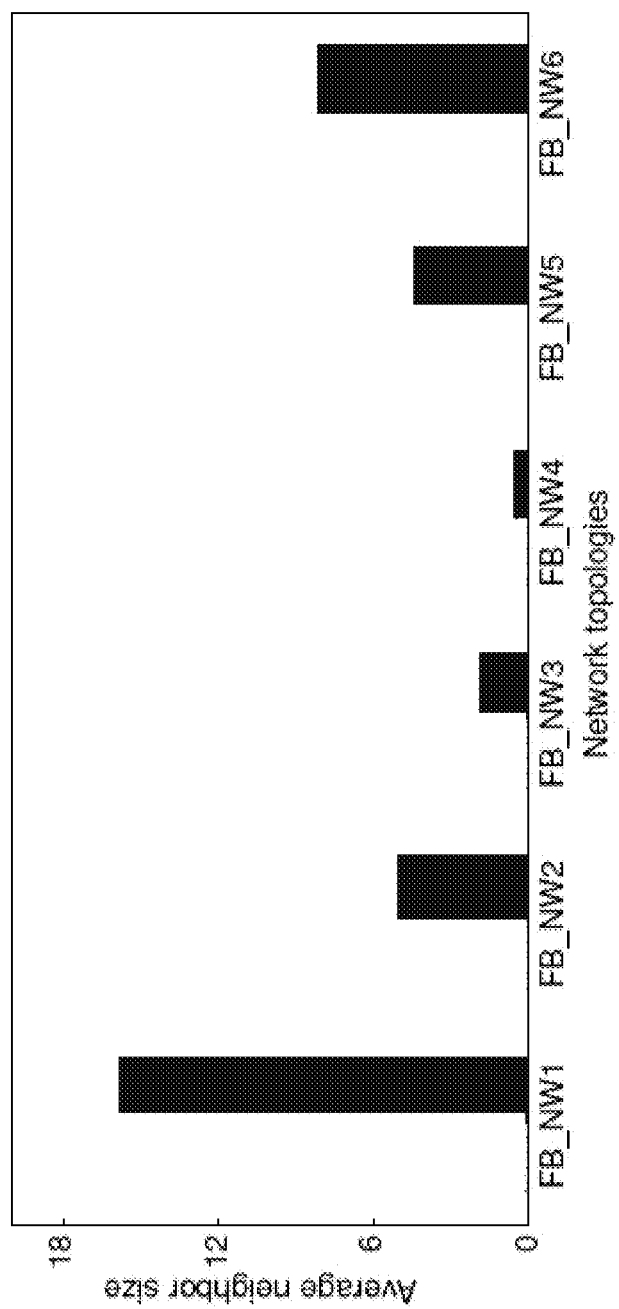
FIG. 32 illustrates a comparison of the SGcast protocol in terms of the average neighborhood size for outdoor networks.

FIG. 29 illustrates a comparison of the SGcast protocol in terms of hit % for outdoor networks. FIG. 30 illustrates a comparison of the SGcast protocol in terms of the number of transmissions per geocast for outdoor networks. FIG. 31 illustrates a comparison of the SGcast protocol in terms of the average number of hops taken by geocast packets to reach the nodes in the destination area for outdoor networks. And FIG. 32 illustrates a comparison of the SGcast protocol in terms of the average neighborhood size for outdoor networks.

Figure 33:
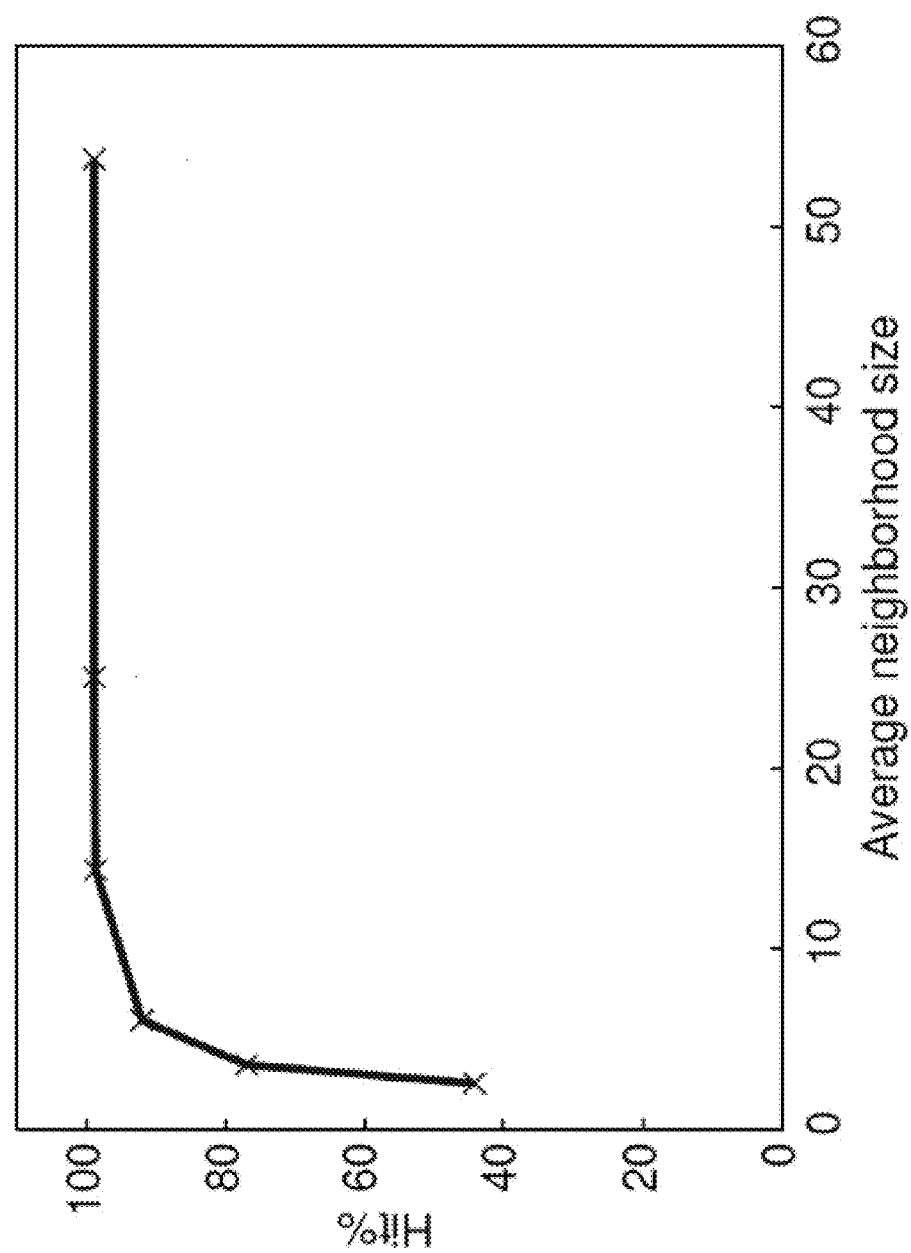
FIG. 33 graphs a comparison of the SGcast protocol in terms of hit % for indoor networks.
Figure 34:
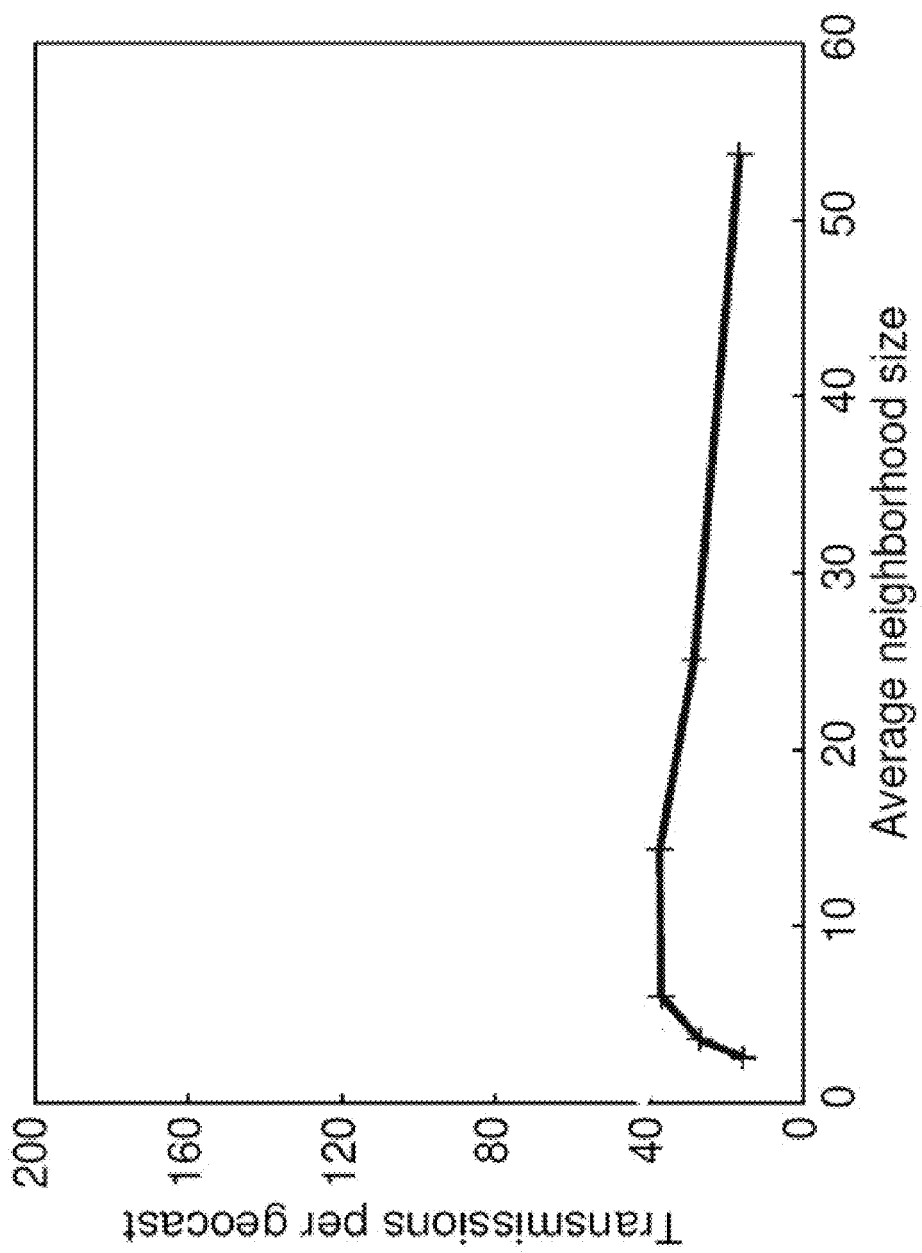
FIG. 34 graphs a comparison of the SGcast protocol in terms of the number of transmissions per geocast for indoor networks.
Figure 35:
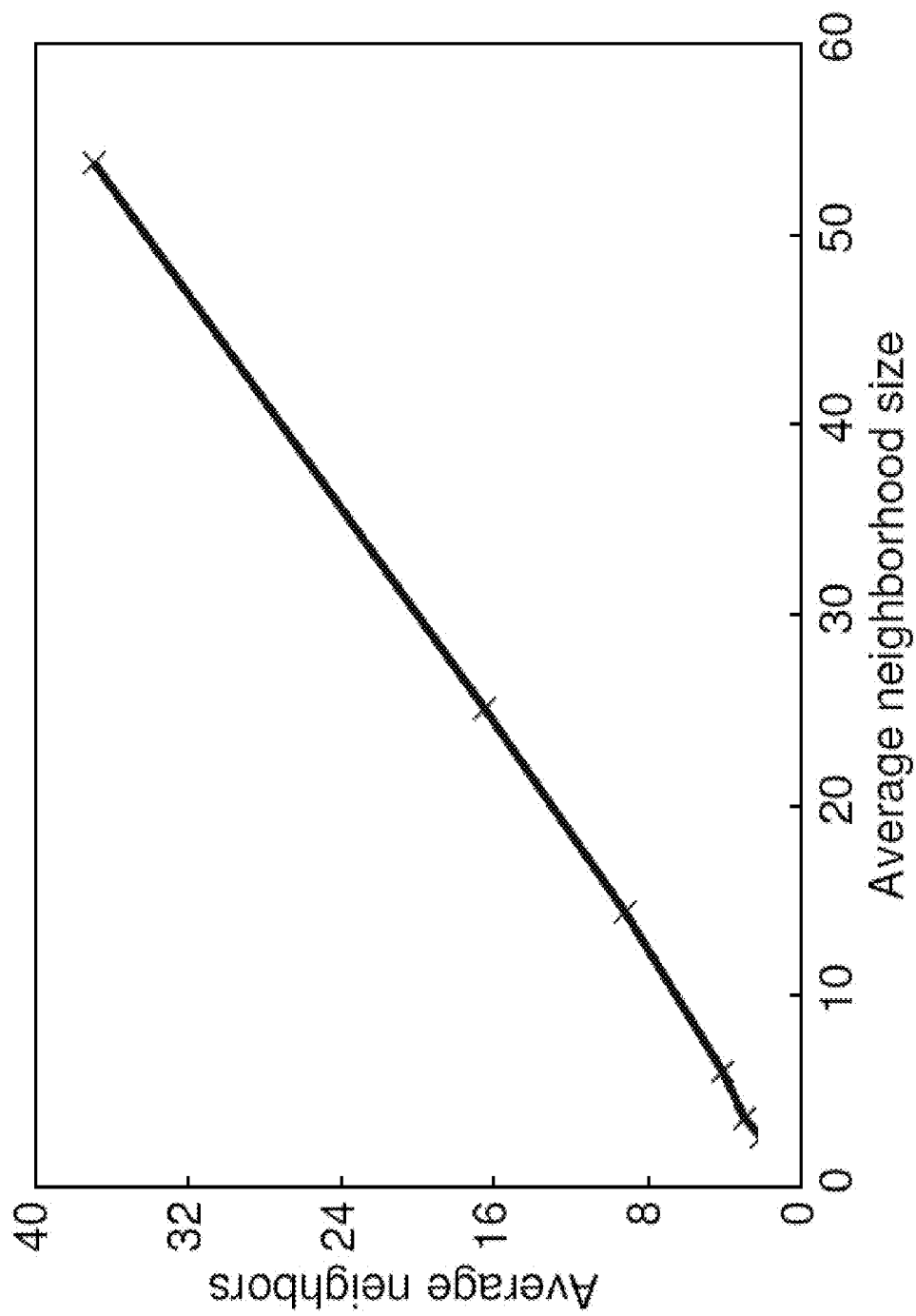
FIG. 35 graphs a comparison of the SGcast protocol in terms of the average neighborhood size for indoor networks.

FIG. 33 graphs a comparison of the SGcast protocol in terms of hit % for indoor networks. FIG. 34 graphs a comparison of the SGcast protocol in terms of the number of transmissions per geocast for indoor networks. FIG. 35 graphs a comparison of the SGcast protocol in terms of the average neighborhood size for indoor networks. The x-axes of these plots shown in FIG. 33, FIG. 34, and FIG. 35 are ideal average node densities (average number of nodes that can hear a broadcast packet in the absence of interfering transmissions by nearby nodes, as shown in FIG. 23). The results for outdoor networks were are similar to the results for the indoor networks.

FIG. 33 indicates that as node density increases, hit % increases. In very dense networks, large number of nodes lies in the statically defined forwarding zone, causing large number of nodes to forward the message. On the other hand, because of the use of NumNegHops to limit the divergence of geocast propagation, SGcast was robust against node densities and hit % remains unaffected even in very dense networks. Furthermore, it was notices that except for very sparse networks with neighborhood size less than 8, the SGcast protocol achieved hit % close to 100%.

FIG. 34 indicates that the number of radio transmissions was robust to node density in the SGcast protocol. The reason for this robustness may be gleaned from FIG. 35. In FIG. 35, the x-axis represents the ideal node density while the y-axis represents the node density (average neighborhood size) observed by the two protocols. As node density increases, the number of nodes that can hear a geocast packet transmission increases. The slope of the curve in FIG. 35 indicates that SGcast protocol experiences little network congestion as node density increases.

While example embodiments of the SGcast protocol have been described in connection with various computing devices/processors, the underlying concepts may be applied to any computing device, processor, or system capable of implementing the SGcast protocol. The various techniques described herein can be implemented in connection with hardware or software or, where appropriate, with a combination of both. Thus, the methods and apparatuses of using and implementing the SGcast protocol may be implemented, or certain aspects or portions thereof, can take the form of program code (i.e., instructions) embodied in tangible storage media having a tangible physical structure. Examples of tangible storage media include floppy diskettes, CD-ROMs, DVDs, hard drives, or any other tangible machine-readable storage medium (computer-readable storage medium). Thus, a computer-readable storage medium is not a transient signal per se. When the program code is loaded into and executed by a machine, such as a computer, the machine becomes an apparatus for implementing the SGcast protocol. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and apparatuses for using and implementing the SGcast protocol also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for implementing the SGcast protocol. When implemented on a general-purpose processor, the program code combines with the processor to provide a unique apparatus that operates to invoke the functionality of the SGcast protocol.

While the SGcast protocol has been described in connection with the various embodiments of the various figures, it is to be understood that other similar embodiments can be used or modifications and additions can be made to the described embodiments for implementing the SGcast protocol without deviating therefrom. For example, one skilled in the art will recognize that the SGcast protocol as described in the present application may apply to any environment, whether wired or wireless, and may be applied to any number of such devices connected via a communications network and interacting across the network. Therefore, the SGcast protocol should not be limited to any single embodiment, but rather should be construed in breadth and scope in accordance with the appended claims.

What is claimed:

1. A device comprising:
a processor; and
memory coupled to the processor, the memory comprising executable instructions that when executed by the processor cause the processor to effectuate operations comprising:
receiving a geocast packet;
determining a first location of the device;
analyzing the received geocast packet to determine a second location of a transmitting device that transmitted the geocast packet;
analyzing the received geocast packet to determine a third location of a destination region of the geocast packet;
determining a first distance between the second location and the third location;
determining a second distance between the first location and the third location;
determining whether the received geocast packet constitutes a negative hop based upon a comparison of the first distance and the second distance;
when it is determined that the second distance is greater than the first distance, determining that the received geocast packet constitutes a negative hop;
incrementing a negative hop value when the second distance is greater than the first distance;
determining whether or not the negative hop value is greater than a threshold value;
if the negative hop value is greater than the threshold value, retransmitting the received geocast packet; and
if the negative hop value is not greater than the threshold value, waiting a predetermined amount of time before retransmitting the received geocast packet,
wherein the predetermined time is based on the second distance.

2. The device of claim 1, the operations further comprising: generating an updated geocast packet by updating the received geocast packet to comprise an indication of the incremented negative hop value.

3. The device of claim 1, the operations further comprising:
determining a number of negative hops the received geocast packet has accrued;
when it is determined that the number of negative hops the received geocast packet has accrued is equal to zero, determining whether to retransmit the received geocast packet based on heuristics considered in the alternative; and
when it is determined that the number of negative hops the received geocast packet has accrued is not zero, determining whether to retransmit the received geocast packet based on a cumulative consideration of heuristics.

4. The device of claim 1, the operations further comprising:
determining a number of negative hops the received geocast packet has accrued;

when it is determined that the number of negative hops the received geocast packet has accrued is equal to zero, determining to retransmit the received geocast packet when:
- the device has received less than a threshold number of geocast packets having a globally unique geocast identifier; or
- the device is closer to the third location than any other device from which the device has received a geocast packet having the globally unique geocast identifier.

5. A non-transitory computer-readable storage medium having stored thereon executable instructions that when executed by a processor, cause the processor to effectuation operations comprising:
- receiving a geocast packet;
- determining a first location of the processor;
- analyzing the received geocast packet to determine a second location of a transmitting device that transmitted the geocast packet;
- analyzing the received geocast packet to determine a third location of a destination region of the geocast packet;
- determining a first distance between the second location and the third location;
- determining a second distance between the first location and the third location;
- determining whether the received geocast packet constitutes a negative hop based upon a comparison of the first distance and the second distance;
- when it is determined that the second distance is greater than the first distance, determining that the received geocast packet constitutes a negative hop;
- incrementing a negative hop value when the second distance is greater than the first distance;
- determining whether or not the negative hop value is greater than a threshold value;
- if the negative hop value is greater than the threshold value, retransmitting the received geocast packet; and
- if the negative hop value is not greater than the threshold value, waiting a predetermined amount of time before retransmitting the received geocast packet,
- wherein the predetermined time is based on the second distance.

6. The non-transitory computer-readable storage medium of claim 5, the operations further comprising:
- generating an updated geocast packet by updating the received geocast packet to comprise an indication of the incremented negative hop value.

7. The non-transitory computer-readable storage medium of claim 5, the operations further comprising:
- determining a number of negative hops the received geocast packet has accrued;
- when it is determined that the number of negative hops the received geocast packet has accrued is equal to zero, determining whether to retransmit the received geocast packet based on heuristics considered in the alternative; and
- when it is determined that the number of negative hops the received geocast packet has accrued is not zero, determining whether to retransmit the received geocast packet based on a cumulative consideration of heuristics.

8. The non-transitory computer-readable storage medium of claim 5, the operations further comprising:
- determining a number of negative hops the received geocast packet has accrued;
- when it is determined that the number of negative hops the received geocast packet has accrued is equal to zero, determining to retransmit the received geocast packet when:
  - the device has received less than a threshold number of geocast packets having a globally unique geocast identifier; or
  - the device is closer to the third location than any other device from which the device has received a geocast packet having the globally unique geocast identifier.

9. A method comprising:
- receiving, by a device, a geocast packet;
- determining a first location of the device;
- analyzing the received geocast packet to determine a second location of a transmitting device that transmitted the geocast packet;
- analyzing the received geocast packet to determine a third location of a destination region of the geocast packet;
- determining a first distance between the second location and the third location;
- determining a second distance between the first location and the third location;
- determining that the received geocast packet constitutes a negative hop when the second distance is greater than the first distance;
- when it is determined that the second distance is greater than the first distance, determining that the received geocast packet constitutes a negative hop;
- incrementing a negative hop value when the second distance is greater than the first distance;
- determining whether or not the negative hop value is greater than a threshold value;
- if the negative hop value is greater than the threshold value, retransmitting the received geocast packet; and
- if the negative hop value is not greater than the threshold value, waiting a predetermined amount of time before retransmitting the received geocast packet,
- wherein the predetermined time is based on the second distance.

10. The method of claim 9, further comprising:
- determining a number of negative hops the received geocast packet has accrued;
- when it is determined that the number of negative hops the received geocast packet has accrued is equal to zero, determining whether to retransmit the received geocast packet based on heuristics considered in the alternative; and
- when it is determined that the number of negative hops the received geocast packet has accrued is not zero, determining whether to retransmit the received geocast packet based on a cumulative consideration of heuristics.

11. The method of claim 9, further comprising:
- determining a number of negative hops the received geocast packet has accrued;
- when it is determined that the number of negative hops the received geocast packet has accrued is equal to zero, determining to retransmit the received geocast packet when:
  - the device has received less than a threshold number of geocast packets having a globally unique geocast identifier; or
  - the device is closer to the third location than any other device from which the device has received a geocast packet having the globally unique geocast identifier.

* * * * *